United States Patent [19]

Akushsky et al.

[11] 4,121,298

[45] Oct. 17, 1978

[54] CENTRAL PROCESSING UNIT FOR NUMBERS REPRESENTED IN THE SYSTEM OF RESIDUAL CLASSES

[75] Inventors: Izrail Yakovlevich Akushsky; Vladimir Mikhailovich Burtsev, both of Moscow; Bulat Esenovich Duisenov, Alma-Ata; Ivan Timofeevich Pak, Alma-Ata; Anurbek Orymbekovich Zhautykov, Alma-Ata, all of U.S.S.R.

[73] Assignee: Institut Matematiki i Mekhaniki Akademii Nauk Kazakhskoi SSR, Alma-Ata, U.S.S.R.

[21] Appl. No.: 732,922

[22] Filed: Oct. 15, 1976

[51] Int. Cl.² .............................................. G06F 7/54
[52] U.S. Cl. ..................................... 364/746; 364/200
[58] Field of Search ......................................... 364/746

[56] References Cited

U.S. PATENT DOCUMENTS

| 3,137,788 | 6/1964 | Froggatt | 364/746 |
| 3,167,645 | 1/1965 | Hoffman et al. | 364/746 |
| 3,191,011 | 6/1965 | Baugh et al. | 364/746 |
| 3,609,328 | 9/1971 | Kieburtz | 364/746 |

FOREIGN PATENT DOCUMENTS

| 2,612,718 | 10/1976 | Fed. Rep. of Germany | 364/746 |
| 2,305,783 | 10/1976 | France | 364/746 |

OTHER PUBLICATIONS

Division and Overflow Detection in Residue Number Systems–Keir et al., 1962; IRE Transactions on Electronic Computers–Aug.; pp. 501–507.

Modular Arithmetic–An Ancient Science for a New Computer–Westinghouse Engineer; vol. 23, No. 4, Jul. 1963, pp. 112–114.

Self-Checked Computation Using Residue Arithmetic–Watson et al.–Proceedings of the IEEE–vol. 54, No. 12, Dec. 1966; pp. 1920–1930 and 1966.

New Techniques in Residual Arithmetic–Levine et al.–1960 Conference Proceedings–4th Nat'l. Convention on Military Electronics–pp. 183–189.

Primary Examiner—Harvey E. Springborn
Attorney, Agent, or Firm—Lackenbach, Lilling & Siegel

[57] ABSTRACT

According to the invention, the central processing unit for numbers represented in a system of residual classes comprises registers of first and second operands which are connected to generators, a multiplier, a divider, a shift unit, a modular arithmetic unit, and an analysis system. The analysis system is connected to sign registers, a result sign register, an overflow attribute register, and a result register. The result register is connected to the multiplier, the divider, the shift unit and the modular arithmetic unit. The invention makes it possible to develop a fundamentally novel family of computers operating with numbers in the system of residual classes.

25 Claims, 22 Drawing Figures

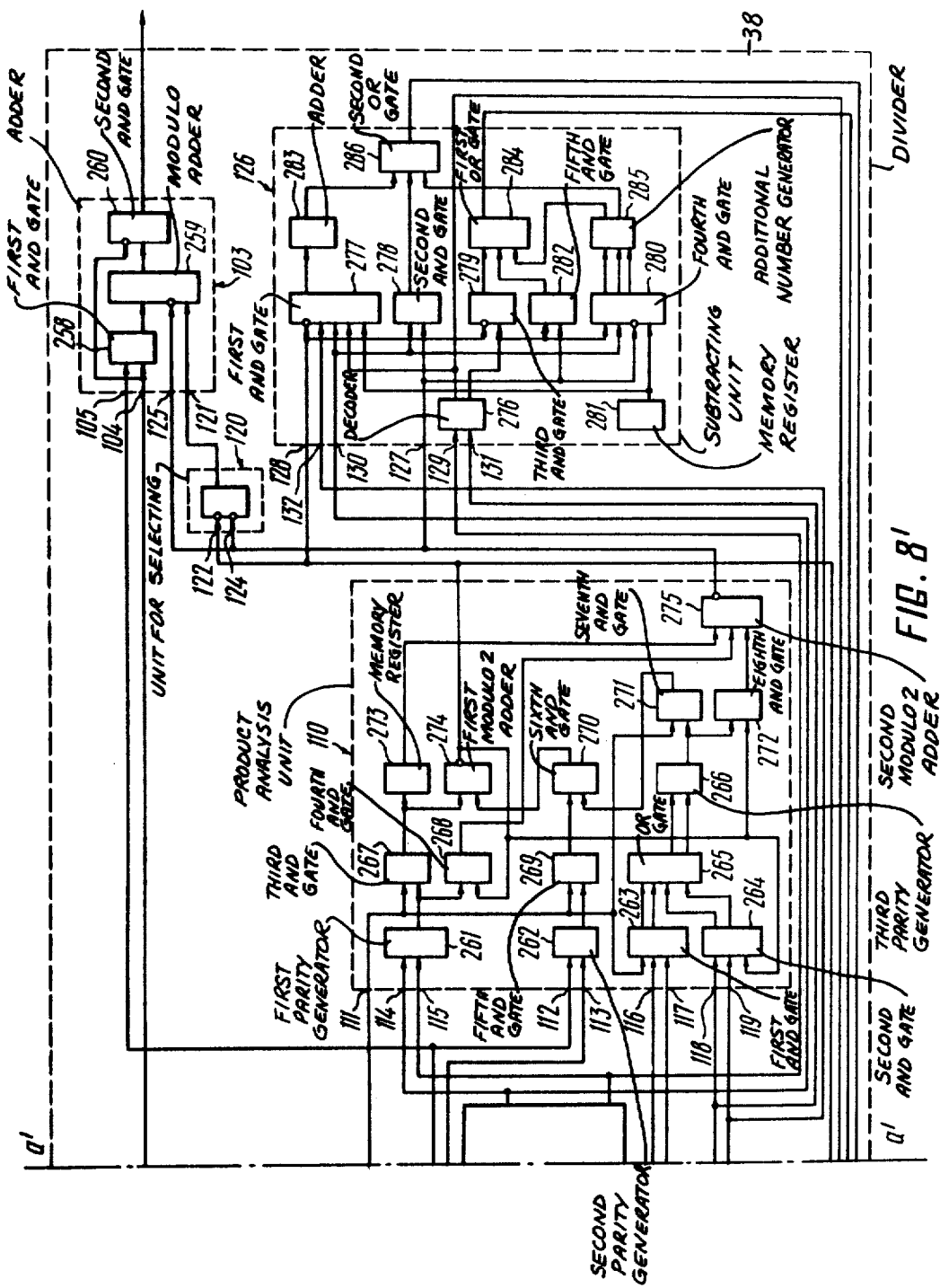

CENTRAL PROCESSING UNIT FOR NUMBERS REPRESENTED IN THE SYSTEM OF RESIDUAL CLASSES

BACKGROUND OF THE INVENTION

The present invention relates to devices for carrying out operations in a computer and, more particularly, to central processing unit intended to process operands represented in a system of residual classes (see the "Residue Code System", U.S. Pat. No. 3,602,704).

It is a generally recognized fact that the performance of a computer incorporating a processor which operates in the system or residual classes is markedly improved.

However, in order to develop a universal computer based on a processor which operates in the system of residual classes, it is necessary to perform a complete set of operations without any constraint as regards the initial operands.

A computer processor, which is intended for operands represented in the system of residual classes (cf. U.S.S.R. Inventor's Certificate No. 419,891 of Apr. 6, 1972), is known which comprises first and second operand registers with signs, their inputs being connected to first and second operand buses; a modular arithmetic unit whose inputs are connected to outputs of the first and second operand registers and to a control bus; an analysis system whose inputs are connected to outputs of the first and second operand registers, the control bus and an output of the modular arithmetic unit, one output of the analysis system being connected to an input of the modular arithmetic unit; and a result register with a sign, its input being connected to the output of the modular arithmetic unit, its second input being connected to a second output of the analysis system, its output being connected via a result output circuit to a result bus, an input of the result output circuit being connected to a third output of the analysis system.

The analysis system includes a checking circuit and a control circuit, first outputs of said circuits being connected via an OR gate to the second output of the analysis system, a second output of the checking circuit being connected to the third output of the analysis system.

The processor review operates as follows. During the first stage of operation, the first and second operand registers memorize the operands with signs.

Information on the signs of the operands is sent to the analysis system.

By a control signal indicating the type of operation to be performed, which may be any rational operation of multiplication, addition and subtraction, the modular arithmetic unit determines the result, which is stored in the result register, and the analysis system determines the sign of the result, which is stored in the sign digit of the result register. By a signal from the third output of the analysis system, the result is transmitted via the result output bus to the result bus.

A major disadvantage of the processor under review is the absence of units for multiplying and dividing arbitrarily chosen numbers.

In addition, the analysis system includes an analysis circuit which processes information in a strictly sequential order (the operation of "nullivization" see U.S. Pat. No. 3,602,704), which considerably reduces the operating speed of the processor under review and other processors of similar types.

FIELD OF THE INVENTION

For better understanding of the terms used in the present disclosure, there follows a brief description of the system of residual classes.

In the system of residual classes, a decimal number A is represented by an aggregate of residues resulting from the decimal A being divided by each of the coprime numbers $p_1, p_2, \ldots p_n$. If $\alpha_i$ is the residue from the division of the decimal number A by $p_i$, with $i = 1, 2 \ldots n$, A is represented in the system of residual classes like this;

$$A = (\alpha_1, \alpha_2 \ldots \alpha_n) \quad (1)$$

The coprime numbers $P_1, p_2 \ldots p_n$ are called bases of the system of residual classes.

The number P, which is equal to the product of all the bases of the system of residual classes, is called the range of the number system.

$$P = p_1 p_2 \ldots p_n \quad (2)$$

For example, consider a system of residual classes with three bases, i.e. $n = 3$. More specifically, $p_1 = 7$, $p_2 = 9$, and $p_3 = 11$. In this case, $P = 7 \cdot 9 \cdot 11 = 693$.

One of the criteria for selecting bases is the requirement that their product should be greater than the biggest number involved in addition, subtraction, division, multiplication or shifting operations.

Consider the decimal number $A = 128$ in the system of residual classes. By sequentially dividing $A = 128$ by each base, we will obtain residues: $\alpha_1 = 2$; $\alpha_2 = 2$; $\alpha_3 = 7$.

Thus, in the system of residual classes the decimal number $A = 128$ is expressed like this:

$$A = (2,2,7)$$

The limit value P of the number system range characterizes the set of numbers which be unambiguously represented in the system of residual classes.

In the foregoing example, the range of variation of the numbers unambiguously represented in the system of residual classes is within the interval (0, 692). The maximum number, which is unambiguously represented in the system of residual classes, is 692, because to each number from 0 to 692 there corresponds a unique set of residues. For example, the numbers 26 and 719 are represented in the same way:

$$26 = (5,8,4)$$

$$719 = (5,8,4)$$

The operation of finding a residue from the division of A by a base $p_i$ of the number system is expressed as follows:

$$A = \alpha_i \bmod p_i \quad (3)$$

The system of residual classes reviewed here is the most suitable for performing reasonable (modular) operations which are carried out during a single microcycle of a computer. In order to carry out reasonable operations with the aid of a machine, use is normally made of tabular arithmetic.

For example, we have two operands A and B represented in the system of residual classes like this:

$A = (\alpha_1, \alpha_2 \ldots \alpha_n)$, and $B = (\beta_1, \beta_2 \ldots \beta_n)$ where $A = \alpha_i \bmod p_i$, and $B = \beta_i \bmod p_i$, with $i = 1, 2 \ldots$ The result S of any reasonable operation (addition, subtraction, multiplication) involving the operands A and B can be expressed as follows:

$$S = A * B = (\gamma_1, \gamma_2 \ldots \gamma_n) \quad (4)$$

where $\gamma_i = \alpha_i * \beta_i \bmod p_i$, with $i = 1, 2 \ldots n$, and * designates an operation of addition, subtraction or multiplication.

Reasonable operations also include division of integers without a residue:

$$S = \frac{A}{B} = (\gamma_1, \gamma_2, \ldots, \gamma_n) \quad (5),$$

where $$\gamma_i = \frac{\alpha_i}{\beta_i} \bmod p_i,$$

with $i = 1, 2 \ldots n$.

For example, in the system of residual classes with the bases $p_1 = 7$, $p_2 = 9$, and $p_3 = 11$, the following reasonable operations involving the operands A and B can be carried out:

1. Add $A = 264 = (5,3,0)$ and $B = 377 \; (6, 8, 3)$.

$\gamma_1 = 5 + 6 = 4 \bmod 7$ $\gamma_2 = 3 + 8 = 2 \bmod 9$ $\gamma_3 = 0 + 3 = 3 \bmod 11$.

Hence, $S = (4,2,3) = 641$.

2. Find the difference between $A = 591 \; (3, 6, 8)$ and $B = 201 \; (5,3,3)$.

$\gamma_1 = 3 - 5 = -2 = 5 \bmod 7$ $\gamma_2 = 6 - 3 = 3 \bmod 9$ $\gamma_3 = 8 - 3 = 5 \bmod 11$.

Hence, $S = (5,3,5) = 390$.

3. Find the product of $A = 23 = (2,5,1)$ and $B = 25 = (4,7,3)$ $\gamma_1 = 2.4 = 2.4 = 1 \bmod 7$ $\gamma_2 = 5.7 = 35 = 8 \bmod 9$ $\gamma_3 = 1.3 = 3 \bmod 11$.

Hence, $S = (1,8,3) = 575$.

4. Find the quotient of the division of $A = 520 = (2,7,3)$ by $B = 40 = (5,4,7)$.

$\gamma_1 = \frac{2}{5} = \frac{2 + 4.7}{5} = 6 \bmod 7$ $\gamma_2 = \frac{7}{4} = \frac{7 + 9}{4} = 4 \bmod 9$ $\gamma_3 = \frac{3}{7} = \frac{3 + 11}{7} = 2 \bmod 11$.

Hence, $S = (6,4,2) = 13$.

The operation of finding the difference S between A and B can be expressed as follows:

$$S = A \cdot B = (\gamma_1, \gamma_2 \ldots \gamma_n) \quad (6),$$

where $\gamma_i = \alpha_i - \beta_i \bmod p_i$, with $i = 1, 2 \ldots n$.

In order to reduce the amount of the processor's equipment involved in addition and subtraction operations, the operation of subtraction can be replaced by the following:

1. Replace the operand B by its complement B' in the range P, i.e.

$$B' = P - B, \quad (7)$$

or in the system of residual classes $$B' = (\beta_1', \beta_2' \ldots \beta_n') \quad (8)$$

where $\beta_i' = p_i - \beta_i \bmod p_i$, with $i = 1, 2 \ldots n$.

2. Find the result S'' by adding the operand A and the operand B', i.e.

$$S'' = A + B' = (\gamma_1', \gamma_2' \ldots \gamma_n') \quad (9)$$

where $\gamma_i = \alpha_i + (p_i - \beta_i) = \alpha_i - \beta_i \bmod p_i$, with $i = 1, 2, \ldots n$. Hence, $S = S''$.

For example, in the system of residual classes with the bases $p_1 = 7$, $p_2 = 9$ and $p_3 = 11$, the operands A and B may be involved in a subraction operation.

Find the difference between $A = 573 = (6,6,1)$ and $B = 103 = = (5,4,4)$.

1. Find the complement B' of the subtrahend B in the range P. What we get is:

$\beta_1' = 7 - 5 = 2 \bmod 7$ $\beta_2' = 9 - 4 = 5 \bmod 9$ $\beta_3' = 11 - 4 = 7 \bmod 11$.

Hence, $B' = (2,5,7)$.

2. Find the difference S. We have $\gamma_1 = 6 + 1 \bmod 7$ $\gamma_2 = 6 + 5 = 2 \bmod 9$ $\gamma_3 = 1 + 7 = 8 \bmod 11$.

Hence, $S = (1, 2, 8) = 470$.

It is clear from the above the reasonable (modular) operations are carried out simultaneously and in parallel for each base $p_1, p_2 \ldots p_n$ of the number system, without any link between opposite residues of the operands involved in a reasonable operation, as is the case with systems of radix notation. In addition, in order to perform reasonable operations with the aid of a machine, use is made of tubular arithmetic, which makes it possible to dispense with carry circuits in adders involved in carrying out the reasonable (modular) operations. This makes it possible to add, for example, two operands represented in the system of residual classes during a single microcycle of a computer. With the use of the systems of radix notation, the possibility of carrying out such an operation is purely theoretical.

It should be borne in mind that the result of reasonable (modular) operations of addition, subtraction and multiplication will only be correct if the values of the operands involved in the operation and that of the result are found within the interval (O,P), i.e. are less than the limit value P of the number system.

When adding a pair of positive operands A and B represented in the system of residual classes, there may be a situation when the result is greater than the limiting value P of the number system range, i.e. $A + B > P$.

Suppose we add the operands $A = 264 = (5,3,0)$ and $B = 562 = = (1,3,0)$ represented in the system of residual classes: with the bases $p_1 = 7$, $p_2 = 9$ and $p_3 = 11$.

$$\gamma_1 = 5 + 1 = 6 \bmod 7$$
$$\gamma_2 = 3 + 3 = 6 \bmod 9$$
$$\gamma_3 = 0 + 0 = 0 \bmod 11.$$

Hence, $S = (6,6,0) = 132$. Yet in reality, $A + B = 264 + 561 = 825$.

This phenomenon is called an overflow. In the present disclosure, a signal as to the presence or absence of an overflow is designated as $\Omega$ and referred to as the overflow attribute. It is assumed that $$\Omega = \begin{cases} 1 \text{ if there is an overflow;} \\ 0 \text{ if there is no overflow.} \end{cases}$$

In order to determine the value of the overflow attribute $\Omega$ when algebraically adding operands A and B, each of the operands A and B must have a sign. An addition or subraction operation is carried out with due regard for the signs of the operands A and B.

In the present disclosure, Z designates information on the sign of the operands A and B; the subscript of Z corresponds to the operand to which the sign is related, i.e. $Z_A$ designates the sign of the operand A, $Z_B$ designates the sign of the operand B, and $Z_S$ is the sign of the result S of algebraically adding the operands A and B.

For greater convenience, it is assumed that $Z_A$, for example has the following values:

$$Z_A = \begin{cases} 0 \text{ if the sign of A is positive;} \\ 1 \text{ if the sign of A is negative.} \end{cases}$$

Consider now multiplication of arbitrarily chosen numbers represented in the system of residual classes.

Find the product of the operands $A = 379 = (1,1,5)$ and $B = 230 = (6,5,10)$.

$$\gamma_1 = 1 \cdot 6 = 6 \bmod 7$$
$$\gamma_2 = 1 \cdot 5 = 5 \bmod 9$$
$$\gamma_3 = 5 \cdot 10 = 50 = 6 \bmod 11$$

Hence, $S = (6,5,6) = 545$. Yet actually, $S = A \cdot B = 379 \cdot 230 = 87170$.

Clearly, the result of the foregoing reasonable (modular) operation of multiplication is incorrect, because the value of the result S is greater than the range $P = 693$ of the system of residual classes.

It is necessary therefore, when multiplying arbitrarily selected operands represented in the system of residual classes, that the result of multiplication should be found without imposing any limitations upon the values of the operands and that of the result, except that they should be within the range P of the number system.

There is introduced the concept of the result $S'$ of abridged multiplication, which is done by the rule;

$$S' = A \cdot B / P$$

Finding the value of the result $S'$ of abridged multiplication is the basic operation when multiplying operands in the system of residual classes.

In the foregoing example, the result $S'$ of abridged multiplication of the operands $A = 379$ and $B = 230$ is:

$$S' = \frac{87170}{693} = 125.$$

Obviously, if the results S of multiplying the operands A and B is less than the range P of the number system, the result $S'$ of abvidged multiplication is zero, i.e. $S' = 0$.

Farther, in machine representation, numbers are represented, as a rule, by proper fractions. For the system of residual classes, it is highly desirable that the function of the denominator should be performed by the limiting value P of the number system range. In this case we have the following operands:

$$A' = A/P, \; B' = B/P \tag{11}$$

The result of multiplication of the operands A' and B' is then expressed as follows:

$$A' \cdot B' = A/P \cdot B/P = \frac{A \cdot B}{P^2} = \frac{S'}{P} \tag{12},$$

where $S' = A \cdot (B/P)$.

Thus, multiplication of fractions in the system of residual classes also boils down to finding the result $S'$ of abridged multiplication of the fraction numerators of the operands A' and B'.

When dividing arbitrarily selected operands represented in the system of residual classes, there arise difficulties in determining the result of the division, as in the case of multiplication.

Consider the result S of dividing the operand $A = (5,7,10) = 439$ by the operand $B = (2,5,9) = 86$. S is found by using the reasonable operation of dividing A by B. What we find is:

$$\gamma_1 = \frac{5}{2} = \frac{5 + 7}{2} = 6 \bmod 7$$
$$\gamma_2 = \frac{7}{5} = \frac{7 + 2 \cdot 9}{5} = 5 \bmod 9$$
$$\gamma_3 = \frac{10}{9} = \frac{10 + 4 \cdot 11}{9} = 6 \bmod 11.$$

Hence, $S = (6,5,6) = 545$.
Yet actually $$S = \frac{A}{B} = \frac{439}{86} = 5 \frac{9}{86}.$$

Thus, the result of the reasonable (modular) operation is incorrect, because the operand A is not exactly divided by the operand B.

When dividing arbitrarily selected operands represented in the system of residual classes, it is therefore necessary to find the integer part of the result of the division, without imposing any limitations upon the value of the operand A which is the dividend.

It is a generally recognized fact that in order to carry out operations of multiplication, division and finding an overflew attribute, it is not enough to known the residues of the operands involved in the operation. Such operations require information on the value of the numher in the radix notation, for example, the decimal system, which is presented either in the form of a rank (cf. I. Ya. Akushsky, D. I. Yuditsky, "Machinnaya arifmetika v ostatochnykh klassakh"/"Machine Arithmetic in Residual Classes"/, Sovietskoye Radio Publishers, Moscow, 1968) or by resorting to a number system with mixed bases (cf. N. S. Szabo, R. J. Tanaka, Residue Arithmetic and Its Applications to Computer Technology, McGraw-Hill Book Company, New-York, 1967).

Operations which require information on the value of a number in the radix notation are called non-modular. Apart from multiplying fractions and integers, dividing integers and determining an overflow attribute, non-modular operations include division of fractions, division by a base of the number system, etc.

In the present disclosure, the position attribute R denotes information on the value of a number in the radix notation.

The subscript of the position attribute R corresponds to the number, to which the position attribute is related. Thus, the position attribute of the operand A is designated as $R_A$, the position attribute of the operand B is designated as $R_B$, etc.

SUMMARY OF THE INVENTION

It is an object of the present invention to provide a central processing unit, which would make it possible to carry out operations of multiplying, dividing and shifting arbritrarily selected numbers represented in the system of residual classes.

The invention essentially residues in providing a central processing unit for numbers represented in the system of residual classes comprising first and second operand registers intended for storing the first and second operands, their inputs being connected to input buses of the first and second operands, respectively; a modular arithemetic unit intended for carrying out the operations of multiplication, subtraction and addition within the range of the number system, its first and second inputs being connected to outputs of the first and second operand registers, respectively, its third input being connected to a control bus; first and second sign registers intended for storing the signs of the first and second operands, their inputs being connected to first and second input sign buses, respectively; an analysis system intended for determining the sign of the result of an operation and the overflow attribute, its first and second inputs being connected to the outputs of the first and second operand registers, respectively, its third and fourth inputs being connected to outputs of the first and second sign registers, respectively, its fifth input being connected to the control bus, its first output being connected to the fourth input of the modular arithmetic unit; a result register intended for storing the result of an operation, its first input being combined with the sixth input of the analysis system and being connected to the output of the modular arithmetic unit, its output being connected to an output result bus; a result sign register intended for storing the sign of the result, its input being connected to a second output of the analysis system, its output being connected to an output result sign bus; a first generator and a second generator intended for calculating the position attributes of the first and second operands, respectively their inputs being connected to the outputs of the first and second operand registers, respectively, the outputs of the first and second generator's being connected to a seventh input and an eighth inut respectively, of the analysis system; a multiplier, a divider and a shifting device, which is intended for shifting one of the operands their first inputs being combined and connected to the control bus, second inputs of said divider and said shifting device being combined and connected to an output of the second generator, third inputs of said divider and said shift device and a second input of said multiplier being combined and connected to the output of the second operand register, a fourth input of the divider and a third input of said multiplier being combined and connected to the output of the first operand register, a fifth input of the divider is connected to an output of the first generator, outputs of the divider, the multiplier and a first output of the shifting device being respectively connected to the second, third and fourth inputs of the result register, a second output of the shift unit being connected to a ninth input of the analysis system and an overflow attribute register intended for storing the overflow attribute when adding and subtracting the first and second operands, its input being connected to a third output of the analysis system, its output being connected to an output overflow attribute bus.

It is desirable that in the proposed processor, the analysis system should comprise an operation decoder intended for converting a control signal into a binary code corresponding to an operation being performed, its input being connected to the fifth input of the analysis system; eleven AND-gates, first inputs of the first, second, third, fourth, fifth, sixth, seventh and eighth AND-gates being combined and connected to a first output of the operation decoder, second inputs of the samd AND-gates and a second input of the eleventh AND-gate being respectively connected to the fifth, third, fourth, first, seventh, second, eighth, sixth and ninth inputs of the analysis system, a first input of the ninth AND-gate being connected to a second output of the operation decoder, second and third inputs of the ninth AND-gate being connected to the third and fourth inputs, respectively, of the analysis system, a first input of the tenth AND-gate being connected to the fourth input of the analysis system, a second input of the tenth AND-gate being combined with a first input of the eleventh AND-gate and being connected to a third output of the operation decoder; an analysis unit intended to determine the sign of the result and the overflow attribute in adding and subracting the first and second operands; first and second OR-gates; a modulo 2 adder intended to form the sign of the result of multiplication and division, its first and second inputs being connected to first and second outputs of the ninth AND-gate; first and second inputs of the first OR-gate being respectively connected to outputs of the modulo 2 adder and the tenth AND-gate, its output being connected to the second output of the analysis system, a first input of the second OR-gate being connected to an output of the eleventh AND-gate, its output being connected to the third output of the analysis system, a third input of the first OR-gate a second input of the second OR-gate being respectively connected to third and fourth outputs of the analysis unit whose first, second and fifth outputs are combined with the first output of the analysis system, its inputs being respectively connected to the outputs of the first, second, third, fourth, fifth, sixth, seventh and eighth AND-gates.

The shifting device of the processor can incorporate a decoder intended for converting a control signal into a code corresponding to the shifting operation being performed, its input being connected to the first input of the shifting device; first and second AND-gate units, their first inputs being combined and connected to the output of the decoder, the second inputs being combined and connected to the third input of the shifting device, the third inputs being combined and connected to the second input of the shifting device; a first shift unit intended for shifting the second operand one binary bit to the right, whose inputs are connected to the outputs of the first AND-gate unit; a second shift unit intended for shifting the second operand one binary bit to the left, whose inputs are connected to the outputs of the second AND-gate unit, the second output being connected to the second output of the shifting device; and an OR-gate unit, its inputs being connected, respectively, to the output of the first shift unit and to the first output of the second shift unit, and the output being connected to the first output of the shifting device.

The first shift unit can incorporate a parity generator intended for forming the parity value of a number, its inputs being connected to the inputs of the first shift unit; and a division unit intended for dividing a number by two, its first input being connected to the first input of the first shift unit, its second input being connected to the output of the parity generator, and the output being connected to the output of the first shift unit.

The second shift unit can incorporate a position attribute generator intended for calculating the position attribute of the shifted number, its input being connected to the first input of the second shift unit, a shift circuit intended for multiplying the shifted number by two; its first and second inputs being connected to the first and second inputs of the second shift unit, respectively and its first output being connected to the first output of the second shift unit, and a comparison circuit, its first input being connected to the second output of the shift circuit, the second input being connected to output of the position attribute generator, and the output being connected to the second output of the second shift unit.

The foregoing object is attained by providing a division device for dividing numbers represented in the system of residual classes, which comprises, in accordance with the invention, a divisor analysis unit intended for the selection of an elementary divisor, its first input being connected to a multichannel divisor bus (the third input of the division unit); a division unit intended for dividing a dividend and a divisor by an elementary divisor with the aid of position attributes, its first multichannel input being connected to a multichannel dividend bus (the fourth input of the division unit), its first input being connected to a dividend position attribute bus (the fifth input of the division unit), its multichannel input being connected to the multichannel divisor bus (the third input of the division unit), its second and third inputs being connected to respective outputs of the divisor analysis unit, its fourth input being connected to a divisor position attribute bus (the second input of the division unit), a an eighth of the division unit being combined with a second input of the divisor analysis unit and being connected to a control bus (the first input of the division unit) intended to initiate a start division signal; an end of iteration unit intended to analyze the value of a partial quotient, whose multichannel input is connected to a first multichannel output of the division unit and a multichannel input of the divisor analysis unit, its output being connected to a fifth input of the division unit and a third input of the divisor analysis unit; and end of division unit intended to determine the end of the division process, an input being connected to an output of the end of iteration unit, a multichannel input being connected to a second multichannel output of the division unit, its output being connected to a sixth input of the division unit and a fourth input of the divisor analysis unit; an adder intended to accumulate partial quotients and give the result at the end of the division process, a first input being connected to an output of the end of division unit, a first multichannel input being connected to the second multichannel output of the division unit, its multichannel output being connected to a multichannel output bus; a multiplier intended to produce of the partial quotient by the divisor while the division process is not yet completed, a first input being connected to an output of the end of division unit, a first multichannel input being connected to the second multichannel output of the division unit, a second multichannel input being connected to the multichannel divisor bus; a product analysis unit, a first input being connected to the output of the end of division unit, a first multichannel input being connected to the second multichannel output of the division unit, a second input being connected to the first output of the division unit, a second multichannel input and a third input being connected to a multichannel output and an output of the multiplier, respectively, a third multichannel input being connected to the multichannel divisor bus, a fourth input being connected to the divisor position attribute bus, a fourth multichannel input and a fifth input being connected to a third multichannel output and a second output of the division unit, respectively; a unit for selecting the operating conditions of the adder, whose output is connected to a second input of the adder, a first input being combined with a second input of the multiplier and connected to a first output of the product analysis unit, a second input being connected to a second output of the product analysis unit and a third input of the adder; a subtracting unit intended to produce a new dividend, first and second inputs being connected to the second and first outputs of the product analysis unit, respectively, a first multichannel input and a third input being connected to the multichannel output and the output of the multiplier, respectively, a second multichannel input and a fourth input being connected to the third multichannel output and the second output, respectively, of the division unit, a first multichannel output and a first output being connected to a third multichannel input and a seventh input of the division unit, a second output being connected to a third input of the multiplier.

It is expedient that the division unit should comprise a first logical unit and a second logical unit respectively intended to distribute the divisor and dividend over the subunits of the division unit; a first halver whose multichannel input and its input are connected to a first multichannel output and a first output of the first logical unit, respectively; a first unit for division by a predetermined base of the system of residual classes, its multichannel input and its input being connected to a second multichannel output and a second output of the first logical unit; a first OR-gate unit whose multichannel input is connected to a first multichannel output of the halver, its first input being connected to an output of the halver, its second multichannel input and its second input being connected to a multichannel output and an output, respectively, of the unit for division by a predetermined base, its multichannel output and its output being connected to a first multichannel input and a first input, respectively, of the first logical unit; a second halver whose multichannel input and its input are connected to a first multichannel output and a first output, respectively, of the second logical unit; a second unit for division by a predetermined number system base whose multichannel input and its input are connected to a second multichannel output and a second output, respectively, of the second logical unit; a memory register intended to store the dividend, its multichannel input and its input being connected to a third multichannel output and a third output, respectively, of the second logical unit; a second OR-gate unit whose first multichannel input and first input are connected to a multichannel output and an output of the second halver, its second multichannel input and second input being connected to a multichannel output and an output of the second unit for division by a predetermined number system base, its multichannel output and its output being connected to a first multichannel input and a first input of the second logical unit, respectively, the second multichannel input, the second input and the third input of the first logical unit being respectively connected to the second multichannel input, the fourth input and the second input of the division unit, a fourth input and a fifth input of the first logical unit being respectively combined with third and second inputs of the second logical unit and connected to the third and fifth inputs of the division unit, a second multichannel input, a fourth input, a fifth input, a third multichannel input, a sixth input and a seventh input of the second logical unit being respectively connected to the first multichannel input, the first input, the eighth input, the third multichannel input, the seventh input and the sixth input of the division unit, the multichannel output of the first OR-gate unit, the multichannel output and the output of the second OR-gate unit, the multichannel output and the output of the memory register being respectively connected to the first multichannel output, the second multichannel output, first output, the third multichannel output and the second output of the division unit.

It is also expedient that the unit for division by a predetermined number system base should include series-connected first and second groups of decoders, first inputs of the second group of decoders being connected to first inputs of the first group decoders and respective channels of the multichannel input of the unit for division by a predetermined number system base, second inputs of the first group of decoders and of the second group of decoders being combined and connected to a respective channel of the multichannel input of the unit for division by a predetermined number system base; a predetermined modulo adder its first inputs being connected to first outputs of the first group of decoders, its second inputs being connected to the outputs of the second group of decoders, its third input being connected to the input of the unit for division by a predetermined number system base; a first decoder whose input is connected to an output of the predetermined modulo adder; an adder, its first group of inputs being connected to the first outputs of the first group of decoders, its second group of inputs being connected to the outputs of the second group of decoders, its third input being connected to a first output of the first decoder, the second output of said first decoder being connected to a respective channel of the multichannel output of the unit for division by a predetermined number system base, its fourth input being connected to the input of the unit for division by and a predetermined number system base; and a second decoder whose input is connected to the output of the adder and whose output is connected to output of the unit for division by a predetermined base.

It is preferable that the halver should include a first group of decoders; a modulo 2 adder, its multichannel input being connected to outputs of the first group of decoders; a position attribute decoder whose output is connected to an input of the modulo 2 adder; a second group of decoders, first inputs of the decoders being connected to the output of the modulo 2 adder, second of the decoder inputs being combined with inputs of the decoders of the first group of decoders and being connected to the multichannel input of the halver, outputs of the second group of decoders being connected to the multichannel output of the halver; an adder whose multichannel input is connected to the second outputs of the decoders of the second group of decoders, whose input is combined with the input of the position attribute decoder and connected to the input of the halver; a division result position attribute decoder whose input is connected to the output of the adder, and whose output is connected to the output of the halver.

The multiplier of the divider may include a decoder intended for forming the product of the divisor and partial quotient, its first and second multichannel inputs being respectively connected to the first and second multichannel inputs of the multiplier, a first AND-gate unit, its input being connected to the first input of the multiplier, its multichannel input being connected to a multichannel output of the decoder; a second AND-gate unit, its first input and second input being respectively connected to the second and third inputs of the multiplier, a first OR-gate unit whose first and second multichannel inputs are respectively connected to multichannel outputs of the first and second AND-gate units; a second OR-gate unit whose first and second multichannel inputs are respectively connected to the multichannel output of the second AND gate and to the multichannel output of the decoder and whose multichannel output is connected to the multichannel output of the multiplier and generator intended to calculate the position attribute of the number represented in the system of residual classes, its multichannel input being connected to a multichannel output of the first OR-gate unit, its output being connected to the output of the multiplier.

The device intended, according to the invention, for multiplying numbers represented in the system of residual classes comprises a first correction generator intended for calculating the multiplicand correction, its first input being connected to a multiplicand bus (the third input of the multiplier), its second input being connected to a control bus (the first input of the multiplier); a first subtraction unit intended for calculating the difference between the multiplicand and the multiplicand correction, its first input being connected to the output of the first correction generator, its second input being connected to the multiplicand bus and its third input being connected to the control bus; a first division unit intended for calculating the first quotient resulting from the division of the multiplicand difference and the multiplicand correction by one part of the number system range limit value, its input being connected to the output of the first subtraction unit; a second correction generator intended for calculating the multiplier correction, its first input being connected to a multiplier bus and its second input being connected to the control bus (the second input of the multiplier); a second subtraction unit intended for calculating the difference between the multiplier and the multiplier correction, its first input being connected to the output of the second correction generator, its second input being connected to the multiplier bus and its third input being connected to the control bus; a second division unit intended for calculating the second quotient resulting from the division of the multiplier and multiplier correction by the other part of the number system range limit value, its input being connected to the output of the second subraction unit; a multiplication unit intended for calculating the product of the first and second quotients, the product of the multiplicand correction multiplied by the second quotient and the product of the multiplier correction multiplied by the first quotient, its first input being connected to an output of the first division unit, its second input being connected to an output of the second division unit, its third and fourth inputs being connected, respectively, to the multiplicand bus and multiplier bus, its fifth and sixth inputs being connected, respectively, to the outputs of the first and second correction generators, its seventh input being connected to the control bus, its first output being connected to a third input of the first correction generator and a fourth input of the first substraction unit and its second output being connected to a third input of the second correction generator and a fourth input of the second subtraction unit; and a modulo adders unit itended for calculating the product of the multiplicand and multiplier, its first, second and third inputs being connected, respectively, to third, fourth and fifth outputs of the multiplication unit, and its output being connected to a product bus (the output of the multiplier).

It is preferable that the first and second correction generators of the multiplying device be made similarly and each should comprise a logical unit intended for selecting the required information depending on the control signal, its inputs being connected respectively, to the inputs of the respective correction generator; a position attribute generator intended for calculating the position attribute of the selected information, its input being connected to the output of the logical unit; and a generator of residues, its first input being connected to the output of the position attribute generator, its second input being connected to the output of the logical unit and its output being connected to the output of the respective correction generator.

It is also preferable that the generator of residues of the multiplying device comprise a required number of residue calculating units, each being intended for calculating a single residue and including a decoder having its input connected to the first input of the generator of residues, a group of decoders, each of the decoders having its input connected to the second input of the generator of residues, and a specified modulus adder having its inputs connected to the outputs of the decoder and the group of decoders, respectively and its output connected to the output of the generator of residues.

The first and second division units of the multiplying device should preferably be identical and each should comprise a decoders unit having its input connected to the input of the respective division unit and its output connected to the output of the respective division unit, a position attribute generator, and a generator of residues having its first input, which is combined with the input of the position attribute generator, connected to the output of the decoders unit, its second input connected to the output of the position attribute generator and its output connected to the output of the respective division unit.

The data analysis unit of the analysis system, which ensures the formation of an overflow attribute when algebraically adding two operands in the system of residual classes, comprises, in accordance with the invention, a first parity generator intended to calculate the parity of the first operand, a second parity generator intended to calculate the parity of the second operand, a third parity generator intended to calculate the parity of the algebraic sum of the first and second operands, first multichannel inputs of the first and second parity generators being respectively connected to input buses of the first and second operands (the fourth and sixth inputs of the analysis unit), the inputs of the first and second parity generators being respectively connected to position attribute buses of the first and second operands (the fifth and seventh inputs of the analysis unit), a position attribute generator intended to calculate the algebraic sum of the first and second operands, its multichannel input being connected to a third input bus (eighth input of the analysis with) and a first multichannel input of the third parity generator, the input of the third generator being connected to an output of the position attribute former, a logical unit intended to form the overflow attribute and the sign of the algebraic sum of the first and second operands, its first, second and third inputs being respectively connected to the outputs of the first, second and third parity generators, its fourth and fifth inputs being respectively connected to sign buses of the first and second operands (second and third inputs of said analysis unit), its sixth input being connected to a control bus (the first input of the analysis unit), its first and second outputs being respectively connected to a sign bus of the algebraic sum of the first and second operands and an overflow attribute bus.

It is preferable that in the proposed data analysis unit, the logical unit should include a first modulo 2 adder, its first and second inputs being respectively connected to the fourth and fifth inputs of the logical unit; an operation code decoder whose input is connected to the sixth input of the logical unit and whose output is connected to a third input of the first modulo 2 adder; a first AND-gate, a first input being connected to an inverting output of the first modulo 2 adder, a second input being connected to the fourth input of the logical unit; an OR-gate, its first input being connected to an output of the first AND gate, an output of the OR-gate being connected to the first output of the logical unit, a constant register; second, third and fourth AND-gates; a second modulo 2 adder, its first input being connected to an output of the second AND-gate, its second, third and fourth inputs being respectively connected to the first, second and third inputs of the logical unit, its output being connected to first inputs of the third and fourth AND-gates, a second input of the third AND-gate being connected to the first input of the second AND gate and an output of the constant register, an inverting output of the third and gate being connected to a second input of the OR-gate, a second input of the second AND-gate being connected to a direct output of the first modulo 2 adder, the inverting output of said first modulo 2 adder being connected to a second input of the fourth AND-gate, the output of the fourth AND-gate being connected to the second output of the logical unit.

It is preferable that in the proposed data analyzer, the logical unit should include a fifth AND-gate, a first input being connected to the fourth input of the logical unit, a second input being connected to the direct output of the first modulo 2 adder, direct and inverting outputs of said fifth AND-gate being connected to first and second auxiliary outputs, respectively, of the logical unit. Said logical unit should also include a sixth AND-gate whose first input is connected to the direct output of the first modulo 2 adder, whose second input is connected to an inverting output of the third AND-gate, and whose output is connected to a third auxiliary output of the logical unit.

It is advisable that the position attribute generator should include a group of decoders, the input of each decoder being connected to the multichannel input of the position attribute decoder, and a modular adder whose multichannel input is connected to the output of each of the decoders in the group of decoders, its output being connected to the output of the position attribute generator.

It is preferable that the first, second and third parity generators should be identical, and that each should include a memory register; a group of AND-gates, a first input of each AND gate being connected to a multichannel output of the memory register, a second input of each AND-gate being connected to the first multichannel input of the parity generator; a modulo 2 adder whose multichannel input is connected to an output of each of the AND-gates of the group of AND-gates, whose second input is connected to the input of the parity generator, and whose output is connected to the output of the parity generator.

The present invention makes it possible to evolve a fundamentally new family of computers operating in the system of residual classes.

The proposed processor is composed of separate units, each performing an individual operation and working independently of the other units. This makes it possible to select the processor's structure on the basis of the specific requirements of the user.

In addition, the processor operates in the system of residual classes, which makes it possible to construct a channel-type processor (a processor having an individual channel for each base of the number system), and thus increase raise the operating speed and reliability of the computer as a whole.

Other objects and advantages of the present invention will become more apparent from the following detailed description of a preferred embodiment thereof, taken in conjunction with the accompanying drawings, wherein:

DETAILED DESCRIPTION OF THE INVENTION

Figure 1:
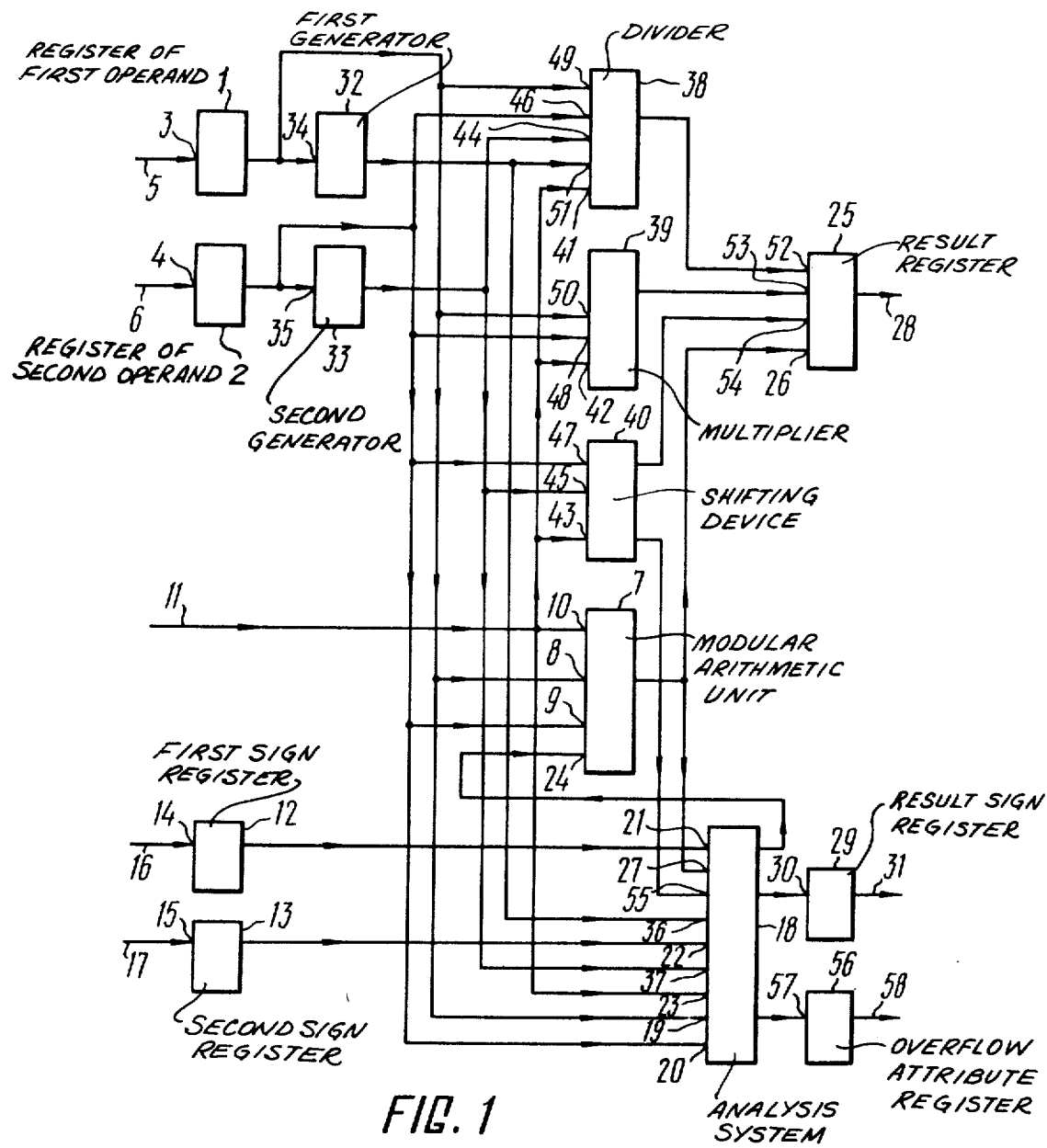
FIG. 1 is a block diagram of a processor in accordance with the invention.

The processor of a computer for numbers represented in the system of residual classes comprises registers 1 and 2 (FIG. 1) of first and second operands.

An input 3 of the register 1 and an input 4 of the register 2 are connected to input buses 5 and 6 of the first and second operands, respectively.

The processor further comprises a modular arithmetic unit 7 whose first input 8 and second input 9 are respectively connected to outputs of the first operand register 1 and second operand register 2. A third output 10 of the modular arithmetic unit 7 is connected to a control bus 11.

The processor also comprises first and second sign registers 12 and 13. An input 14 of the register 12 and an input 15 of the register 13 are connected to first and second sign buses 16 and 17, respectively.

The processor still further comprises an analysis system 18 whose first input 19 and second input 20 are connected to outputs of the first operand register 1 and second operand register 2, respectively. A third input 21 and a fourth input 22 of the analysis system 18 are connected to outputs of the first sign register 12 and second sign register 13, respectively. A fifth input 23 is connected to the control bus 11. A first output is connected to a fourth input 24 of the modular arithmetic unit 7.

The processor includes a result register 25 whose first input 26 is combined with a sixth input 27 of the analysis system 18 and connected to an output of the modular arithmetic unit 7; an output of the result register 25 is connected to an output result bus 28.

The processor also includes a result sign register 29 whose input 30 is connected to a second output of the analysis system 18; an output of the result sign register 29 is connected to an output result sign bus 31.

The processor also includes a first generator 32 and a second generator 33.

An input 34 of the generator 32 and an input 35 of the generator 33 are connected to the outputs of the first and second operands, respectively; outputs of the generators 32 and 33 are connected to a seventh input 36 and an eighth input 37 of the analysis system 18, respectively.

The processor includes a multiplier 39, a divider 38, and a shifting device 40, their first inputs 42, 41 and 43 being combined and connected to the control bus 11, second inputs 44 and 45 of the divider 38 and the shifting device 40 being combined and connected to an output of the second generator 33, third inputs 46 and 47 of the divider device 38 and the shifting device 40 and a second input 48 of the multiplier 39 being combined and connected to the output of the second operand register 2, a fourth input 49 of the divider 38 and a third input 50 of the multiplier 39 being combined and connected to the output of the first operand register 1, and a fifth input 51 of the divider 38 being connected to the output of the first generator 32.

An output of the divider 38 and the multiplier 39 and a first output of the shifting device 40 are connected to a second input 52, a third input 53 and a fourth input 54, respectively, of the result register 25.

A second output of the shifting device 40 is connected to a ninth input 55 of the analysis system 18.

The processor further includes an overflow attribute register 56 whose input 57 is connected to a third output of the analysis system 18 and whose output is connected to an output overflow attribute bus 58.

According to the invention, the analysis system 18 comprises an operation decoder 59 (FIG. 2) whose input 60 is connected to the fifth input 23 of the analysis system 18. The analysis system also includes eleven AND-gates 61, 62, 63, 64, 65, 66, 67, 68, 69, 70 and 71.

Fifth inputs of the first AND-gate 61, the second AND-gate 62, the third AND-gate 63, the fourth AND-gate 64, the fifth AND-gate 65, the sixth AND-gate 66, the seventh AND-gate 67 and the eighth AND-gate 68 are combined and connected to a first output of the operation decoder 59; second inputs of the first through eighth AND-gates 61 68 and a second input of the eleventh AND-gate 71 are respectively connected to the fifth input 23, the third input 21, the fourth input 22, the first input 19, the seventh input 36, the second input 20, the eighth input 37, the sixth input 27 and the ninth input 55 of the analysis system 18.

A first input of the ninth AND-gate 69 is connected to a second output of the operation decoder 59; second and third inputs of said ninth AND-gate 69 are connected to the third input 21 and fourth input 22, respectively, of the analysis system 18.

A first input of the tenth AND-gate 70 is connected to the fourth input 22 of the analysis system 18; a second input of said tenth AND-gate 70 is combined with a first input of the eleventh AND-gate 71 and connected to a third output of the operation decoder 59.

The analysis system 18 further comprises an analysis unit 72, a first OR-gate 73, a second OR-gate 74, and a modulo 2 adder 75.

First and second inputs of the modulo 2 adder 75 are connected to first and second outputs, respectively, of the ninth AND-gate 69.

First and second inputs of the first OR-gate 73 are connected to outputs of the modulo 2 adder 75 and the tenth AND-gate 70, respectively; an output of said OR-gate 73 is connected to the second output of the analysis system 18.

A first input of the second OR-gate 74 is connected to an output of the eleventh AND-gate 71; an output of said second OR-gate 74 is connected to the third output of the analysis system 18.

A first input 76, a second input 77, a third input 78, a fourth input 79, the fifth input 80, the sixth input 81, the seventh input 82 and an eighth input 83 of the analysis unit 72 are respectively connected to outputs of the first AND-gate 61, the second AND-gate 62, the third AND-gate 63, the fourth AND-gate 64, the fifth AND-gate 65, the sixth AND-gate 66, the seventh AND-gate 67 and the eighth AND-gate 68. First, second and fifth outputs of the analysis unit 72 are combined and connected to the first output of the analysis system 18; a third output of the analysis unit 72 is connected to a third input of the first OR-gate 73; a fourth output is connected to a second input of the second OR-gate 74.

The divider 38 for dividing numbers represented in the system of residual classes comprises a divisor analysis unit 84 (FIG. 3), a first input 85 being connected to a multichannel divisor bus 46 (the first input of the divider) a division unit 86, a first multichannel input 87 being connected to a multichannel dividend bus (the fourth input of the divider) 49, a first input 88 being connected to a dividend position attribute bus 51 (the fifth input of the divider), a second multichannel input 89 being connected to the multichannel divisor bus 46, a second input 90 being connected to a first output of the divisor analysis unit 84, a third input 91 being connected to a second output of the divider analysis unit 84, and a fourth input 92 being connected to a divisor position attribute bus 44 (the second input of the divider).

The divider 38 further comprises an end of iteration unit 93 whose multichannel input 94 is connected to a first multichannel output of the division unit 86 and a multichannel input 95 of the divisor analysis unit 84. An output of the end of the iteration unit 93 is connected to a fifth input 96 of the division unit 86 and a third input 97 of the divisor analysis unit 84.

The divider 38 still further comprises an end of division unit 98, having an input 99 connected to the output of the end of iteration unit 93, a multichannel input 100 connected to a second multichannel output of the division unit 86, and an output connected to a sixth input 101 of the division unit 86 and a fourth input 102 of the divisor analysis unit 84.

The divider 38 includes an adder 103 having a first input 104 connected to the output of the end of division unit 98, a multichannel input 105 connected to the second multichannel output of the division unit 86, and a multichannel output connected to a multichannel output bus (the output of the divider).

The divider 38 further includes a multiplier 106, having a first input 107 connected to the output of the end of division unit 98, a first multichannel input 108 connected to the second multichannel output of the division unit 86, and a second multichannel input 109 is connected to the multichannel divisor bus 46.

The divider 38 then includes a product analysis unit 110 having a first input 111 connected to the output of the end of division unit 98, a first multichannel input 112 connected to the second multichannel output of the division unit 86, a second input 113 connected to a first output of the division unit 86, a second multichannel input 114 and a third input 115 connected to a multichannel output and an output of the multiplier 106, respectively, a third multichannel input 116 connected to the multichannel divisor bus 46, a fourth input 117 connected to the dividend position attribute bus 44, and a fourth multichannel input 18 and a fifth input 119 connected to a third multichannel output and a second output, respectively, of the division unit 86.

The divider 38 includes a unit 120 for selecting the operating conditions of the adder having an output connected to a second input 121 of the adder 103, a first input 122 combined with a second input 123 of the multiplier 106 and connected to a first output of the product analysis unit 110, and a second input 124 combined with a third input 125 of the adder 103 and connected to a second output of the product analysis unit 110.

The divider 38 includes a subtracting unit 126 whose first input 127 and second input 128 are connected to the second and first outputs, respectively, of the product analysis unit 110, whose first multichannel input 129 and third input 130 are connected to the multichannel output and the output of the multiplier 106, whose second multichannel input 131 and fourth input 132 are connected to the third multichannel output and the second output, respectively, of the division unit 86, whose multichannel output and first output are connected to a third multichannel input 133 and a seventh input 134, respectively, of the division unit 86, and whose second output is connected to a third input 135 of the multiplier 106.

An eighth input 136 of the division unit 86 is combined with a second input 137 of the divisor analysis unit 84 and connected to a control bus 41 (the first input of the divider).

Figure 4:
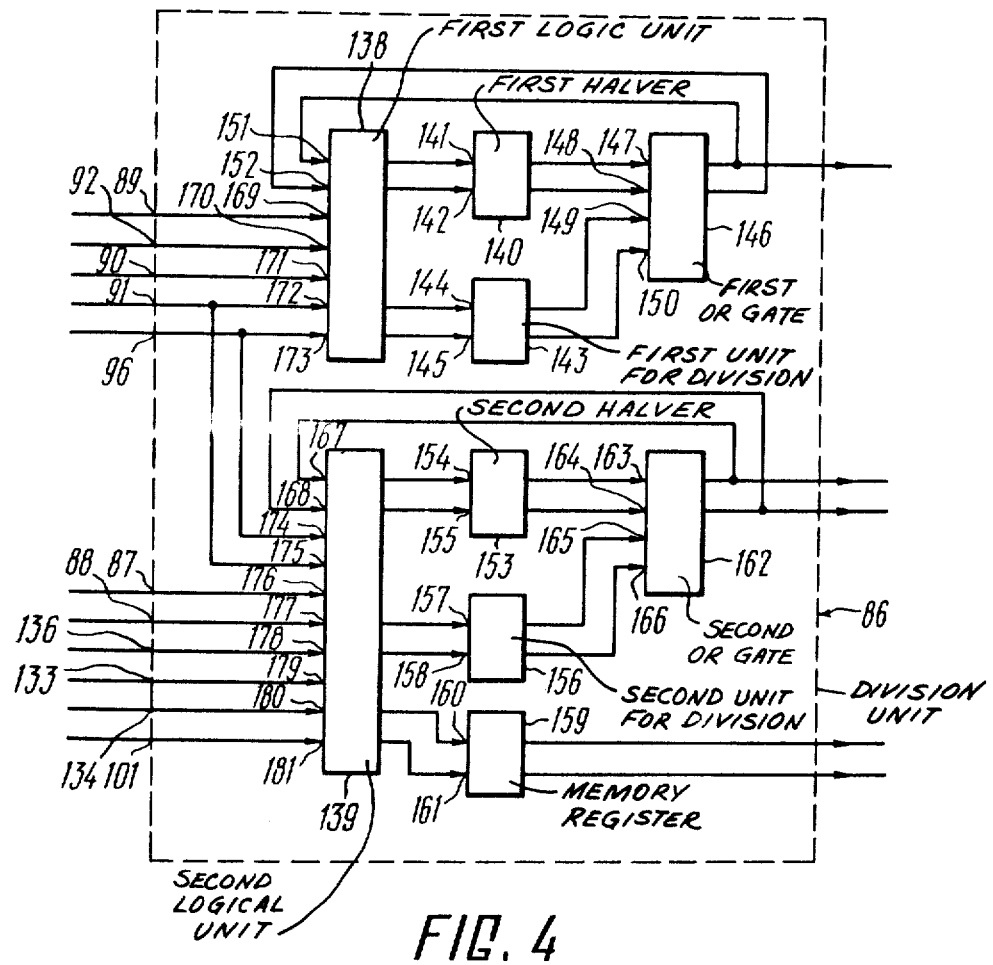
FIG. 4 is a block diagram of a division unit of the divider in accordance with the invention.

The division unit 86 of the divider 38 (see FIG. 4) comprises a first logical unit 138, a second logical unit 139, and a first halver 140, its multichannel input 141 and input 142 being connected to a first multichannel output and a first output, respectively, of the first logical unit 138.

The division unit 86 further includes a first unit 143 for division by a predetermined notation system base, having a multichannel input 144 and an input 145 connected to a second multichannel output and a second output, respectively, of the first logical unit 138.

The division unit 86 further includes a first OR-gate unit 146 whose first multichannel input 147 and first input 148 are connected to a multichannel output and an output of the halver 140, whose second multichannel input 149 and second input 150 are connected to a multichannel output and an output, respectively, of the unit 143 for division by a predetermined number system base. A multichannel output and an output of the OR-gate unit 146 are connected to a first multichannel input 151 and a first input 152 of the first logical unit 138, respectively.

The division unit 86 includes a second halver 153 whose multichannel input 154 and input 155 are connected to a first multichannel output and a first output of the second logical unit 139.

The division unit 86 includes a second unit 156 for division by a predetermined number system base whose multichannel input 157 and input 158 are connected to a second multichannel output and a second output, respectively, of the second logical unit 139.

The division unit 86 also comprises a memory register 159 whose multichannel input 160 and input 161 are connected to a third multichannel output and a third output of the second logical unit 139.

The division unit 86 includes a second OR-gate unit 162 whose first multichannel input 163 and first input 164 are connected to a multichannel output and an output of the second halver 153, and whose second multichannel input 165 and second input 166 are connected to a multichannel output and an output of the second unit 156 for division by a predetermined number system base. A multichannel output and an output of the second OR-gate unit 162 are connected to a first multichannel input 167 and a first input 168 of the second logical unit 139.

A second multichannel input 169, a second input 170 and a third input 171 of the first logical unit 138 are respectively connected to the second multichannel input 89, the fourth input 92 and the second input 90 of the division unit 86.

A fourth input 172 and a fifth input 173 of the first logical unit 138 are respectively combined with a third input 175 and a second input 174 of the second logical input 139 and connected to the third input 91 and the fifth input 96 of the division unit 86. A second multichannel input 176, a fourth input 177, a fifth input 178, a third multichannel input 179, a sixth input 180 and a seventh input 181 of the second logical unit 139 are respectively connected to the first multichannel input 87, the first input 88, the eighth input 136, the third multichannel input 133, the seventh input 134 and the sixth input 101 of the division unit 86.

The multichannel output of the first OR-gate unit 146, the multichannel output and the output of the second OR-gate unit 162, and the multichannel output and the output of the memory register 159 are respectively connected to the first multichannel output, the second multichannel output, the first output, the third multichannel output and the second output of the division unit 86.

Figure 5:
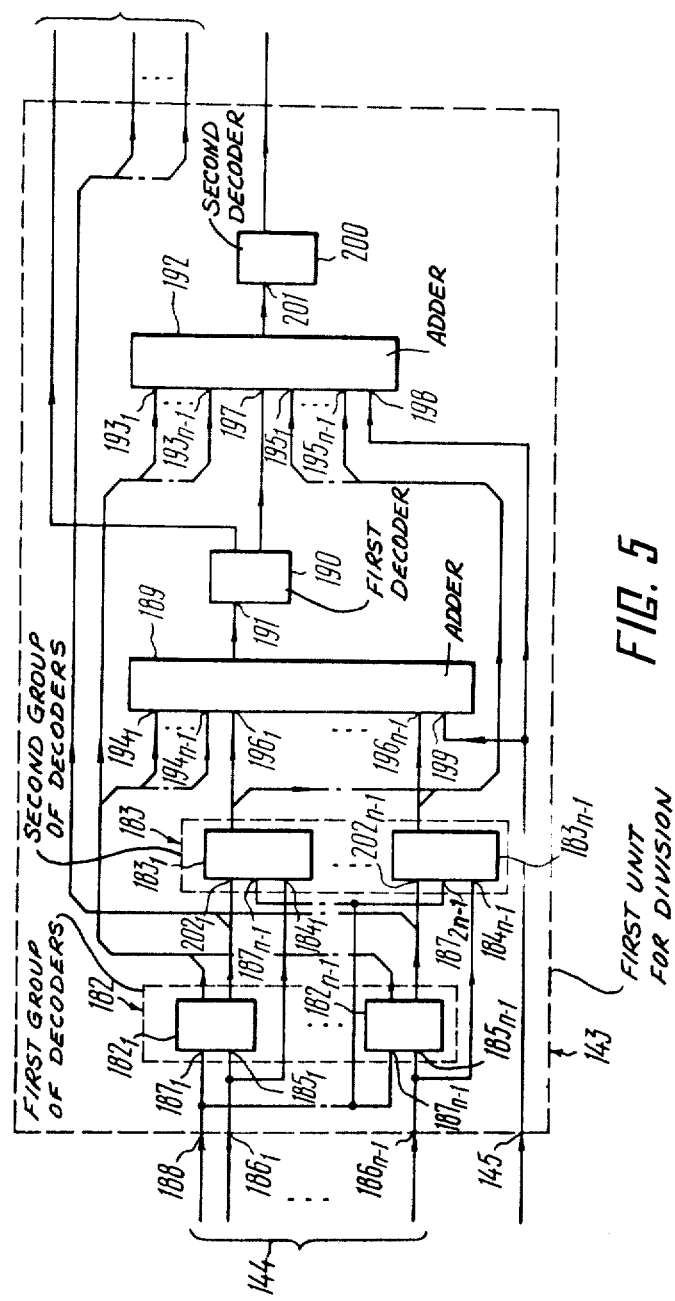
FIG. 5 is a block diagram of a unit for division by a first number system base of the division unit in accordance with the invention.

The unit 143 for division by a predetermined number system base of the division unit 86 (see FIG. 5) comprises a first group 182 of decoders $182_1 \ldots 182_{n-1}$ and a second group 183 of decoders $183_1 \ldots 183_{n-1}$.

First inputs $184_1 \ldots 184_{n-1}$ of the decoders $183_1 \ldots 183_{n-1}$ are respectively connected to first inputs $185_1 \ldots 185_{n-1}$ of the decoders $182_1 \ldots 182_{n-1}$ and to inputs $186_1 \ldots 186_{n-1}$ of the multichannel input 144 of the unit 143 for division by a predetermined number system base.

Second inputs $187_1 \ldots 187_{n-1}$ of the decoders $182_1 \ldots 182_{n-1}$ are combined with second inputs $137_{n+1} \ldots 187_{2n-1}$ of the decoders $183_1 \ldots 183_{n-1}$ and connected to a respective input 188 of the multichannel input 144 of the unit 143.

The inputs 188 and $186_1 \ldots 186_{n-1}$ make up the multichannel input 144 of the unit 143.

The unit 143 further includes a predetermined modulo adder 189; a first decoder 190 whose input 191 is connected to an output of the predetermined modulo adder 189; and an adder 192, its first inputs $193_1 \ldots 193_{n-1}$ being combined with respective first inputs $194_1 \ldots 194_{n-1}$ of the adder 189 and connected to first outputs of the decoders $182_1 \ldots 182_{n-1}$. Second inputs $195_1 \ldots 195_{n-1}$ of the adder 192 are combined with respective second inputs $196_1 \ldots 196_{n-1}$ of the predetermined modulo adder 189 and connected to outputs of the decoders $183_1 \ldots 183_{n-1}$. A third input 197 of the adder 192 is connected to a first output of the first decoder 190. A fourth input 198 of the adder 192 is combined with a third input 199 of the adder 189 and connected to the input 145 of the unit 143 for division by a predetermined base. The unit 143 still further includes a second decoder 200 whose input 201 is connected to the output of the adder 192. An output of the second decoder 200 is connected to the output of the unit 143 for division by a predetermined base.

Second outputs of the decoders $182_1 \ldots 182_{n-1}$ are respectively connected to third inputs $202_1 \ldots 202_{n-1}$ of the decoders $183_1 \ldots 183_{n-1}$; the same second outputs of the decoders $182 \ldots 182_{n-1}$ and a second output of the first decoder 190 are connected to the outputs of the unit 143 and make up the multichannel output of said unit 143. The second unit 156 for division has a construction similar to that of the first unit 143 for division.

The halver 140 of the division unit 86 (see FIG. 6) of decoders $203_1 \ldots 203_n$.

The halver 140 further comprises a modulo 2 adder 204 having a multichannel input 205 with inputs $205_1 \ldots 205_n$ connected to outputs of the decoders $203_1 \ldots 203_n$.

The halver 140 still further comprises a position attribute decoder 206 whose output is connected to an input 207 of the modulo 2 adder 204.

The halver 140 includes a second group 208 of decoders $208_1 \ldots 208_n$.

First inputs $209_1 \ldots 209_n$ of the decoders $208_1 \ldots 208_n$ are combined and connected to the output of the modulo 2 adder 204.

Second inputs $210_1 \ldots 210_n$ of the decoders $208_1 \ldots 208_n$ are combined with respective inputs $211_1 \ldots 211_n$ of the decoders $203_1 \ldots 203_n$ of the first group 203 of decoders and connected to the multichannel input 141 of the halver 140.

First outputs of the decoders $208_1 \ldots 208_n$ of the second group 208 of decoders are connected to the multichannel output of the halver 140.

The halver 140 includes an adder 212 whose multichannel input 213 with inputs $213_1 \ldots 213_n$ is connected to second outputs of the decoders $208_1 \ldots 208_n$ of the second group 208 of decoders.

A second input 214 of the adder 212 is combined with an input 215 of the position attribute decoder 206 and connected to the input 142 of the halver 140.

The halver 140 further includes a decoder 216 of the position attribute of the result of division, whose input 217 is connected to an output of the adder 212. An output of the decoder 216 of the position attribute of the result of division is connected to the output of the halver 140. The second halver 154 has a construction similar to that of the first halver 140.

The multiplier 106 of the divider 38 (see FIG. 7.) comprises a decoder 218 whose first and second multichannel inputs 219 and 220 are connected to the first multichannel input 108 and the second channel input 109, respectively, of the multiplier 106.

The multiplier 106 further comprises a first AND-gate unit 221. An input 222 of the AND-gate unit 221 is connected to the first input 107 of the multiplier 106 and a multichannel input 223 of the AND-gate unit 221 is connected to a multichannel output of the decoder 218.

The multiplier 106 includes a second AND-gate unit 224. A first input 225 and a second input 226 of the second AND-gate unit 224 are connected to the second input 123 and the third multichannel input 135, respectively, of the multiplier 106.

The multiplier 106 then includes a first OR-gate unit 227. A first multichannel input 228 and a second multichannel input 229 of the OR-gate unit 227 are respectively connected to multichannel outputs of the first AND-gate unit 221 and of the second AND-gate unit 224.

The multiplier 106 also includes a generator 230. A multichannel input 231 of the generator 230 is connected to a multichannel output of the first AND-gate unit 227 and an output of the generator is connected to the output of the multiplier 106.

The multiplier 106 still further includes a second OR-gate 232 whose first multichannel input 233 is connected to a multichannel output of the second AND-gate 225, and whose whereas its second multichannel input 234 is connected to the multichannel output of the decoder 218. A multichannel output of the second gate 232 OR-gates is connected to the multichannel output of the multiplier 106.

Figure 8:
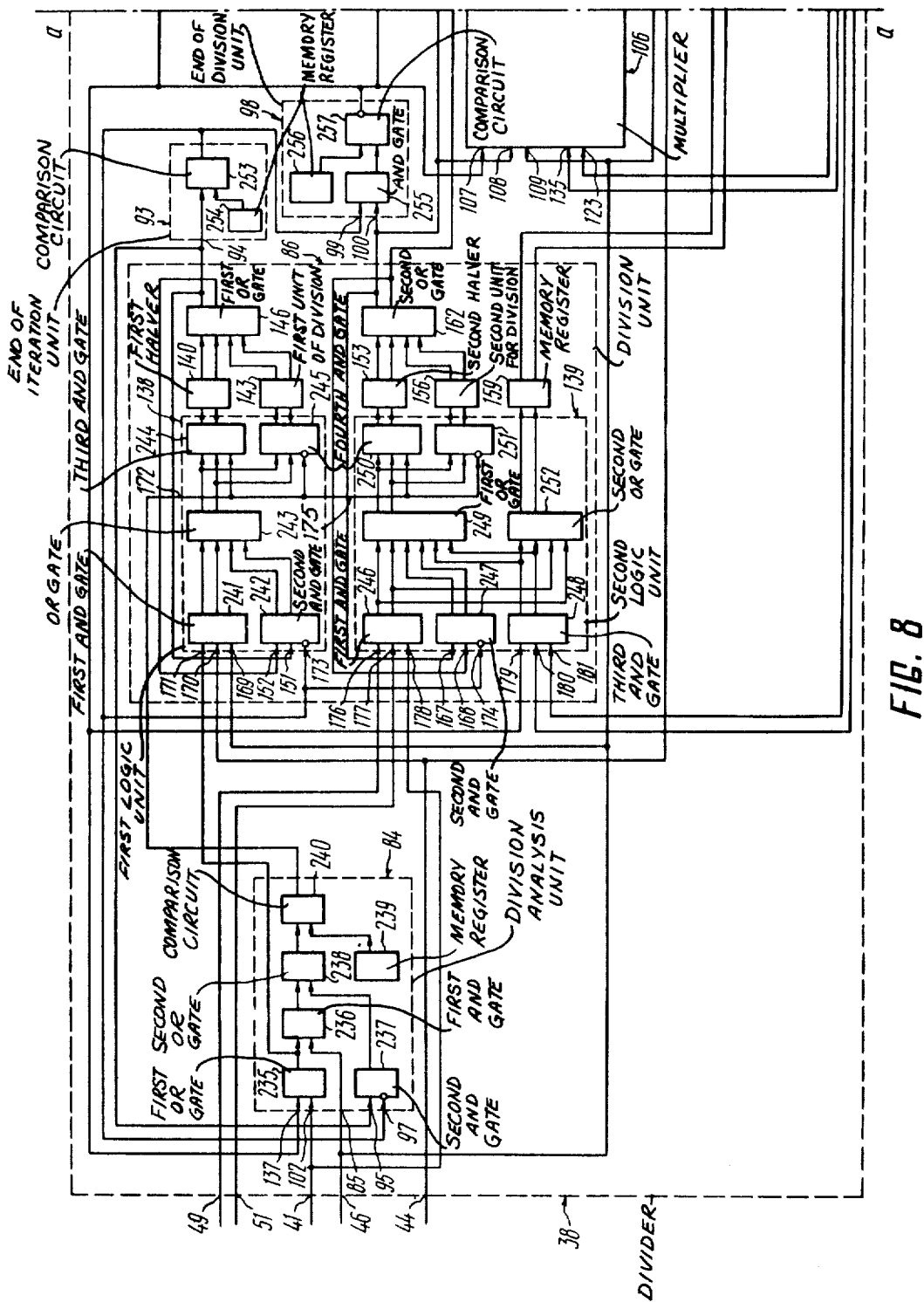
FIGS. 8 and 8' are a detailed block diagram of the divider in accordance with the invention.

FIGS. 8 and 8' show a detailed block diagram of the proposed divider 38.

The junction line of FIGS. 8 and 8' is the line aa.

The divisor analysis unit 84 of the divider 38 comprises a first OR-gate 235 whose inputs are connected to the second input 137 and the fourth input 102, respectively, of the divisor analysis unit 84.

The unit 84 also includes a first AND-gate 236 having a first input connected to an output of the first OR-gate 235 and to the first output of the unit 84, and a second input connected to the first input 85 of the unit 84.

The unit 84 has a second AND-gate 237 whose inputs are connected to the multichannel input 95 and the third input 97, respectively, of said unit 84. One input of the second AND-gate 237 is an inverting input.

The unit 84 further includes a second OR-gate 238 having a first input connected to an output of the first AND-gate 236 and a second input connected to an output of the second AND-gate 237.

The unit 84 includes a memory register 239 whose output is connected to a first input of a comparison circuit 240, a second input of said comparison circuit being connected to an output of the second OR-gate 238, an output of the comparison circuit being connected to the second output of the unit 84.

The division unit 86 of the divider 38 comprises the first logical unit 138 and is shown in the detailed diagram presented in FIG. 8.

The first logical unit 138 comprises a first AND-gate 241 whose inputs are connected to the third input 171, the second input 170 and the second multichannel input 169, respectively, of the first logical unit 138.

The first logical unit 138 includes a second AND-gate 242 whose inputs are connected to the first input 152, the first multichannel input 151 and the fifth input 173, respectively, of the first logical unit 138.

One of the inputs of the AND-gate group 242 is inverting.

The first logical unit 138 also includes an OR gate 243 whose inputs are connected to outputs of the first AND gate 241 and second AND-gate 242.

The first logical unit 138 includes a third AND-gate 244 and a fourth AND-gate 245, their two first inputs being combined and connected to outputs of the OR gate 243, their third inputs being combined and connected to the fourth input 172 of the first logical unit 138.

One of the inputs of the fourth AND-gate 245 is inverting.

Outputs of the third AND gate 244 and the fourth AND-gate 245 are connected to the respective outputs of the first logical unit 138.

The division unit 86 also comprises the second logical unit 139 whose detailed diagram is shown in FIG. 8.

The second logical unit 139 includes a first AND-gate 246 whose inputs are connected to the second multichannel input 176, the fourth input 177 and the fifth input 178, respectively, of the second logical unit 139.

The second logical unit 139 includes a second AND gate 247 whose inputs are connected to the first multichannel input 167, the first input 168 and the second input 174, respectively, of the second logical unit 139.

One of the inputs of the second AND-gate 247 is inverting.

The second logical unit 139 includes a third AND-gate 248 whose inputs are connected to the third multichannel input 179, the sixth input 180 and the seventh input 181, respectively, of the second logical unit 139.

The second logical unit 139 further includes a first OR-gate 249 whose inputs are connected to outputs of the first AND-gate 246, the second AND-gate 247 and the third AND gate 248.

The second logical unit 139 still further includes a fourth AND-gate 250 and a fifth AND-gate 251, their two first inputs being combined and connected to outputs of the first OR-gate 249, their third inputs being combined and connected to the third input 175 of the second logical unit 139.

One of the inputs of the fourth AND-gate 251 is inverting.

The second logical unit 139 then includes a second OR-gate 252 whose inputs are connected to outputs of the first AND gates 246 and third AND-gate 248.

Outputs of the fourth AND-gate 250 and the fifth AND-gate 251 and those of the second OR-gate 252 are connected to the respective outputs of the second logical unit 139.

The end of iteration unit 93 of the divider 38 comprises a comparison circuit 253 and a memory register 254. One of the inputs of the comparison circuit 253 is connected to the multichannel input 94 of the end of iteration unit 93, its other input being connected to an output of the memory register 254. An output of the comparison circuit 253 is connected to the output of the end of iteration unit 93.

The end of division unit 98 comprises an AND-gate 255 whose inputs are connected to the input 99 and the multichannel input 100 of the end of division unit 98.

The unit 98 also comprises a memory register 256 and a comparison circuit 257. The inputs of the comparison circuit 257 are connected to outputs of the memory register 256 and the AND-gate 255, respectively. The inverting output of the comparison circuit 257 is connected to the output of the end of division unit 98.

The adder 103 (FIG. 8') of the divider 38 has a first AND-gate 258 whose inputs are connected to the first multichannel input 105 and the first input 104, respectively, of the adder 103.

The adder 103 also includes a modulo adder 259, its inputs being connected to an output of the first AND-gate 258, the third input 125 and the second input 121, respectively, of the adder 103.

One of the inputs of the modulo adder 259 is inverting.

The adder 103 further includes a second AND-gate 260, one of its inputs being connected to the first input 104 of the adder 103 and its other input being connected to an output of the modulo adder 259.

An output of the second AND-gate 260 is connected to the output of the adder 103.

The product analysis unit 110 comprises a first parity generator 261 whose inputs are connected to the second multichannel input 114 and the third input 115 of the product analysis unit 110.

The unit 110 also comprises a second parity generator 262, its inputs being connected to the first multichannel input 112, and the second input 113, respectively, of the product analysis unit 110.

The unit 110 also includes a first AND-gate 263 whose inputs are respectively connected to the first input 111, the third multichannel input 116 and the fourth input 117 of the unit 110.

The unit 110 includes a second AND-gate 264 whose inputs are connected to the fourth multichannel input 118 and the fifth input 119, respectively, of the unit 110.

The unit 110 also includes an OR gate 265 whose inputs are connected to outputs of the first AND gate 263 and of the second AND-gate 264.

The unit 110 has a third parity generator 266 whose inputs are connected to outputs of the OR-gates 265.

The unit 110 still further has a third AND-gate 267, a fourth AND-gate 268, a fifth AND-gate 269, a sixth AND-gate 270, a seventh AND-gate 271 and an eighth AND-gate 272.

First inputs of the AND-gates 267, 269 and 271 and a third input of the first AND-gate 263 are combined and connected to the first input 111 of the unit 110. A second input of the third AND-gate 267 is combined with a first input of the fourth AND circuit 268 and connected to an output of the first parity generator 261. A second input of the fifth AND-gate 269 is connected to an output of the second parity generator 262 and its output is connected to one of the first input of the sixth AND-gate 270. A second input of the seventh AND-gate 271 is combined with a first input of the eighth AND-gate 272 and connected to an output of the third parity generator 266 and its output is connected to a second input of the sixth AND-gate 270.

The product analysis unit 110 also includes a memory register 273 and a first modulo 2 adder 274. An input of the memory register 273 is combined with a first input of the first modulo 2 adder 274 and connected to the output of the third AND-gate 267. A second input of the first modulo 2 adder 274 is connected to the output of the sixth AND-gate 270 and its inverting output is connected to the first output of the unit 110, the second input of the fourth AND-gate 268, the third input of the second AND-gate group 264 and the second input of the eighth AND-gate 272.

The unit 110 includes a second modulo 2 adder 275 whose inputs are connected to an output of the memory register 273, an output of the fourth AND-gate 268 and an output of the eighth AND-gate 272, respectively, its inverting output being connected to the second output of the product analysis unit 110.

The subtracting unit 126 comprises a decoder 276 whose inputs are connected to the first multichannel input 129 and the second multichannel input 131, respectively, of the subtracting unit 126. The first output of the decoder is connected to the third output of the unit 126.

The subtracting unit 126 further comprises a first AND-gate 277, a second AND gate 278, a third AND gate 279 and a fourth AND-gate 280.

The inverting input of the first AND-gate 277 is combined with the inverting input of the third AND gate 279 and connected to the second input 128 of the unit 126. The first input of the first AND gate 277 is connected to the fourth input 132 of the unit 126. The second input of the first AND-gate 277 is combined with the first input of the second AND-gate 278 and the second input of the fourth AND gate 280 and connected to the third input 130 of the unit 126. The third input of the first AND-gate 277 is connected to the first output of the decoder 276.

The unit 126 still further comprises a memory register 281 whose output is connected to the fourth input of the first AND gate 277 and the third input of the fourth AND-gate 280.

The unit 126 also includes a fifth AND-gate 282 whose first input is combined with the first input of the fourth AND-gate 280 and the input of the third AND-gate 279, and is connected to the second output of the decoder 276. The second input of the fifth AND-gate 282 is combined with the second input of the second AND-gate 278 and the inverting input of the fourth AND-gate 280 and connected to the first input 127 of the unit 126.

The unit 126 includes an adder 283 whose input is connected to an output of the first AND-gates 277.

The unit 126 includes a first OR-gates 284 of OR-gates whose first and second inputs are connected to outputs of the third AND-gate 279 and the fifth AND-gate 282 and whose output is connected to the first output of the unit 126.

The unit 126 also includes an additional number generator 285 whose inputs are respectively connected to outputs of the fourth AND-gate 280, its first output being connected to the third input of the first OR-gates 284 of OR-gates.

The unit 126 then includes a second OR-gates 286 of OR-gates whose inputs are respectively connected to an output of the adder 283, an output of the second AND-gate 278 and a second output of the additional number generator 285, its output being connected to the second output of the unit 126.

Figure 9:
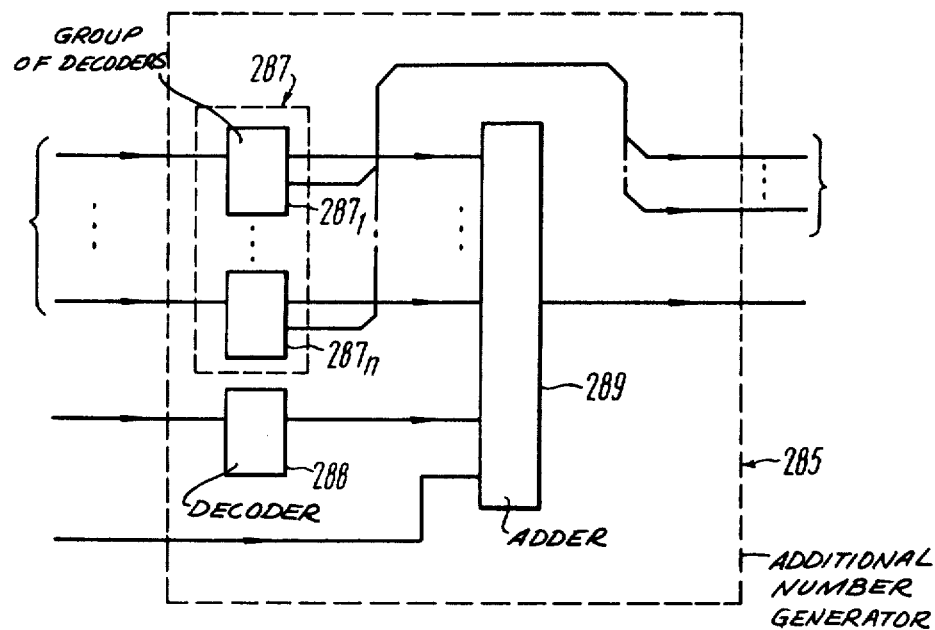
FIG. 9 is a block diagram of an additional number generator in accordance with the invention.

FIG. 9 shows a detailed diagram of the additional number generator 285. The generator 285 comprises a group 287 of decoders $287_1 \ldots 287_n$, the inputs of the decoders being connected to the first input of the generator 285.

The generator 285 also includes a decoder 288 whose input is connected to the second input of the generator 285.

The generator 285 includes an adder 289 whose inputs are connected to first outputs of the decoders $287_1 \ldots 287_n$ of the group 287 of decoders, an output of the decoder 288 and the third input of the generator 285. Second outputs of the decoders $287_1 \ldots 287_n$ are connected to the first output of the generator 285.

The output of the adder 289 is connected to the second output of the generator 285.

Figure 10:
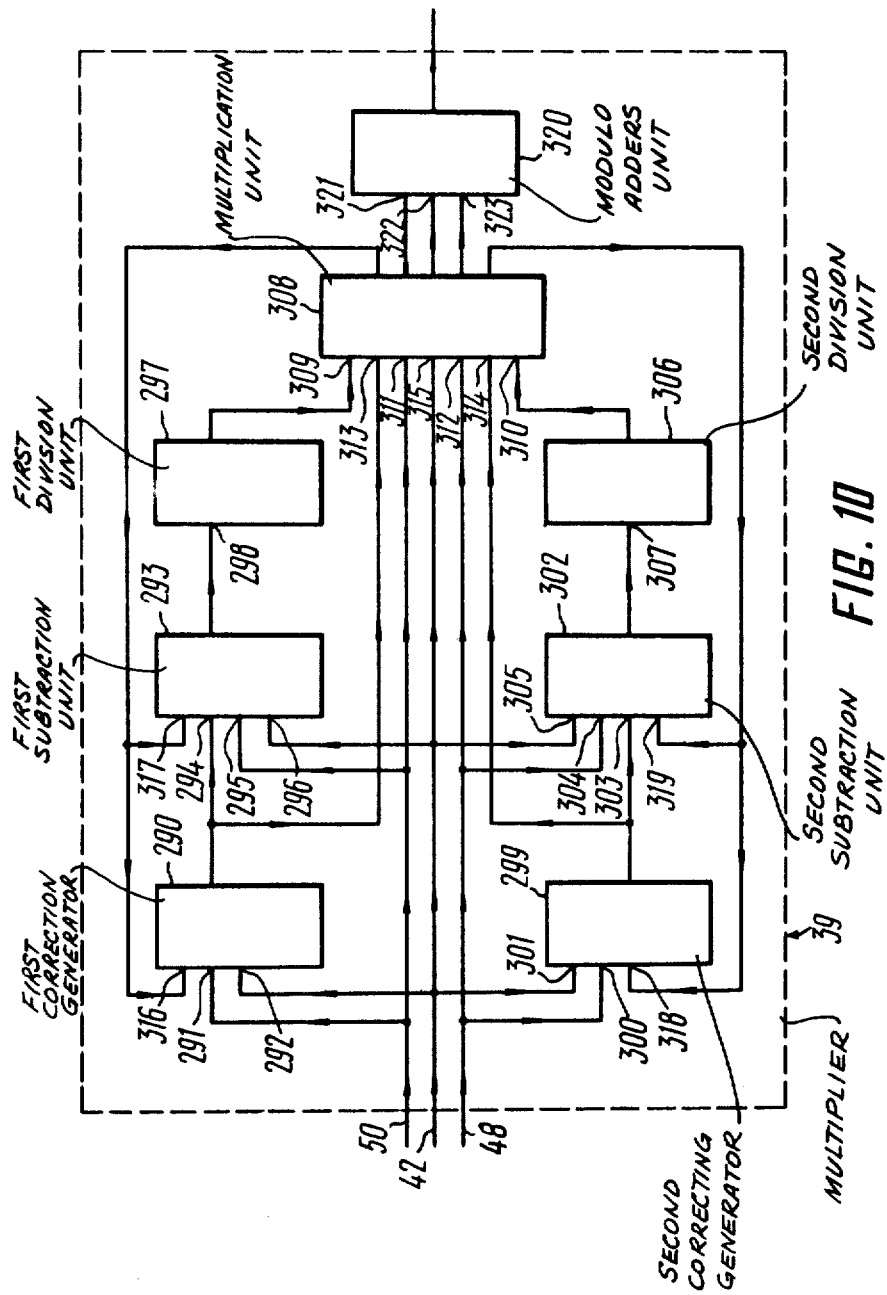
FIG. 10 is a block diagram of a multiplier according to the invention.

The multiplier 39 for multiplying numbers represented in the system of residual classes comprises a first correction generator 290 (FIG. 10) whose first input 291 is connected to a multiplicand bus 50 (the third input of the multiplier 39) and whose second input 292 is connected to a control bus 42 (the second input of the multiplier 39).

The multiplying device 39 also comprises a first subtraction unit 293 having its first input 294 connected to the output of the first correction generator 290, its second input 295 connected to the multiplicand bus 50 and its third input 290 connected to the control bus 42.

The multiplying device 39 further includes a first division unit 297 whose input 298 is coupled to an output of the first subtraction unit 293.

In addition, the multiplying device 39 comprises a second correction generator 299 whose first input 300 is connected to a multiplier bus 48 (the second input of the multiplier 39) and whose second input 301 is connected to the control bus 42.

The multiplying device also includes a second subtraction unit 302 having its first input 303 connected to an output of the second correction generator 299, its second input 304 connected to the multiplier bus 48 and its third input 305 connected to the control bus 42.

The multiplying device 39 further includes a second division unit 306 whose input 307 is coupled to an output of the second subtraction unit 302.

The multiplying device 39 additionally comprises a multiplication unit 308 with its first input 309 being connected to an output of the first division unit 297, its second input 310 being connected to an output of the second division unit 306, its third input 311 and fourth input 312 being connected, respectively, to the multiplicand bus 50 and the multiplier bus 47, its fifth input 313 and sixth input 314 being connected, respectively, to outputs of the first and second correction generators 290 and 299, its seventh input 315 being connected to the control bus 42, its first output being connected to a third input 316 of the first correction generator 290 and to a fourth input 317 of the first subtraction unit 293, and its second output being connected to a third input 318 of the second correction generator 299 and to a fourth input 319 of the second subtraction unit 302.

The multiplying device 39 finally comprises a modulo adders unit 320 whose first, second and third inputs 321, 322 and 323, are connected, respectively, to the third, fourth and fifth outputs of the multiplication unit 308, the output of the unit 320 being connected to a product bus (the output of the multiplier 39).

The first and second correction generators 290 and 299 are similar, and for convenience only one is illustrated.

Figure 11:
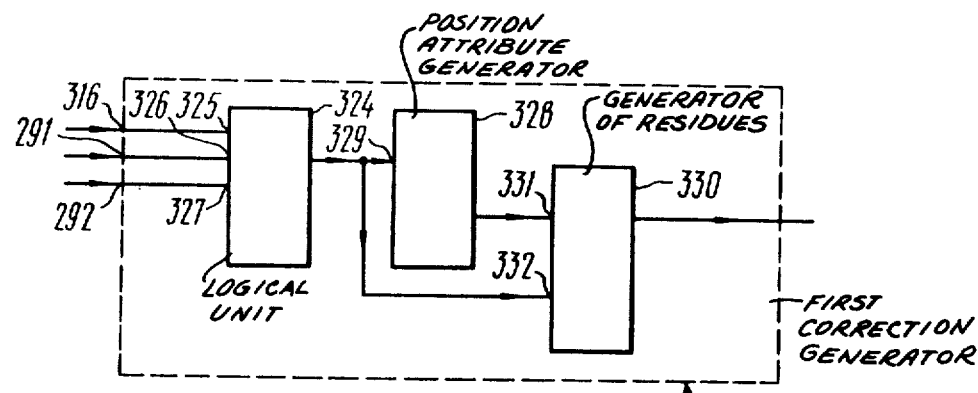
FIG. 11 is a block diagram of the first correction generator, according to the invention.

FIG. 11 is a block diagram of one of the correction generators.

It comprises a logical unit 324 whose inputs 325, 326 and 327 are coupled, respectively, to the third, first and second inputs of the respective correction generator.

The correction generator also comprises a position attribute generator 328, whose input 329 is connected to an output of the logical unit 324, and a generator 330 of residues, whose first input 331 is connected to an output of the position attribute generator 328, whose second input 332 is connected to the output of the logical unit 324, and whose output is connected to that of the respective correction generator.

According to the invention, the generator 330 of residues (FIG. 12) includes a required number of residue calculating units $333_1 \ldots 333_{n-1}$.

Each residue calculating unit $333_1 \ldots 333_{n-1}$ comprises a decoder 334, whose input 335 is coupled to the first input 331 of the generator 330 of residues, and a group 336 of decoders, the inputs 337 of the decoders being connected to the second input 332 of the generator 330 of residues.

Each residue calculating unit $333_1 \ldots 333_{n-1}$ also comprises a specified modulus adder 338, whose inputs 339 and 340 are coupled, respectively, to an output of the decoder 334 and outputs of the decoders of the group 336 of decoders, the output of the adder 338 being connected to that of the generator 330 of residues.

The first and second division units 297 (FIG. 10) and 306 of the multiplying device 39 are made identical and for convenience only one is illustrated.

Figure 13:
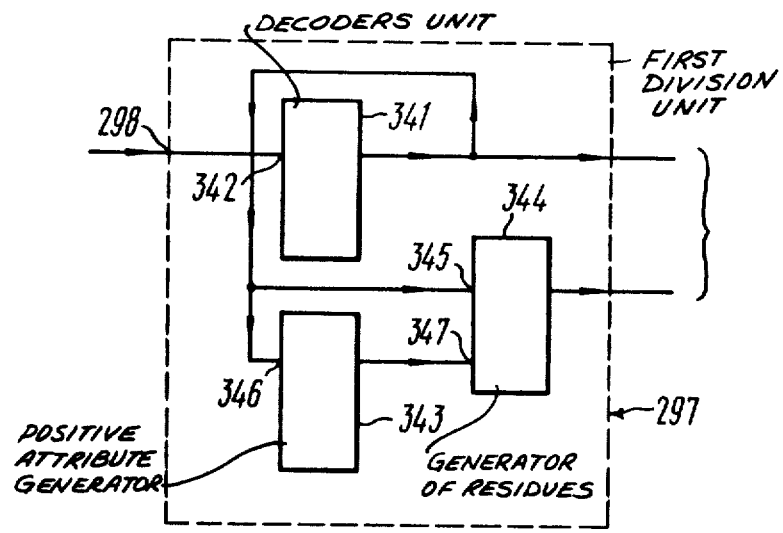
FIG. 13 is a block diagram of the division unit of the multiplier, according to the invention.

FIG. 13 is a block diagram of the first division unit 297 which comprises, according to the invention, a decoders unit 341 whose input 342 is connected to the input of the respective division unit and whose output is coupled to that of the first division unit 297.

The division unit 297 also comprises a position attribute generator 343 and a generator 344 of residues, whose first input 345 is combined with an input 346 of the position attribute generator 343 and connected to the output of the decoder unit 341, whose second input 347 is connected to an output of the position attribute generator 343, and whose output is connected to that of the respective division unit.

The position attribute generators 328 (FIG. 11) and 343 (FIG. 13) are identical.

Figure 14:
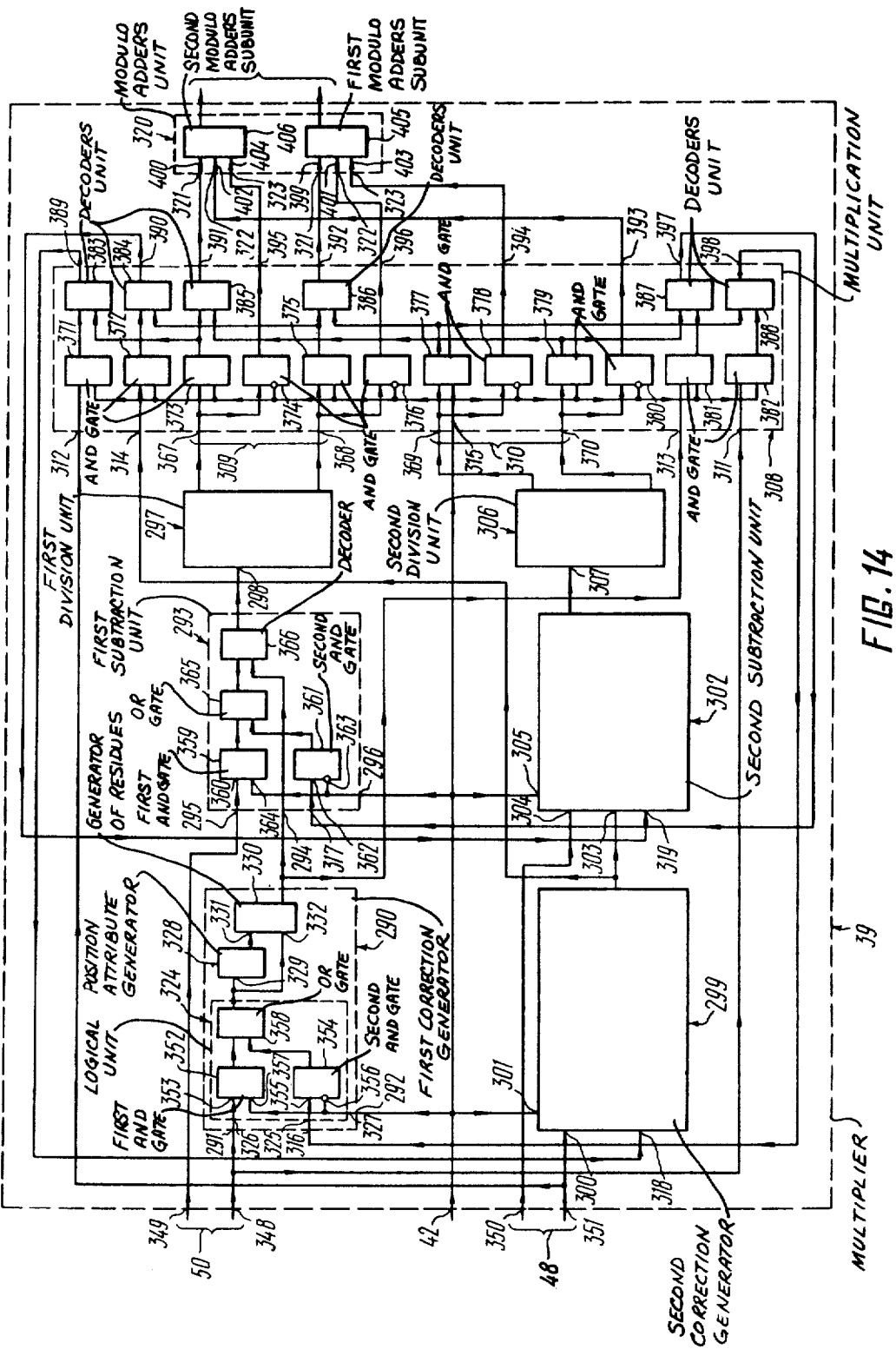
FIG. 14 is a detailed block diagram of the multiplier, according to the invention.

FIG. 14 is a detailed block diagram of the multiplier 39.

the multiplicand bus 50 includes two channels 348 and 349.

The multiplier bus 47 also includes two channels 350 and 351.

The first channel 348 of the bus 50 is coupled to the first input 291 of the first correction generator 290 and the third input 311 of the multiplication unit 308.

The second channel 349 of the bus 50 is coupled to the second input 295 of the first subtraction unit 293.

The first channel 350 of the multiplier bus 47 is coupled to the second input 304 of the second subtraction unit 302.

The second channel 351 of the bus 47 is coupled to the first input 300 of the second correction generator 299 and the fourth input 312 of the multiplication unit 308.

The logical unit 324 of the first correction generator 290 comprises a first AND-gate unit 352 having its first input 353 connected to the first input 291 of the first correction generator 290.

The logical unit 324 also comprises a second AND-gate unit 354 whose input 355 is connected to the third input 316 of the first correction generator 290 and whose inverse input 356 is combined with a second input 357 of the first AND-gate input 352 and connected to the second input 292 of the first correction generator 290.

The logical unit 324 further comprises an OR-gate unit 358 having its first input connected to an output of the first AND-gate unit 352, its second input connected to an output of the second AND-gate unit 354 and its output connected to the output of the logical unit 324.

The first subtraction unit 293 comprises a first AND-gate unit 359 whose first input 360 is connected to the second input 295 of the first subtraction unit 293.

The first subtraction unit 293 also comprises a second AND-gate unit 361 with its input 362 being connected to the fourth input 317 of the first subtraction unit 293 and its inverse input 363 being combined with the second input 364 of the first AND-gate unit 359 and connected to the third input 296 of the first subtraction unit 293.

The first subtraction unit 293 additionally comprises an OR-gate unit 365 whose first input is connected to an output of the first AND-gate unit 359 and whose second input is connected to an output of the second AND-gate unit 361.

And finally, the first subtraction unit 293 comprises a decoders unit 366 having its first input connected to an output of the OR-gate unit 365, its second input connected to the first input 294 of the first subtraction unit 293 and its output connected to that of the first subtraction unit 293.

The first input 309 of the multiplication unit 308 comprises two channels 367 and 368 and its second input 310 also includes two channels 369 and 370. The outputs of the unit 308 are two-channel ones.

The multiplication unit 308 includes twelve AND-gate units 371 to 382, the first inputs of the AND-gate units 373 and 374, 375 and 376, 377 and 378, 379 and 380 being combined and connected to respective channels 367, 368, 369 and 370 of the first and second inputs 309 and 310 of the multiplication unit 308.

The first inputs of AND-gate units 382, 371, 381 and 372 are connected, respectively, to the third, fourth, fifth and sixth inputs 311, 312, 313 and 314 of the multiplication unit 308.

The second inputs of the AND-gate units 371, 372, 373, 375, 377, 379, 381 and 382, as well as inverse inputs of the AND-gate units 374, 376, 378 and 380 are combined and connected to the seventh input 315 of the multiplication unit 308.

The multiplication unit 308 comprises six decoders units 383 to 388.

A first input of the first decoders unit 383 is coupled an output of the first AND-gate unit 371, a second input is connected to an output of the third AND-gate unit 373, and the output is connected to a second channel 389 of the second output of the multiplication unit 308.

A first input of the second decoders unit 384 is connected to an output of the second AND-gate unit 372, a second input is connected to an output of the fifth AND-gate unit 375, and the output is connected to a first channel 390 of the second output of the multiplication unit 308.

A first input of the third decoders unit 385 is connected to an output of the third AND-gate unit 373, a second input is connected to an output of the ninth AND-gate unit 379, and the output is connected to a second channel 391 of the third output of the multiplication unit 308.

A first input of the fourth decoders unit 386 is connected to an output of the AND-gate unit 375, a second input is connected to an output of the seventh AND-gate unit 377, and an output is connected to a first channel 392 of the third output of the multiplication unit 308.

An output of the tenth AND-gate unit 380 is connected to a second channel 393 of the fourth output of the multiplication unit 308 and connected to a first channel 394 of the same output is an output of the eighth AND-gate unit 378.

An output of the fourth AND-gate unit 374 is connected to a second channel 395 of the fifth output of the multiplication unit 308 and connected to a first channel 396 of the same output is an output of the sixth AND-gate unit 376.

A first input of the fifth decoders unit 387 is connected to the output of the ninth AND-gate unit 379, a second input is connected to an output of the eleventh AND-gate unit 381, and an output is connected to a second channel 397 of the first output of the multiplication unit 308.

A first input of the sixth decoders unit 388 is connected to the output of the seventh AND-gate unit 377, a second input is connected to an output of the twelfth AND-gate unit 382, and an output is connected to a first channel 398 of the first output of the multiplication unit 308.

The first channel 390 and the second channel 389 of the second output of the multiplication unit 308 are connected to the fourth input 319 of the second subtraction unit 302 and the third input 318 of the second correction generator 299, respectively.

The first channel 398 and the second channel 397 of the first output of the multiplication unit 308 are connected, respectively, to the third input 316 of the first correction generator 290 and the fourth input 317 of the first subtraction unit 293.

The first input 321 of the modulo adders unit 320 includes two channels 399 and 400.

The second input 322 of the unit 320 also includes two channels 401 and 402.

The third input 323 of the unit 320 is made up of two channels 403 and 404. The output of the unit 320 is a two-channel one.

The modulo adders unit 320 comprises a first and a second modulo adders subunits 405 and 406.

The first, second and third inputs of the first subunit 405 are connected, respectively, to the first channels 399, 401 and 403 of the first, second and third inputs 321, 322 and 323 of the modulo adders unit 320, its output being coupled to the first channel of the output of the unit 320.

The first, second and third inputs of the second subunit 406 are connected, respectively, to the second channels 400, 402 and 404 of the first, second and third inputs 321, 322 and 323 of the modulo adders unit 320, its output being coupled to the second output channel of the unit 320.

The first channel 392 of the third output, the first channel 396 of the fifth output and the first channel 394 of the fourth output of the multiplication unit 308 are connected, respectively to the first channels 399, 401 and 403 of the first, second and third inputs 321, 322 and 323 of the unit 320.

The third channel 391 of the second output, the second channel 393 of the fourth output and second channel 395 of the fifth output of the multiplication unit 308 are connected, respectively, to the second channels 400, 402 and 404 of the first, second and third inputs 321, 322 and 323 of the unit 320.

Figure 15:
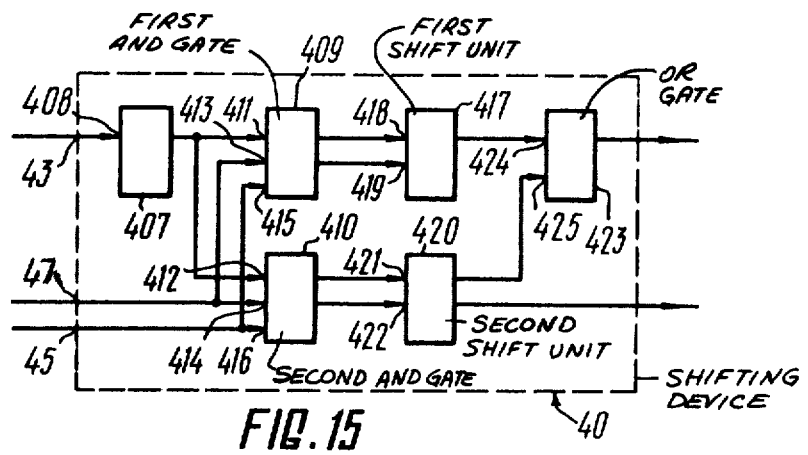
FIG. 15 is a block diagram of the shifting device, according to the invention.

The shifting device 40 comprises a decoder 407 (FIG. 15), whose input 408 is connected to the first input 43 of the shifting device.

The shifting device 40 further comprises a first AND-gate unit 409 and a second AND-gate unit 410. A first input 411 of the first AND-gate unit 409 and a first input 412 of the second AND-gate unit 410 are combined and connected to an output of the decoder 407. A second input 413 of the first AND-gate unit 409 and a second input 414 of the second AND-gate unit 410 are combined and connected to the third input 47 of the shifting device 40. A third input 415 of the first AND-gate unit 409 and a third input 416 of the second AND-gate unit 410 are combined and connected to the second input 45 of the shifting device 40.

The shifting device 40 also comprises a first shift unit 417 whose first input 418 and second input 419 are connected to outputs of the first AND-gate unit 409.

The shifting device 40 includes a second shift unit 420 whose first input 421 and second input 422 are connected to outputs of the second AND-gate unit 410.

The shifting device 40 still further includes an OR-gate unit 423 whose first input 424 is connected to an output of the first shift unit 417, whose second input 425 is connected to a first output of the second shift unit 420 and whose output is connected to the first output of the shifting device 40.

A second output of the second shift unit 420 is connected to the second output of the shifting device 40.

Figure 16:
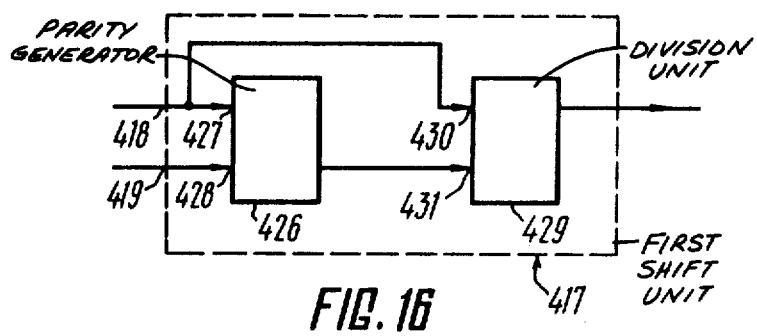
FIG. 16 is a block diagram of the first shift unit of the shifting device, according to the invention.

The first shift unit 417 comprises a parity generator 426 (FIG. 16) whose first input 427 is connected to the first input 418 of the first shift unit 417 and whose second input 428 is connected to the second input 419 of the first shift unit 417.

The first shift unit 417 also comprises a division unit 429 whose first input 430 is connected to the first input 418 of the shift unit 417, whose second output 431 is connected to an output of the parity genertor 426, and, whose output is connected to that of the first shift unit 417.

Figure 17:
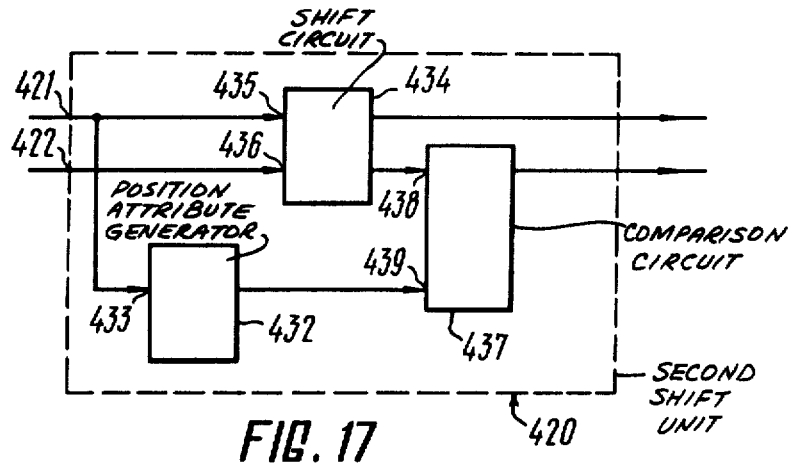
FIG. 17 is a block diagram of the second shift unit of the shifting device, according to the invention.

The second shift unit 420 comprises a position attribute generator 432 (FIG. 17) whose input 433 is connected to the first input 421 of the second shift unit 420.

The second shift unit 420 also comprises a shift circuit 434 whose first input 435 and second input 436 are connected to the first input 421 and second input 422, respectively, of the second shift unit 420, and whose first output is connected to the first output of the second shift unit 420.

The second shift unit 420 further includes a comparison circuit 437 whose first input 438 is connected to a second output of the shift circuit 434, whose second input 439 is connected to an output of the position attribute generator 432 and whose output is connected to the second output of the second shift unit 420.

Figure 18:
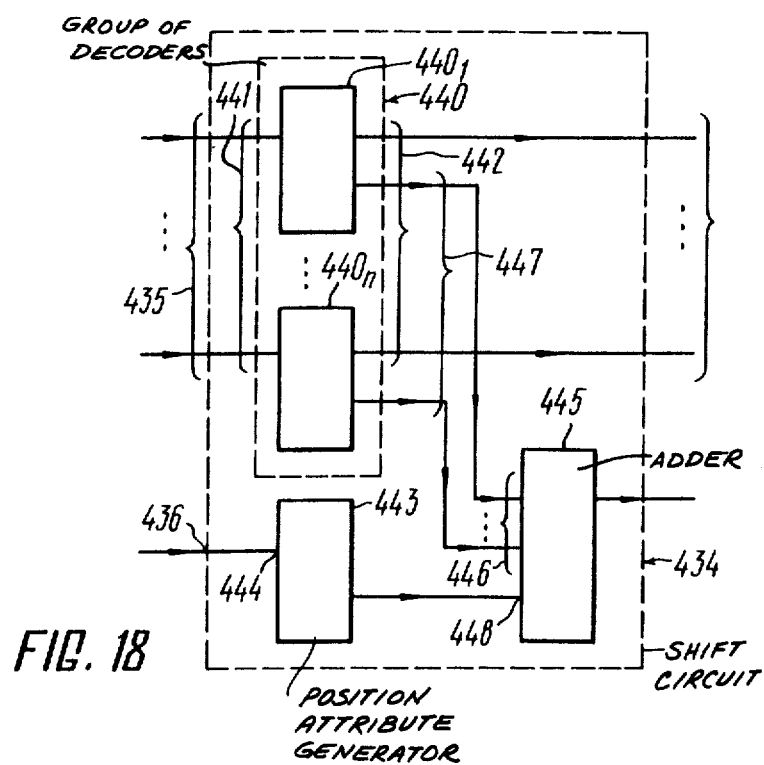
FIG. 18 is a block diagram of the shift circuit of the second shift unit, according to the invention.

The shift circuit 434 comprises a group 440 (FIG. 18) of decoders $440_1 \ldots 440_n$, the inputs 441 of the decoders $440_1 \ldots 440_n$ being connected to the first input 435 of the shift circuit 434. First outputs 442 of the decoders $440_1 \ldots 440_n$ of said group 440 of decoders are connected to the first output of the second shift unit 420.

The shift circuit 434 also comprises a position attribute decoder 443 whose input 444 is connected to the second input 436 of the shift circuit 434.

The shift circuit 434 still further includes an adder 445 whose first input 446 is connected to second outputs 447 of the decoders $440_1 \ldots 440_n$ of the group 440 of decoders, whose second input 448 is connected to an output of the position attribute decoder 443 and whose output is connected to the second output of the shift circuit 434.

Figure 19:
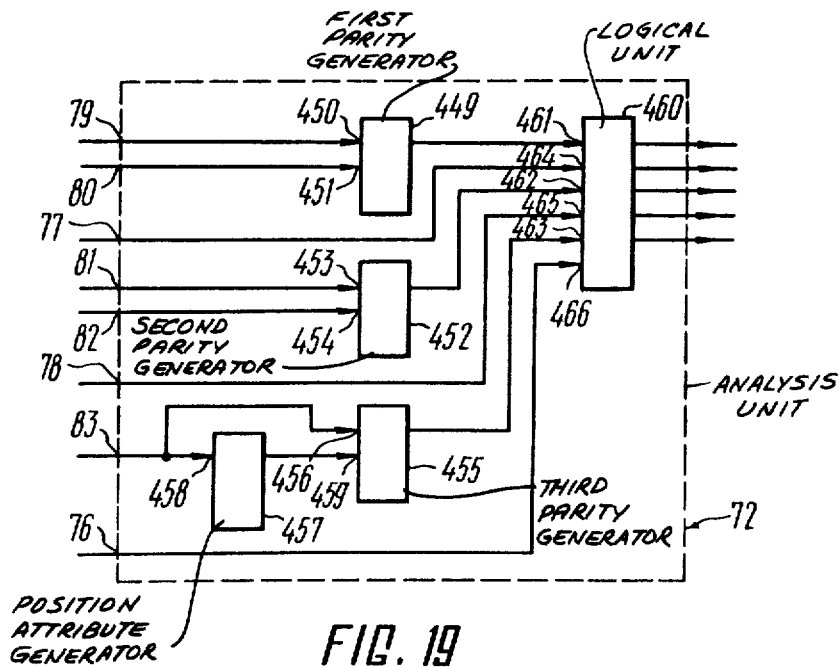
FIG. 19 is a block diagram of the analysis unit of the analysis system in accordance with the invention.

The analyzer unit 72 of the analysis system 18, which provides for the formation of an overflow attribute, comprises a first parity generator 449 (FIG. 19), its multichannel input 450 being connected to an input bus 79 of a first operand (the fourth input of the analysis unit 72), its input 451 being connected to a position attribute bus 80 of the first operand (the fifth input of the analysis unit 72). The data analyzer 72 also comprises a second parity generator 452 whose multichannel input 453 is connected to an input bus 81 of a second operand (the sixth input of the analysis unit 72), its input 454 being connected to a position attribute bus 82 of the second operand (the seventh input of the analysis unit 72).

The data analyzer 72 also includes a third parity generator 455 whose multichannel input 456 is connected to a bus 83 of the algebraic sum of the first and second operands (the eighth input of the analysis unit 72).

The data analyzer 72 includes a position attribute generator 457 whose multichannel input 453 is connected to the bus 83 and whose output is connected to an input 459 of the third parity generator 455.

The data analyzer 72 includes a logical unit 460 whose first input 461, second input 462 and third input 463 are connected to outputs of the first generator 449, the second generator 452 and the third generator 455, respectively. A fourth input 464, a fifth input 465 and a sixth input 466 of the logical unit 460 are connected to a sign bus 77 of the first operand (the second input of the analysis unit 72), a sign bus 78 of the second operand (the third input of the analysis unit 72) and a control bus 76 (the first input of the analysis unit 72), respectively. The first and second outputs of the logical unit 460 are connected to a bus of the algebraic sum of the first and second operands and an overflow attribute bus respectively.

Figure 20:
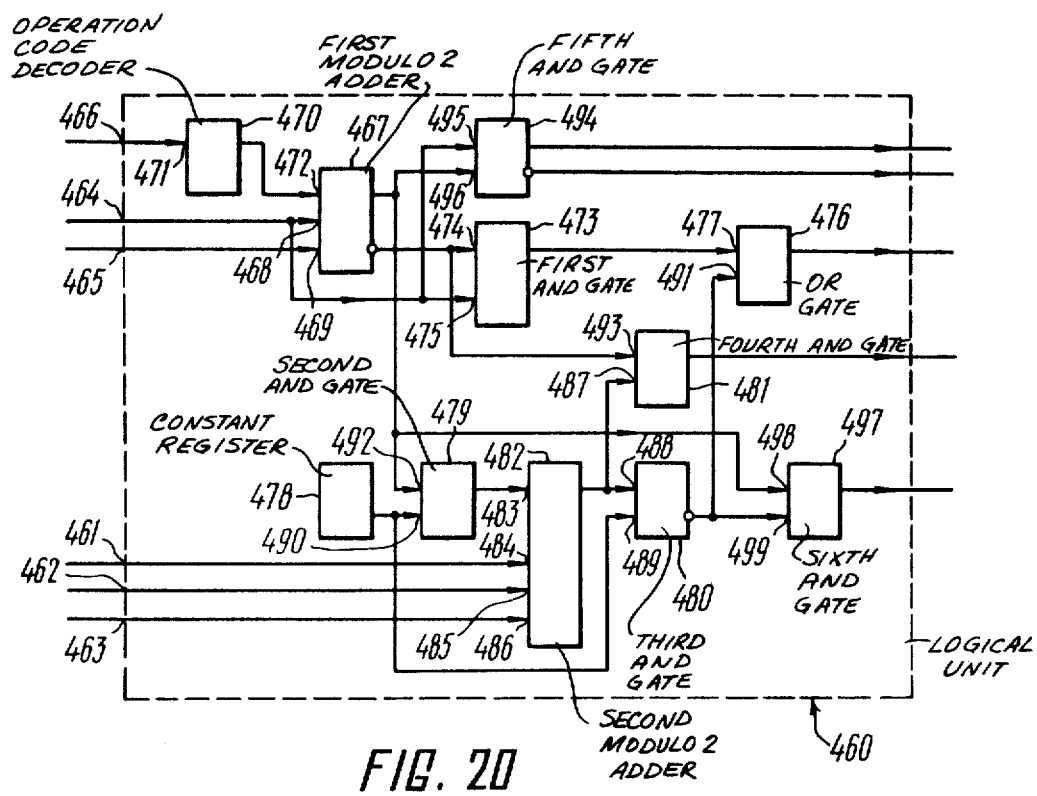
FIG. 20 is a block diagram of the logical unit of the analysis unit in accordance with the invention.

The logical unit 460 of the analysis unit 72 includes a first modulo 2 adder 467 (FIG. 20) whose first input 468 and second input 469 are connected to the fourth input 464 and the fifth input 465, respectively, of the logical unit 460.

The logical unit 460 includes an operation code decoder 470 whose input 471 is connected to the sixth input 466 of the logical unit 460 and whose output is connected to a third input 472 of the adder 467.

The logical unit 460 includes a first AND-gate 473 whose first input 474 is connected to an inverting output of the adder 467 and whose second input 475 is connected to the fourth input 464 of the logical unit 460.

The logical unit 460 further includes an OR-gate 476 whose first input 477 is connected to an output of the first AND-gate 473 and whose output is connected to the first output of the logical unit 460.

The logical unit 460 then includes a constant register 478, a second AND-gate 479, a third AND-gate 480 and a fourth AND-gate 481, and a second modulo 2 adder 482. A first input 483 of the second adder 482 is connected to an output of the second AND-gate 479, its second input 484, third input 485 and fourth input 486 are respectively connected to the first input 461, second input 462 and third input 463 of the logical unit 460. An output of the second adder 482 is connected to a first input 487 of the fourth AND-gate 481 and a first input 488 of the third AND-gate 480.

A second input 489 of the third AND-gate 480 is connected to a first input 490 of the second AND-gate 479 and to an output of the constant register 478, its inverting output being connected to a second input 491 of the OR-gate 476.

A second input 492 of the second AND-gate 479 is connected to a direct output of the first adder 467, an inverting output of the adder 467 being connected to a second input 493 of the fourth AND-gate 481. An output of the fourth AND gate 481 is connected to the second output of the logical unit 460.

According to an alternative embodiment of the invention, the logical unit 460 comprises a fifth AND-gate 494, its first input 495 being connected to the fourth input 464 of the logical unit 460, and its second input 496 being connected to the direct output of the first adder 467. Direct and inverting outputs of the fifth AND-gate 494 are respectively connected to a first auxiliary output and a second auxiliary output of the logical unit 460 (the third and fourth outputs of the logical unit 460).

The logical unit 460 further includes a sixth AND-gate 497 whose first input 498 is connected to the direct output of the first adder 467, whose second input 499 is connected to the inverting output of the third AND-gate 480, and whose output is connected to a third auxiliary output of the logical unit 460 (the fifth output of the logical unit 460).

Figure 21:
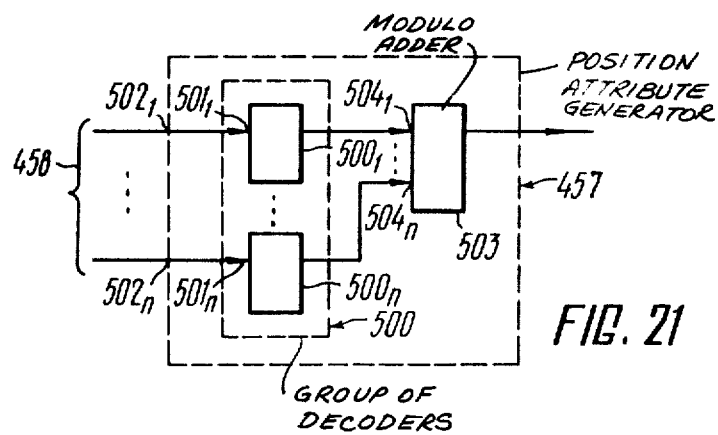
FIG. 21 is a block diagram of the position attribute generator of the analysis unit in accordance with the invention.

According to the invention, the position attribute generator 457 of the analysis unit 72 comprises a group 500 (FIG. 21) of decoders $500_1 \ldots 500_n$.

Inputs $501_1 \ldots 501_n$ of the decoders $500_1 \ldots 500_n$, which make up a multichannel input of the group 500 of decoders, are respectively connected to inputs $502_1 \ldots 502_n$ of the multichannel input 458 of the position attribute generator 457.

The generator 457 also includes a modulo adder 503 whose inputs $504_1 \ldots 504_n$, which make up a multichannel input of the adder 503, are connected to respective outputs of the decoders $500_1 \ldots 500_n$. An output of the modulo adder 503 is connected to that of the position attribute generator 457.

The first, second and third parity generator 449, 452 and 455, respectively, are identical, and for convenience only one is illustrated.

Figure 22:
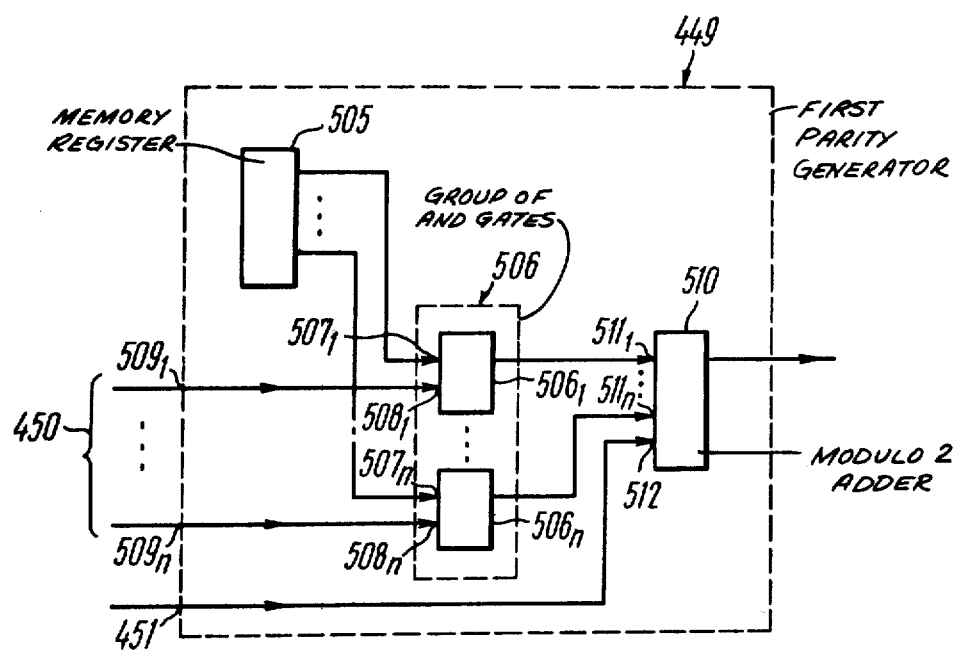
FIG. 22 is a block diagram of the parity generator of the analysis unit 72 in accordance with the invention.

FIG. 22 is a block diagram of the first parity generator 449 of the analysis unit 72.

According to the invention, the parity generator 449 comprises a memory register 505 and a group 506 of AND-gates $506_1 \ldots 506_n$.

First inputs $507_1 \ldots 507_n$ of the AND-gates $506_1 \ldots 506_n$ are connected to a multichannel output of the memory register 505. Second inputs $508_1 \ldots 508_n$ of the AND-gates $506_1 \ldots 506_n$ are connected to inputs $509_1 \ldots 509_n$ of the multichannel input 450 of the first parity generator 449.

The first parity generator 449 also includes a modulo 2 adder 510 whose multichannel input $512_1 \ldots 512_n$ is connected to respective outputs of the AND-gates $506_1 \ldots 506_n$ of the group 506. An 512 of the modulo 2 adder 510 is connected to the input 451 of the parity generator 449.

The proposed processor operates as follows.

The first operand A and second operand B are applied to the first operand input bus 5 (FIG. 1) and the second operand input bus 6, respectively, and are memorized by the respective operand registers 1 and 2. Simultaneously, the sign $Z_A$ of the first operand A, which is at the input sign bus 16, and the sign $Z_B$ of the second operand B, which is at the input sign bus 17, are respectively memorized by the first and second sign registers 12 and 13. The first operand A and second operand B are respectively applied from the outputs of the registers 1 and 2 to inputs 34 and 35, respectively, of the first generator 32 and the second 33 of the position attributes $R_A$ and $R_B$ of the first and second operands A and B, respectively.

After this, operation of the processor proceeds in accordance with a control signal arriving via the control bus 11.

If the control signal, which is applied from the control bus 11, corresponds to the operation of multiplying arbitrarily chosen numbers or fractions, the multiplier 39 is brought into play. In this case, the first operand A and second operand B are applied to the third input 50 and the second input 48 of said multiplier 39, respectively, from the outputs of the first operand register 1 and the second operand register 2. The result of multiplication is applied from the output of the multiplier 39 to the result register 25 and stored therein.

Figure 2:
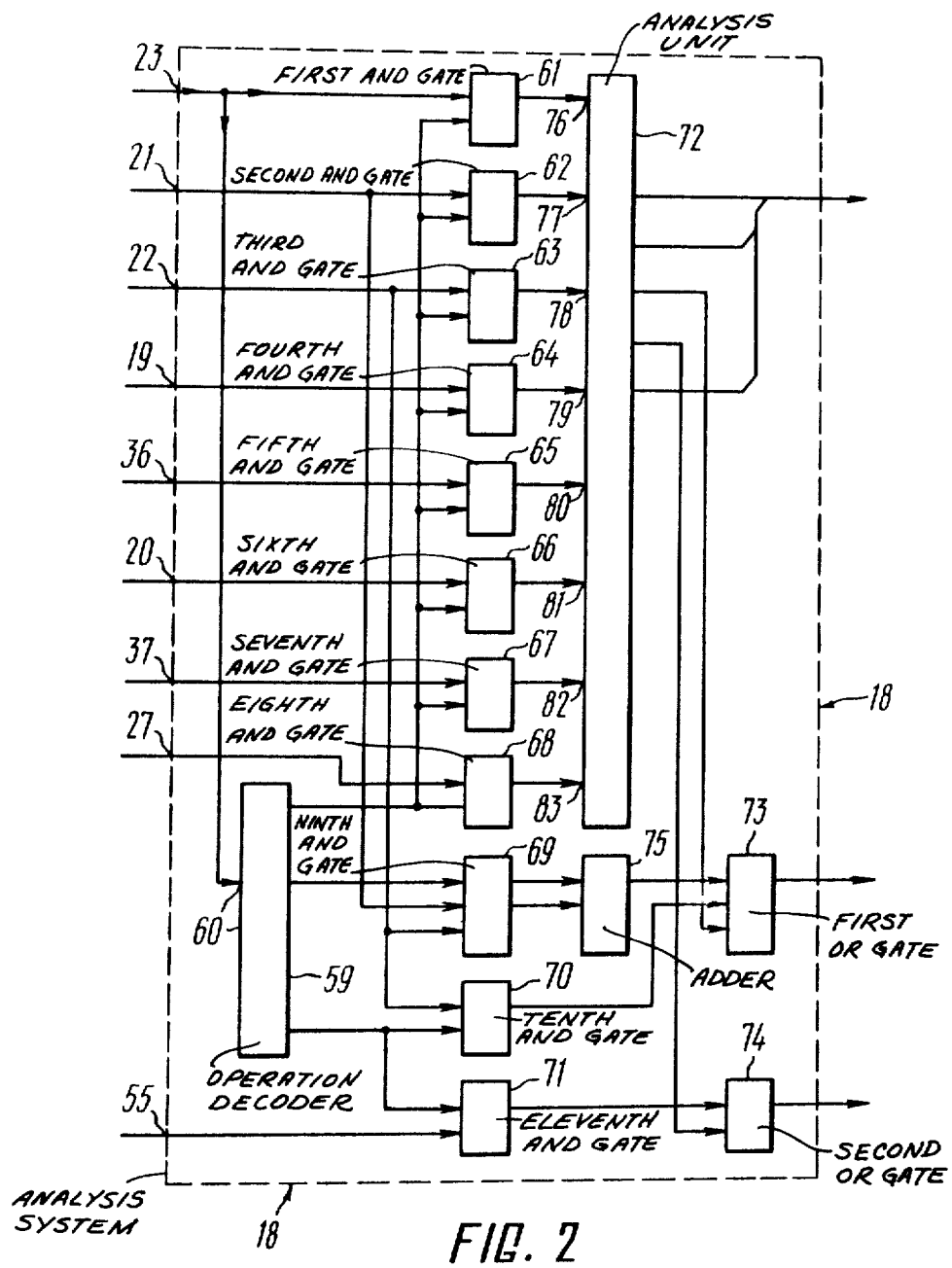
FIG. 2 is a block diagram of the analysis system of the processor in accordance with the invention.

In order to determine the sign of the result of the multiplication, the signs $Z_A$ and $Z_B$ of the first operand A and second operand B, respectively, are applied from the outputs of the first and second sign registers 12 and 13 to the third input 21 and the fourth input 22 of the analysis system 18, respectively. As this takes place, the control signal is applied from the control bus 11 via the fifth input 23 of the analysis system 18 to the input 60 of the operation decoder 59 (FIG. 2). In this case, the signal from the second output of the operation decoder 59, which is equal to 1, is applied to the first input of the ninth AND-gate 69, to whose second and third inputs there are applied the signs $Z_A$ and $Z_B$ of the first operand A and the second operand B, respectively. From the first and second outputs of the ninth AND-gate 69, the signs $Z_A$ and $Z_B$ of the first operand A and second operand B, respectively, are applied to the input of the modulo 2 adder 75. At the output of the modulo 2 adder 75, there is formed the sign $Z_S$ of the result S of the multiplication, which sign is applied via the first OR-gate 73 to the second output of the analysis system 18. The theory of the formation of the sign $Z_S$ of the result S of the multiplication can be illustrated by the formula:

$$Z_S = Z_A \oplus Z_B \qquad (13)$$

where $\oplus$ designates modulo 2 addition.

The sign $Z_S$ of the result S of the multiplication is applied from the second output of the analysis system 18 to the result sign register 29 and stored therein. At this point the operation of multiplying the arbitrarily chosen operands A and B is ended. The result S of the multiplication and the sign $Z_S$ of the results are stored in the result register 25 (FIG. 1) and the result sign register 29, respectively.

If the control signal arriving from the control bus 11 corresponds to an operation of dividing arbitrarily chosen numbers, the divider 38 is brought into play. For this operation, the first operand A and the second operand B are applied from the outputs of the registers 1 and 2, respectively, to the fourth input 49 and the third input 46 of the divider 38. The position attributes $R_A$ and $R_B$ of the first operand A and second operand B, respectively, are applied from the outputs of the first generator 32 and the second generator 33 to the fifth input 51 and second input 44 of the divider 38. The result of the division is applied from the output of the divider 38 to the result register 25 and stored therein.

The sign $Z_S$ of the result S of the division operation is determined in a way similar to that used in determining the sign of the multiplication operation.

The result S of the division and the sign $Z_S$ of the result S are stored by the result register 25 and the result sign register 29. In carrying out the foregoing multiplying and dividing operations, it is unnecessary to form the overflow attribute $\Omega$ if the operands A and B and the result S of the division or multiplication are all found within the limit value P of the number system range.

If the control signal arriving from the control bus 11 corresponds to a shifting operation (by an information bit), the shifting device 40 is brought into play. The second operand B is applied from the output of the second operand register 2 to the third input 47 of the shifting device 40. The position attribute $R_B$ of the second operand B is applied from the output of the second generator 33 to the second input 45 of the shifting device 40. From the first output of the shifting device 40, the result of the shifting is applied to the result register 25 and stored there.

The sign $Z_S$ of the result S of the shifting operation coincides with the sign $Z_B$ of the operand B being shifted, so by a control signal from the control bus 11, at the third output of the operation decoder 59 (FIG. 2) there is formed a signal corresponding to 1. The sign $Z_B$ of the second operand B is applied via the fourth input 22 of the analysis system 18, the tenth AND-gate 70 and first OR-gate 73 to the second output of the analysis system 18. The sign $Z_S$ of the result S of the operation of shifting the second operand B is applied from the second output of the analysis system 18 (FIG. 1) to the result sign register 29 and stored there.

The shifting device 40 can shift the second operand B to the right and or to the left (by an information bit). In case of a left shift (by an information bit), the result S may be greater than the range P of the number system. In this case, a signal corresponding to 1 is applied from the second output of the shift unit 40 to the ninth input 55 of the analysis system 18. From the ninth input 55 (FIG. 2) of the analysis system 18, this signal is applied via the eleventh AND-gate 71 and the second OR-gate 74 to the third output of the analysis system 18 and stored by the overflow attribute register 56 (FIG. 1).

At this point, the operation of shifting the second operand B is over. The result S of the shifting operation and the sign $Z_S$ of the result are stored by the result register 25 and the result sign register 29. The overflow attribute $\Omega$ is stored by the overflow attribute register 56; it is equal to 1 if the overflow results from the left shift, and to 0 if the overflow results from a right shift; it is also equal to 0 in case of a left shift with no overflow.

If the control signal arriving from the control bus 11 corresponds to the operation of algebraically adding the operands A and B, the modular arithmetic unit 7 is brought into play. The first operand A and the second operand B are applied from the outputs of the registers 1 and 2, respectively, to the first input 8 and the second input 9 of the modular arithmetic unit 7. From the output of the modular arithmetic unit 7, the result S, which is equal to the arithmetic sum (without taking into account the signs) of the first operand A and the second operand B, is applied to the sixth input 27 of the analysis system 18.

By a control signal from the control bus 11, which is applied via the fifth input 23 of the analysis system 18 to the input 60 of the operation decoder 59 (FIG. 2), there is formed a signal corresponding to 1. The first operand A and the second operand B via the first input 19 (FIG. 1) and the second input 20, the position attributes $R_A$ and $R_B$ from the seventh input 36 and the eighth input 37, the signs $Z_A$ and $Z_B$ of the first and second operands A and B, respectively, from the third input 21 and the fourth input 22, and the result S from the sixth input 27 of the analysis system 18 are applied, via the fourth AND-gate 64 (FIG. 2), the sixth AND-gate 66, fifth AND-gate 65, the seventh AND-gate 67, the second AND-gate 62, the third AND-gate 63 and the eighth AND-gate 68, to the inputs of the analysis unit 72.

From the first and second outputs of the analysis unit 72, there are control signals to form complements in the range P of the number system of the first operand A and the second operand B. From the fifth output of the analysis unit 72, there is derived a control signal to form a complement in the range P of the number system of the result S of the arithmetic sum of the first operand A and the second operand B. The control signals are applied from the first, second and fifth outputs of the analysis unit 72 via the first output of the analysis system 18 to the fourth input 24 (FIG. 1) of the modular arithmetic unit 7. After carrying out the operations determined by the control signal, the result S of the operation of algebraically adding the first operand A and the second operand B is taken from the output of the modular arithmetic unit 7 and stored by the result register 25.

From the third output of the analysis unit 72 (FIG. 2), there is the sign $Z_S$ of the result S of the operation of algebraically adding the first operand A and the second operand B, which sign is applied via the first OR-gate 73 and the second output of the analysis system 18 to the result sign register 29 (FIG. 1) and stored there.

From the fourth output of the analysis unit 72 (FIG. 2) there is the overflow attribute $\Omega$ which is applied via the second OR-gate 74 and the third output of the analysis system 18 to the overflow attribute register 56 (FIG. 1) and stored there.

Thus, as a result of simultaneous operation of the modular arithmetic unit 7 and the analysis system 18, there are formed the result of the operation of algebraically adding the first operand A and the second operand B, the sign $Z_S$ of the result S, and the overflow attribute $\Omega$, which are stored by the result register 25, the result sign register 29 and the overflow attribute register 56, respectively.

When reasonable (modular) operations of multiplication and division within the range P of the number system are being performed, the modular arithmetic unit 7 is in action. The first operand A and the second operand B are applied to its first input 8 and its second input 9 from the outputs of the registers 1 and 2, respectively. The result S of a reasonable operation that has been carried out is applied from the output of the modular arithmetic unit 7 to the result register 25 and stored there.

The sign $Z_S$ of the result S of the reasonable operation is determined with the aid of the analysis system 18 as in the cases of the operations of multiplication and division described above. The sign $Z_S$ is stored by the result sign register 29.

When performing reasonable operations, there is no need to calculate the overflow attribute $\Omega$, as the values of the first operand A, the second operand B and the result S are not in excess of the range P of the number system.

Figure 3:
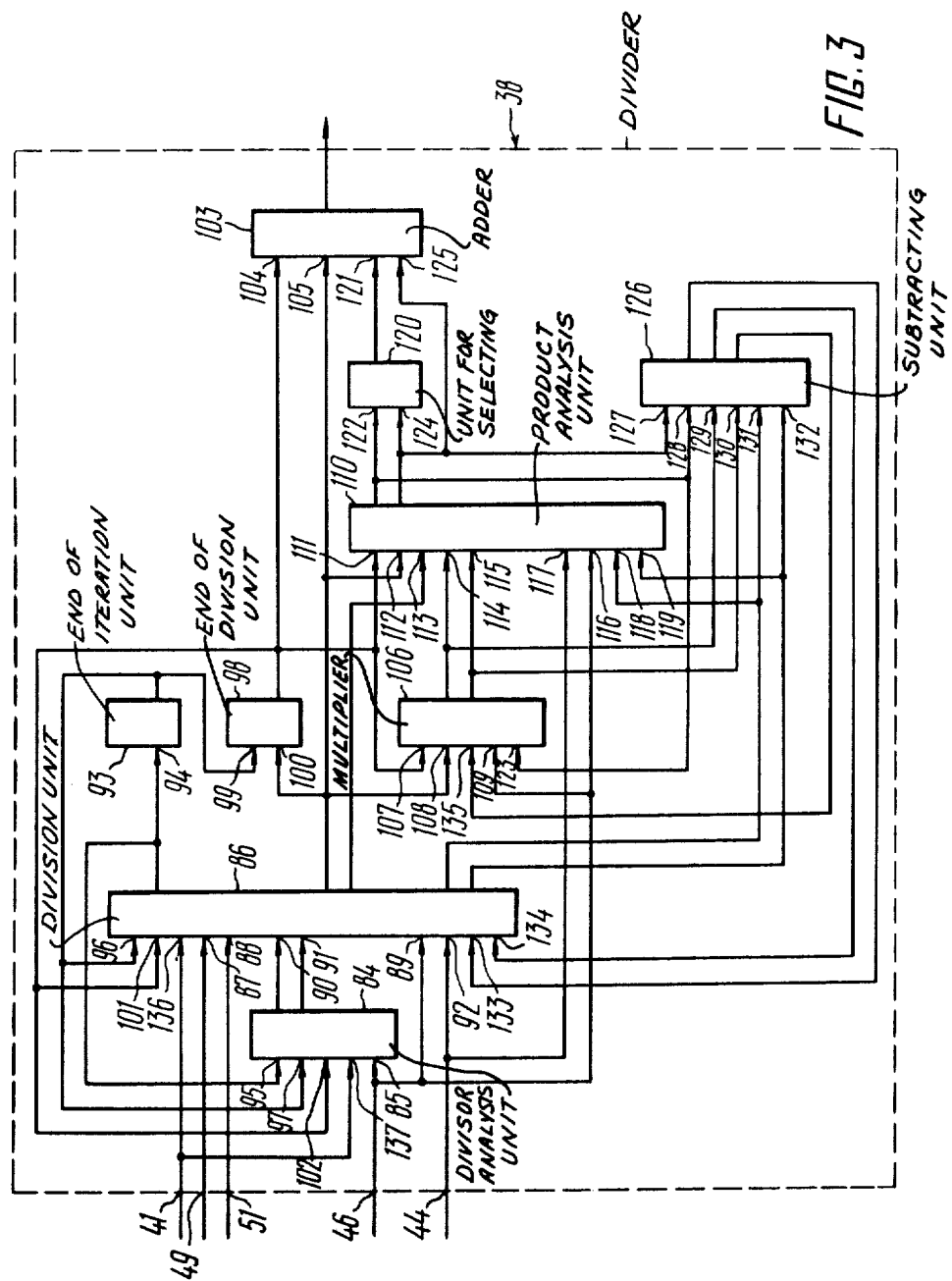
FIG. 3 is a block diagram of a divider in accordance with the invention.

Operation of the proposed divider 38 is based on the theory of carrying out the operation of dividing an arbitrarily selected number by a number system base and by 2. The embodiment under review carries out the operation of division by the first base $p_1$ of the number system and by two. Consider now operation of the claimed divider stage by stage. Stage one consists in analysing the divisor B by the unit 84 (FIG. 3). If the first residue $\beta_1 = 0$, it is inferred that the divisor B is divisible by $p_1$ (in this case, the division operation can be carried out in the formal manner). If, $\beta_1 \neq 0$, the divisor B is divided by 2 with the aid of the unit 86. The result is $B_1 \cdot B_1$ is divided by $p_1$ if $\beta_1' = 0$ and by two if $\beta_1 \neq 0$ etc., the operation being carried out $k$ times until $B_k = 1$, which is registered by the unit 93.

Concurrently with this, the dividend A is divided by $p_1$ if $\beta_1 = 0$ and by two if $\beta_1 \neq 0$, which operation is carried out by the unit 86. The result of the division is $A_1 \cdot A_1$ is divided by $p_1$ if $\beta_1' = 0$ and by two if $B_1' \neq 0$, which is done $k$ times, until $A_k$ is produced.

After $B_k$ has been analyzed by the unit 93 and compared with 1 and after it has been established that $B_k = 1$, there begins Stage Two.

During Stage Two, the unit 106 calculates the product of $A_k \cdot B$; a new dividend is found with the aid of the units 110 and 126.

$$A^1 = A - A_k \cdot B \tag{14}$$

Stage Three is the same as Stage One except that A is substituted for $A^1$ until $A_k^1$ is produced.

During Stage Four, the unit 106 calculates the product of $A_k^1 \cdot B$; the units 110 and 126 find a new dividend.

$$A^2 = A^1 - A_k^1 \cdot B \tag{15}$$

Iterations are repeated until $A_k^{l+1} = 0$, which is registered by the unit 98.

In the process under review, the aggregate of Stages One and Two form one iteration which begins with dividing the dividend by $p_1$ and by 2 and ends with the formation of a new dividend $A^1$, $A^2$, etc.

The final result of dividing the dividend A by the divisor B is as follows:

$$C = [A/B] = A_k + A_k^1 + \ldots , + A_k^l \tag{16}$$

C is formed in the adder 103.

Consider now operation of the proposed division device when dividing the dividend A by the divisor B, both being represented in the system of residual classes by their residues with reference to the bases $p_1, p_1 \ldots p$ namely, $A = (\alpha_1, \alpha_2 \ldots \alpha_n)$ and $B = (\beta_1, \beta_2 \ldots \beta_n)$, with position attributes $R_A$ and $R_B$.

For greater clarity and brevity, here and elsewhere in the text, the expression " . . . the divisor B is applied from the divisor bus 46 . . . " will be used instead of " . . . a signal corresponding to the divisor B is applied from the divisor bus 46 . . . ", etc.

Consider the first iteration.

First, the divisor B is applied from the divisor bus 46 to the first input 85 of the divisor analysis unit 84. The divisor analysis unit 84 is intended for the selection of an elementary divisor.

As a signal is applied from the signal control bus 41 to the second input 137, the unit 84 makes the zero analysis of the residue $\beta_1$. If $\beta_1 = 0$, the divisor B applied to the second multichannel input 89 of the unit 86 is divided by $p_1$; if $\beta_1 \neq 0$, the divisor B is divided by 2.

As this takes place, there are applied control signals from the first and second outputs of the unit 84 to the second input 90 and the third input 91 of the unit 86. The result of the division is taken from the first output of the unit 86 and is expressed as follows:

$$B_1 = (\beta_1', \beta_2' \ldots \beta_n')$$

Concurrently with this process, the dividend A is divided by $p_1$ if $\beta_1 = 0$ and by two if $\beta_1 \neq 0$.

$A_1$ is the result of the division of the dividend A by $p_1$. In accordance with a control signal applied from the bus 41 to the eighth input 136, the dividend A is applied from the bus 49 to the multichannel input 87; the position attribute $R_A$ is applied from the bus 51 to the first input 88 of the unit 86.

The result $B_1$ of the division of the divisor B is applied from the first multichannel output of the unit 86 to the input 94 of the end of iteration unit 93; the unit 93 compares said result to one. If $B_1 \neq 1$, $B_1$ is applied to the multichannel input 95 of the unit 84; in the presence of a signal at the third input 97 applied thereto from the output of the unit 93, the unit 84 compares the residue $\beta_1'$ to zero.

If $\beta_1' = 0$, $B_1$ is divided by $p_1$. If $\beta_1' \neq 0$, $B_1$ is divided by 2.

At the same time, $A_1$ is divided by $p_1$, if $\beta_1' = 0$, and by 2, if $\beta_1' \neq 0$. The division is carried out by the unit 86 in the presence of signals at the third input 91 and the fifth input 96 of said unit 86. The unit 93 compares to unity the new result $B_2$ of the division of the divisor B, which is obtained from the first multichannel output of the unit 86. The process of dividing B and A by $p_1$ and 2 is continued until $B_k = 1$.

If $B_k = 1$, in accordance with a signal applied from the output of the unit 93 to the input 99 of the unit 98, said end of division unit 98 analyzes the value of $A_k$ which is applied from the second multichannel output of the unit 86 to the multichannel input 100 of the unit 98. If $A_k = 0$, the result of the division is removed from the output of the adder 103 in the form of the quotient $$C = [A/B] = (C_1, C_2, \ldots C_n) \qquad (17),$$

where [ ] defines the integer part of the number resulting from the division of A by B.

If $A_k \neq 0$, $A_k$ is applied to the first multichannel input 108 of the multiplier 106 to whose second multichannel input 109 there is applied the divisor B which, by a signal applied to the first input 107, is multiplied by $A_k$. The result of this operation, i.e. $A_k \cdot B$ with the position attribute $R_{A_k} \cdot B$, is taken from the multichannel output and the output of the multiplier 106.

Simultaneously, $A_k$ is applied to the multichannel input 105 of the adder 103, wherein it is either subtracted from or added to the original contents of the adder 103, depending upon a signal across the second input 121 applied thereto from the unit 120 for selecting the operating conditions of the adder (following the first iteration, which is indicated by that $B_k = 1$, $A_k$ is recorded in the adder 103).

By a signal at the first input 111, the unit 110 compares the value of $A_k \cdot B$ with A.

$R_{A_k} \cdot B$ is applied together with the positional attribute $A_k \cdot B$; the dividend A is applied with the position attribute $R_A$.

$A_k \cdot B$ with $R_{A_k} \cdot B$ is applied from the multichannel output and the output of the multiplier 106 to the second multichannel input 114 and the third input 115 of the unit 110.

The dividend A with $R_A$ is applied from the third multichannel and the second outputs of the unit 86 to the fourth multichannel input 118 and the fifth input 119 of the unit 110.

The subtracting unit 126 calculates the value of the new dividend A' with the position attribute $R_A$, according to the following rules:

(1) $A' = A_k \cdot B - A.$ if $A_k \cdot B > A$, which is indicated by a signal applied from the first output of the unit 110 to the second input 128 of the unit 126;

(2) $A' = A_k \cdot B - A + P.$

If $A_k \cdot B < A$, which is indicated by a signal applied from the second output of the unit 110 to the first input 127 of the unit 126.

$A_k \cdot B$ with the position attribute $R_{A_k} \cdot B$ is applied to the first multichannel input 129 and the third input 130 of the unit 126; A with the position attribute $R_A$ is applied to the second multichannel input 131 and the fourth input 132 of the unit 126.

The signals applied from the output of the unit 110 to the first input 122 and the second input 124 form at the output of the unit 120 a subtraction signal which is applied to the second input 121 of the adder 103. The signal which is applied from the second output of the unit 110 to the third input 125 of the adder 103 is an addition signal.

From the multichannel first outputs of the unit 126, the values of the new dividend A' with the position attribute $R_A$ are applied to the third multichannel input 133 and the seventh input 134 of the division unit 86. A signal applied from the output of the end of division unit 98 to the fourth input 102 is a signal to begin the analysis of the residue $\beta_1$ of the divisor B; if present at the fourth input 102 of the division unit 86, this is a signal for the division of the new dividend A'. This is the beginning of a new iteration, where A with $R_A$ is replaced by A' with $R_A'$.

Iterations similar to those described above are continued until $A_k^{l+1} = 0$.

Consider now operation of the proposed divider shown in FIGS. 8 and 8' when dividing the dividend A by the divisor B, both being represented in the system of residual classes by their residues related to the bases $p_1$, $p_2 \ldots p_n$, namely, $A = (\alpha_1, \alpha_2 \ldots \alpha_n)$ and $B = (\beta_1, \beta_2 \ldots \beta_n)$, which are applied through the dividend bus 49 and divisor bus 46 with the position attributes $R_A$ and $R_B$, being applied through the bus 51 and the bus 44 respectively.

Firstly, the first residue $\beta_1$ of the divisor B is applied via the first input 85 of the unit 84 to the second input of the first AND-gate 236 to whose first input there is applied a start division control signal, which signal arrives from the control bus 41 via the second input 137 of the unit 84 and the first OR-gate 235. In addition, the control signal is applied from the output of the first OR-gate 235 to the first output of the unit 84. From the output of the first AND-gate 236, $\beta_1$ is applied via the second OR-gate 238 to one of the inputs of the comparison circuit 240. A zero signal is applied to the other input of the comparison circuit 240 from the memory register 239. From the output of the comparison circuit 239, there is produced a signal indicating that $\beta_1 = 0$, or an unfulfilled comparison signal which is applied to the second output of the unit 84.

The divisor B with the position attribute $R_B$ are applied via the multichannel input 89 and the fourth input 92 of the division unit 86 and via the multichannel input 169 and the second input 170 of the first logical unit to the inputs of the first AND gate 241. As a control signal is applied from the first output of the unit 84 to the second input 90 of the unit 86 and the third input 171 of the first logical unit 138, B and $R_B$ are applied via the first AND gate 241 to the output of the OR gate 243.

If $\beta_1 = 0$, B and $R_B$ are applied via the third AND gate 244 to the multichannel input 141 and the input 142 of the first halver unit 140 for division by $p_1$.

This takes place in the presence of a signal across the fourth input 172 of the first logical unit, which signal arrives from the second output of the unit 84 via the third input 91 of the unit 86.

If $\beta_1 \neq 0$, B and $R_B$ are applied via the fourth AND gate 245 to the multichannel input 144 and the input 145 of the halver 143. The result of dividing B with $R_B$ is removed, in the form of B with $R_B$, from the two outputs of the first OR-gate unit 146.

Simultaneously, there takes place the division of the dividend A. A with the position attribute $R_A$ is applied, via the first multichannel input 87 and the first input 88 of the unit 86 and via the second multichannel input 176 and the fourth input 177 of the second logical unit 139, and in the presence of a control signal from the control bus 41 at the eighth input 136 of the unit 86 and the fifth input 178 of the second logical unit 139, to the outputs of the first AND gate 246. From the outputs of the first AND gate 246, A and $R_A$ are applied via the second OR-gate 252, to the memory register 159. In addition, A and $R_A$ are applied via the first OR gate 249 if $\beta_1 = 0$ and via the fourth AND gate 250, to the unit 153 of division by $p_1$; when $\beta_1 \neq 0$, A and $R_A$ are applied via the fifth AND gate 251 to the halver 156.

From the first multichannel output of the unit 86, the result of dividing the divisor $B_1$ is applied via the input 94 of the end of iteration unit 93 to the input of the comparison circuit 253. Applied to the other input of the comparison circuit 253 is unity from the output of the memory register 254. If no comparison of $B_1$ with unity takes place, a corresponding signal is applied from the output of the unit 93 via the third input 97 of the unit 84 and transmits the first residue $\beta_1'$ of $B_1$ from the first multichannel output of the unit 86 via the second ANDgate 237 and the second OR-gate 238 to the input of the comparison circuit 240.

The same signal from the output of the unit 93 is applied from the fifth input 96 of the division unit to the fifth input 173 of the first logical unit 138 and the second input 174 of the second logical unit 139. As said signal is applied to the first logical unit 138, $B_1$ with $R_{B_1}$ are applied from the multichannel output and the output of the first OR-gate 146 unit via the second AND gate 242 to the output of the OR-gate 243.

In the second logical unit 139, by a respective signal, $A_1$ and $R_{A_1}$ are applied from the outputs of the second OR-gate unit 162 via the second AND gate 247 to the output of the first OR-gate 249.

If $B_1 \neq 1$, $B_1$ and $A_1$ are divided by two or $p_1$, depending on whether the first residue $\beta_1'$ of $B_1$ is equal to zero. The process is continued until $B_k = 1$, which is registered by the comparison circuit 253 from whose output there is initiated a comparison to unity signal.

The comparison to unity signal is applied from the output of the unit 93 via the input 99 of the unit 98 to the input of the AND gate 255. The values of $A_k$ are applied from the second multichannel output of the unit 86 via the multichannel output 100 of the unit 98 to the multichannel input of the AND gate 255. From the output of the group 255 of AND-gates, $A_k$ is applied to the input of the comparison circuit 257 whose other input is connected to the output of the memory register 256, wherein zero is stored. The comparison circuit 257 compares $A_k$ to zero; if $A_k = 0$, there is initiated a signal which provides the result of division, via the first input 104 of the adder 103 and the second AND gates 260, from the output of the modular adder 259. The result of the division is produced in the form of $C = [A/B] = C_1, C_2 \ldots C_n$.

If $A_k \neq 0$, the value of $A_k$ is applied from the second multichannel output of the unit 86 via the multichannel input 105 of the adder 103 to the input of the first AND gate 258. To the second input of the first AND gate 258, via the first input 104 of the adder 103, there is applied a signal indicating that $A_k$ does not compare to zero. From the output of the first AND gate 258, $A_k$ is applied to the first input of the modulo adder 259, where it is either added to or subtracted from the original contents of the modulo adder 259 of modular adders. Whether it is subtraction or summation depends upon the signals at the second input 121 and the third input 125 of the adder 103, which signals are applied from the output of the unit 120 and the second output of the unit 110.

Figure 7:
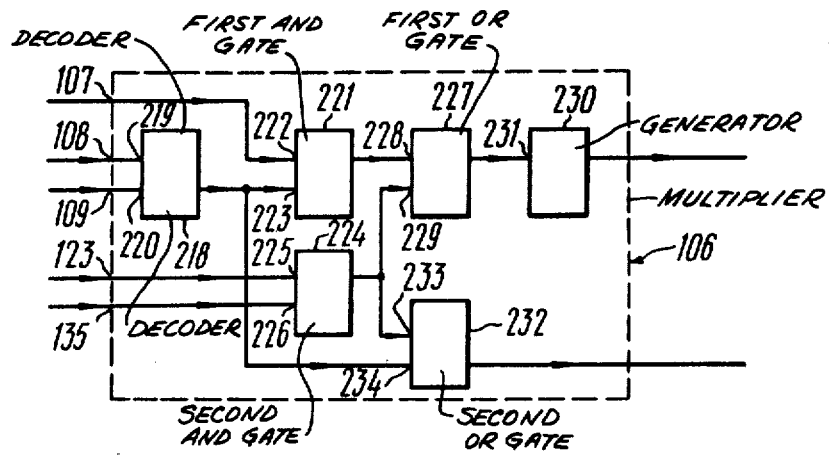
FIG. 7 is a block diagram of a multiplier for use in the divider in accordance with the invention.

If $A_k \neq 0$, a corresponding signal is applied from the output of the unit 98 to the first input 107 of the multiplier 106. $A_k$ from the second multichannel output of the unit 86 and the divisor B from the divisor bus 46 are applied via the first multichannel input 108 and the second multichannel input 109 to the first multichannel input 219 and the second multichannel input 220 of the decoder 218 (FIG. 7). The decoder 218 formally multiplies $A_k$ by B. From the output of the decoder 218, the product $A_k \cdot B$ is applied via the first AND-gate unit 221 and the first OR-gate unit 227 to the input 231 of the generator 230 which calculates the position attribute of the product $A_k \cdot B$. Operation of said generator 230 will be described below.

In addition, $A_k \cdot B$ is applied from the output of the decoder 218 via the second OR gates 230 to the multichannel output of the multiplier unit 106.

From the multichannel output and the output of the multiplier 106, $A_k \cdot B$ and the position attribute $R_{A_k} \cdot B$ are applied via the second multichannel input 114 and the third input 115 of the product analysis unit 110 to the inputs of the first parity generator 261 which calculates the parity $\psi$ ($A_k \cdot B$) of the product $A_k \cdot B$. Operation of the first parity generator 261 is described below. $A_k$ and the position attribute $R_{A_k}$ are applied from the second multichannel output and the first output of the unit 86 via the first multichannel input 112 and the second input 113 to the inputs of the second parity generator 262 which calculates the parity $\psi$ ($A_k$) of $A_k$. In the presence of a signal to the effect that $A_k$ does not compare to zero, which signal is applied from the output of the unit 98 to the first input 111 of the unit 110, the divisor B and the position attribute $R_B$ are applied via the third multichannel input 116 and the fourth input 117, and via the first AND gate 263 and the OR gate 265, to the inputs of the third parity generator 266 which calculates the parity $\psi$ (B) of the divisor B.

The arrival of the signal to the effect that $A_k$ does not compare to zero at the first input 111 of the unit 110 from the output of the unit 98 makes it possible to have the values $\psi$ ($A_k$) and $\psi$ (B) at the output of the sixth AND-gate 270. $\psi$ ($A_k$) is applied via the fifth AND-gate 269; $\psi$ (B) is applied via the seventh AND-gate 271.

In this case, at the output of the first modulo 2 adder 274 there is produced the value Π.

$$\Pi = (\psi(A') \& \psi(B)) \oplus \psi(A'B) \qquad (18),$$

where $\oplus$ denotes modulo two summation.

If Π = 0, the product $A_k \cdot B$ is outside the range P, i.e. $A_k \cdot B > P$. In this case, a signal from the first output of the unit 110 is applied to the first input 122 of the unit 120 and forms a subtraction signal at its output, which subtraction signal is applied via the second input 121 of the adder 103 to the third input of the modulo adder 259. In addition, the signal from the first output of the unit 110 is applied to the second input 128 of the subtracting unit 126. The values applied at this point to the subtracting unit 126 are: to the first multichannel input 129 and the second multichannel input 131 there are applied $A_k \cdot B$ and A from the multichannel output of the multiplier 106 and the multichannel output of the memory register 159 of the unit 86, respectively; to the third input 130 and the fourth input 132 there are applied $R_{A_k} \cdot B$ and $R_A$ from the output of the multiplier 106 and the output of the memory register 159 of the unit 86, respectively. $A_k \cdot B$ and A are applied from the multichannel inputs 129 and 131 of the unit 126 to the inputs of the group 276 of decoders, which group 276 calculates the value of the new dividend from the formula:

$$A' = A_k \cdot B - A$$

The new dividend is applied from the second output of the group 276 of decoders via the third AND gate 279 and via the first OR gate 284 to the first output of the subtracting unit 126. The position attribute $R_A$ is calculated by the adder 283 from the formula:

$$R_A = R_p + R_{A_k} \cdot B - R_A - \sum_{i=1}^{n} \epsilon_i \tau \qquad (19),$$

where $$\epsilon_i = \begin{cases} 1 \text{ if } a'_i \beta_i > a \\ 0 \text{ if } a'_i \beta_i < a \end{cases}$$

and $\tau_1, \tau_2 \ldots \tau_n$ are constant number systems.

$R_{A_k} \cdot B$ and $R_A$ are applied from the inputs 130 and 132 of the unit 126; $R_p$ is applied from the memory register 281; $\epsilon_i \tau_i$, with $i = 1, 2 \ldots n$, is applied from the first output of the group 276 of decoders via the first AND gate 277.

$R_{A_k} \cdot B$ is applied from the output of the adder 283 via the second OR gate 286 to the second output of the subtracting unit 126. If $\Pi = 1$, a signal corresponding to this value is applied to one of the inputs of the second AND gate 264 of the unit 110 and transmits A and $R_A$ from the fourth multichannel input 118 and the fifth input 119 via the second AND gate 264 and the OR gate 265 to the inputs of the third parity generator 266. The same signal is applied to the second input 123 of the multiplier 106. Due to this signal, $A_k \cdot B - A$ is applied from the second output of the group 276 of decoders of the unit 126 via the third input 135 of the multiplier 106 and via the second AND gate 224 to, firstly, via the second OR gate 232 to the multichannel output of the multiplier 106, and secondly, via the first OR gate 227 to the input of the generator 230.

In this case, the first parity generator 261 calculates the parity $\psi (A_k \cdot B - A)$ of $A_k \cdot B - A$ from its value and the position attribute $R_{A_k} \cdot B - A$ calculated by the generator 230 of the multiplier 106. Then, to the second modulo 2 adder 275 there is applied $\psi (A_k \cdot B - A)$ from the output of the first generator 261 via the fourth AND-gate 268; $\psi (A_k \cdot B)$ is applied from the output of the memory register 273; and $\psi (A)$ is applied from the output of the third parity generator 266 via the eighth AND-gate 272. At the output of the second adder 275 there is formed a value $$\Pi_1 = \psi(A) \oplus \psi(A_k B) \oplus \psi(A_k B - A) \qquad (20).$$

If $\Pi_1 = 1$, this shows that $A_k \cdot B > A$. In this case, $A' = A_k \cdot B - A$ is applied from the second output of the group 276 of decoders via the fifth AND gate 282 and the first OR gate 284 to the first output of the subtracting unit 126. In this case the position attribute $R_A$ is applied from the output of the multiplier 106 via the third input 130 of the unit 126 and via the second AND gate 278 and the second OR gate 286 to the second output of the subtracting unit 126.

If $\Pi_1 = 1$, the corresponding signal is applied to the second input 124 of the unit 120 and forms a subtraction signal at its output.

If $\Pi_1 = 0$, this indicates that $A_k \cdot B < A$. In this case, $A_k \cdot B - A$ from the second output of the group 276 of decoders, the position attribute $R_{A_k} \cdot B - A$ from the output of the generator 230 of the multiplier 106, and $R_p$ from the memory register 281 are applied via the fourth AND gate 280 to the inputs of the generator 285 of an additional number. Operation of the additional number generator 285 is described below.

The value of the new dividend A' that is being sought is applied from the first output of the generator 285 via the first OR gate 284 to the first output of the unit 126. The position attribute $R_A$ is applied from the second output of the generator 285 via the second OR gate 286 to the second output of the unit 126.

In this case, the signal, which is applied from the output of the second modulo 2 adder 275 via the third input 125 of the adder 103 to the second input of the modulo adder 259, is an addition signal.

From this moment, there begins a second iteration, in which the dividend is A' with the position attribute $R_{A'}$; the divisor in this case is the initial value of B with the position attribute $R_B$.

A signal to begin the analysis of the first residue $\beta_1$ of the divisor B is a signal of no comparison of $A_k$ to zero, which is applied from the output of the unit 98 via the fourth input 102 and the first OR-gate 235. The same signal, which is applied via the sixth input 101 of the unit 86 and the seventh input 181 of the second logical unit 139, transmits A' and $R_{A'}$ from the multichannel output and the first output of the unit 126 via the third multichannel input 133 and the seventh input 134 of the unit 86, via the third multichannel input 179 and the sixth input 180 of the second logical unit 139, and via the third AND gate 248 to the inputs of the first OR gate 249 and the inputs of the OR gate group 252. The division process then continues as described above.

Iterations similar to those described above are repeated until the unit 98 produces a signal to the effect that $A_k$ is equal to zero.

Consider now operation of the unit 143 (FIG. 5) for division by a predetermined base. In the present case, division is carried out by the first base $p_1$.

To each of the decoders $182_1 \ldots 182_{n-1}$ there are applied in pairs the values of residues $\alpha_1$ and $\alpha_2 \ldots \alpha_1$ and $\alpha_n$.

The decoders $182_1 \ldots 182_{n-1}$ convert the above values, so that there are the following two values at their outputs: at the first output, $\epsilon_i \cdot \tau_i$, where $$\epsilon_i = \begin{cases} 1 \text{ if } \alpha_1 > \alpha_i \\ 0 \text{ if } \alpha_1 \leq \alpha_i \end{cases}$$

at the second output, $$\alpha'_i = \frac{\alpha_i - \alpha_1}{P_1} \mod P_i \quad (21)$$

with $i = 2, 3 \ldots n$,

The values of $\alpha'_2, \alpha'_3 \ldots \alpha'_n$, with $i = 2, 3 \ldots n$, at the second outputs of the decoders $182_1 \ldots 182_{n-1}$ are the sought for values of the residues of $A' = (\alpha'_1, \alpha'_2 \ldots \alpha'_n)$ as a result of dividing $A = (\alpha_1, \alpha_2 \ldots \alpha_n)$ by $p_1$.

The first residue $\alpha'_1$ of $A_1$ is found in three steps:

Step One. On the basis of the values of the residues $\alpha_1, \alpha_i$ and $\alpha'_i$, the decoders $183_1 \ldots 183_{n-1}$ find:

$$\tau_i \cdot \frac{P_1 \alpha'_i - (\alpha_i - \alpha_1)}{P_i} \quad (22)$$

with $i = 2, 3 \ldots n$.

Step Two. The adder 189 adds, with reference to $p_1$, the values of $\tau_i \cdot \epsilon_i$ applied from the first outputs of the decoders $182_1 \ldots 182_{n-1}$, the values shown in formula (22) applied from the outputs of the decoders $183_1 \ldots 183_{n-1}$, and the value of $R_A$ applied from the input 145 of the unit 143. At the output of the adder 189 there is formed the value $$X = R_A - \sum_{i=2}^{n} \tau_i \epsilon_i - \sum_{i=2}^{n} \tau_i \frac{P_1 \alpha'_i - (\alpha_i - \alpha_1)}{P_i} \mod P_1 \quad (23)$$

Step Three. The first decoder 190 reduces X to $$\alpha'_1 = \frac{X}{\tau_1} \mod P_1 \quad (24),$$

where $\alpha'_1$ is the first sought for residue of $A_1$ removed from the first output of the first decoder 190.

In order to find the position attribute of $A_1$, the adder 192 adds the values of $\tau_i \epsilon_i$ applied from the first outputs of the decoders $182_1 \ldots 182_{n-1}$, the values shown in formula (22) applied from the outputs of the decoders $183_1 \ldots 183_{n-1}$, the value of $R_A$ applied from the input 145 of the unit 143, and the value of $\tau_1 \cdot \alpha'_1$ applied from the first output of the first decoder 190; at the output of the adder 192, there is formed the value $$Y = R_A - \sum_{i=2}^{n} \tau_i \frac{P_i \cdot \alpha'_i - (\alpha_i - \alpha_1)}{P_i} - \tau_1 \cdot \alpha'_1 - \sum_{i=2}^{n} \tau_i \epsilon_i \quad (25)$$

The second decoder 200 divides Y and thus determines the sought for position attribute of $A_1$, namely, $$R_{A_1} = Y/p_1 \quad (26)$$

Figure 6:
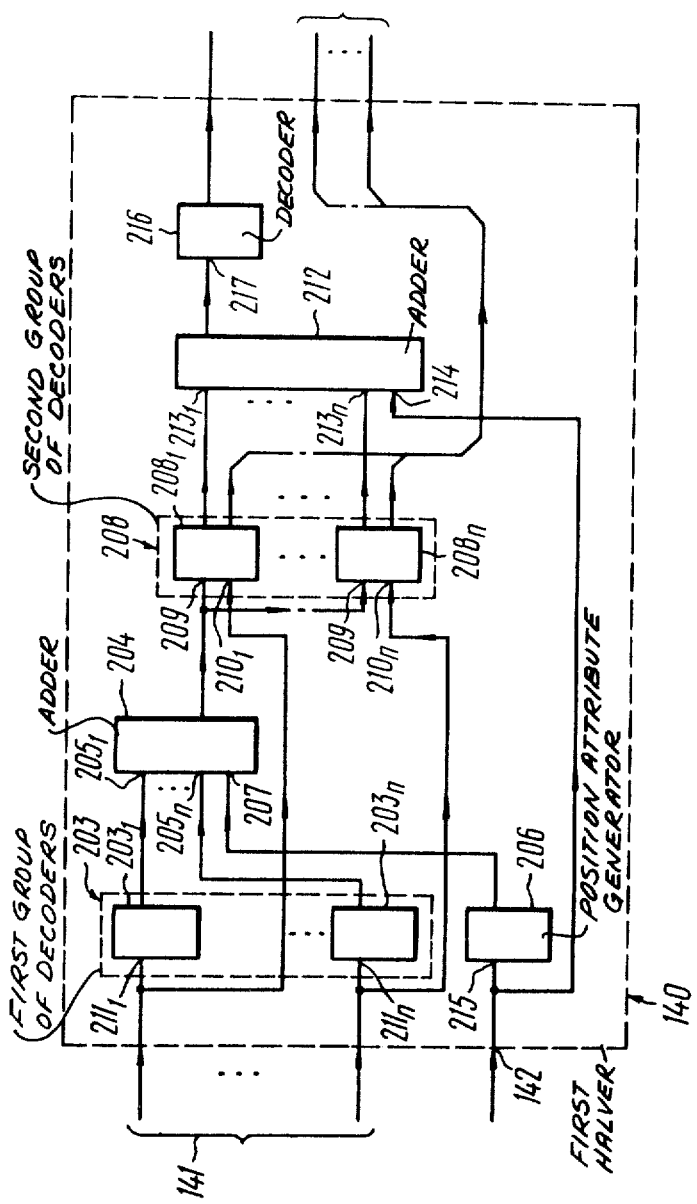
FIG. 6 is a block diagram of a halver in accordance with the invention.

The halver 140 operates as follows (FIG. 6). As $A = (\alpha_1, \alpha_2 \ldots \alpha_n)$ with the position attribute $R_A$ is divided by 2, the result is $A_1 = (\alpha'_1, \alpha'_2 \ldots \alpha'_n)$ with the position attribute $R_{A_1}$.

Each of the decoders $203_1 \ldots 203_n$ transforms the input values of the residues $\alpha_1 \ldots \alpha_n$ into the values $a_1 \cdot \alpha_1 \ldots a_n \cdot \alpha_n$, where $a_1 \ldots a_n$ are also number system constants. The values $R_A$ of the number A applied from the input 142 of the unit 140 are transformed into $a \cdot R_A$ by the position attribute decoder 206.

The outputs of the decoders $203_1 \ldots 203_n$ and the output of the decoder 206 are connected to the inputs of the modulo 2 decoder 204 in order to produce at the decoder's output the value $$\Delta = \sum_{i=1}^{n} a_i \alpha_i + aR_A \mod 2 \quad (27)$$

Each of the decoders $208_1 \ldots 208_n$ transforms each pair of input values of $\alpha_1$ and $\Delta \ldots \alpha_n$ and $\Delta$ into the sought for values of the residues $\alpha'_1 \ldots \alpha'_n$ according to the formula:

$$\alpha_i = \frac{\alpha_i - \Delta}{2} \mod P_i \quad (28)$$

with $i = 1, 2 \ldots n$ which are removed from their second outputs.

In order to find the position attribute of the number $A_1$, the value of $R_A$ from the input 142 of the unit 140 and the values, formed at the second outputs of the decoders $208_1 \ldots 208_n$, i.e.

$$\mu_i = \tau_i(\epsilon_i + \rho_i) \quad (29)$$

where $$\epsilon_i = \begin{cases} 1 \text{ if } \alpha_i < 0 \\ 0 \text{ if } \alpha_i \geq \Delta \end{cases}, \text{ whereas}$$

$$\rho_i = \begin{cases} 1 \text{ if } \alpha_i \cdot \Delta \text{ is odd} \\ 0 \text{ if } \alpha_i - \Delta \text{ is even, while} \end{cases}$$

$$a_i = 1, 2, \ldots, n$$

are applied to inputs of the adder 212 with the following value being formed at its output:

$$G = R_A - \sum_{i=1}^{n} \tau_i(\epsilon_i + \xi_i) \quad (30)$$

The decoder 216 of the position attribute provides for division by two of the sum with the sought for value $R_{A_1}$ being formed at its output i.e. $R_{A_1} = \frac{G}{2} \quad (31)$ The additional number generator 285 for $A = (\alpha_1, \alpha_2 \ldots \alpha_n)$ with the position attribute $R_A$ operates as follows.

Each of the decoders $287_1 \ldots 287_n$ (FIG. 9) transforms the input values of $\alpha_i$ into two values. First, the value of the sought for residue $\bar{\alpha}_i$ of the additional number $\bar{A} = P - A = (\bar{\alpha}_1 \ldots \bar{\alpha}_n)$ where $$\bar{A} = \tau - A = (\bar{\alpha}_1, \bar{\alpha}_2 \ldots \bar{\alpha}_n) \quad (32)$$

where $\bar{\alpha}_i = P_i - \alpha_i \mod P_i$ with $i = 1, 2 \ldots n$. Second, the value of $\tau_i, \epsilon_i$, where $$\epsilon_i \begin{cases} 1 \text{ if } \alpha_i \neq 0 \\ 0 \text{ if } \alpha_i \neq 0 \end{cases}$$

with $i = 1, 2 \ldots n$.

Said values of $\tau_i \epsilon_i$ from the first outputs of the decoders $287_1 \ldots 287_n$, the value of the position attribute $R_A$ from the third input of the generator 285 and via the decoder 288, and the value of $R_P$ from the third input of the generator 285 are applied to the inputs of the adder 289 at whose output there is formed the position attribute $R_{\overline{A}}$ of the additional number $\overline{A}$, which is done by the formula:

$$R_{\overline{A}} = R_P - R_A - \sum_{i=1}^{n} \tau_i \epsilon_i \quad (33).$$

The operation of the proposed multiplier 39 is based on the principle whereby the product $C'$ equal to $$\frac{A \cdot B}{P}$$

can be represented as follows:

$$\frac{A \cdot B}{P} = \frac{(A-a)(B-b)}{P} + \frac{a \cdot b}{P} + \frac{b \cdot a}{P} - \frac{a \cdot b}{P} \quad (34)$$

Here, the value of the correction "$a$" of the multiplicand $A$ is such that the difference $(A - a)$ is divisible by $P_j$ without any residue, while the value of the correction "$b$" is such that the difference $(B - b)$ is divisible by $P_k$ without any residue.

The value $P_j$ is the first part of the limit value P of the number system range and is selected on the assumption that $$P_j \approx \sqrt{P} \quad (35)$$

with $P_j = P_{j1} \cdot P_{j2} \ldots \cdot P_{j\nu}$

The value $P_k$ is the second part of the limit value P of the number system range and is selected on the assumption that $$P_k = P/P_j \quad (36)$$

with $P_k = P_{k1} \cdot P_{k2} \ldots \cdot P_{k(n-\nu)}$.

Evidently, the limit value P of the number system range is equal to $$P = P_j P_k \quad (37)$$

In accordance with the limit value P of the number system range being divided into the first part $P_j$ and the second part $P_k$, the multiplicand $A = (\alpha_1, \alpha_2 \ldots \alpha_n)$ is also divided into a first part $A_j = (\alpha_{j1}, \alpha_{j2} \ldots \alpha_{j\nu})$ and a second part $A_k = (\alpha_{k1}, \alpha_{k2} \ldots \alpha_{k(n-\nu)})$.

Similarly, the multiplier $B = (\beta_1, \beta_2 \ldots \beta_n)$ is divided into a first part $B_j = (\beta_{j1}, \beta_{j2} \ldots \beta_{j\nu})$ and a second part $B_k = (\beta_{k1}, \beta_{k2} \ldots \beta_{k(n-\nu)})$.

Accordingly, the multiplier 39 operates as follows. The multiplicand A is applied from the multiplicand bus 50 (FIG. 10) to the first input 291 of the first correction generator 290 wherein the value of the multiplicand correction "$a$" is calculated. The multiplier B is applied from the multiplier bus 48 to the first input 300 of the second correction generator 299 wherein the value of the multiplier correction "$b$" is calculated.

From the multiplicand bus 50, the multiplicand A is also applied to the second input 295 of the first subtraction unit 293, which has applied to its first input 294 from the output of the first correction generator 290 the value of the multiplicand correction "$a$", the difference $(A - a)$ being calculated therein. The multiplier B from the multiplier bus 47 is also applied to the second input 304 of the second subtraction unit 302 whose first input 303 receives the value of the multiplier correction "$b$", the difference $(B - b)$ being calculated in this unit.

In the first division unit 297, the quantity $(A - a)$ applied to its input 298 is divided by the first part $P_j$ of the limit value P of the number system range. Let us denote by $\widetilde{A}$ the quotient resulting from the difference $(A - a)$ being divided by $P_j$.

In the second division unit 306, the quantity $(B - b)$ applied to its input 307 is divided by the second part $P_k$ of the number system range limit value. Let us denote by $\widetilde{B}$ the quotient resulting from the difference $(B - b)$ being divided by $P_k$.

The multiplication unit 308 calculates the following product values:

value $\widetilde{A} \cdot \widetilde{B}$; the quotient value $\widetilde{A}$ is applied to the first input 309 from the output of the first division unit 297, and the quotient value $\widetilde{B}$ is applied to the second input 310 from the output of the second division unit 306, the product value $\widetilde{A} \cdot \widetilde{B}$ being the augend of formula (34).

New multiplicand value $a \cdot \widetilde{B}$: the multiplicand correction value "$a$" is applied from the output of the first correction generator 290 to the fifth input 313;

new multiplier value $b \cdot \widetilde{A}$: the multiplier correction value "$b$" is applied from the output of the second correction generator 299 to the sixth input 314.

The product value $\widetilde{A} \cdot \widetilde{B}$ is applied from the third output of the multiplication unit 308 to the first input 321 of the modulo adders unit 320.

Thus, the first stage of operation of the multiplying device is completed. To describe the second stage of operation of the proposed device, the right-hand side of equation (34) is transformed in accordance with the number system range limit value P being divided into two parts, namely, $P = P_j P_k$.

We obtain:

$$\frac{A \cdot B}{P} = \quad (38)$$

$$\frac{(A-a) \cdot (B-b)}{P_j \cdot P_k} + \frac{a \cdot B}{P_j \cdot P_k} + \frac{b \cdot A}{P_j \cdot P_k} - \frac{a \cdot b}{P}$$

Since $$\frac{A - a}{P_j} = \widetilde{A} \text{ and} \quad (39)$$

$$\frac{B - b}{P_k} = \widetilde{B} \quad (40),$$

$$\frac{A \cdot B}{P} = \widetilde{A} \cdot \widetilde{B} + \frac{a \cdot \widetilde{B}}{P_j} + \frac{b \cdot \widetilde{A}}{P_k} - \frac{a \cdot b}{P} \quad (41)$$

we have $$\frac{a \cdot b}{P} < 1.$$

wherein $(a \cdot b)/P$ is the multiplication method error, and $$\frac{A - a}{P_j} = \widetilde{A} \text{ and} \quad (39)$$

-continued $$\frac{B-b}{P_k} = \tilde{B} \quad (40),$$

To find the addend in expression (41), the new multiplicand value $a \cdot \tilde{B}$ should be divided by the first part $P_j$ of the number system range limit value P. To this end, the new multiplicand value $a \cdot \tilde{B}$ is applied from the first output of the multiplication unit 308 to the third input 316 of the first correction generator 290 and to the fourth input 317 of the first subtraction unit. From the fourth output of the multiplication unit 308, the desired quotient value $a \cdot \tilde{B}/p_j$ is applied to the second input 322 of the modulo adders unit 320.

Similarly, to find the other addend "b" in expression (41), the new multiplier value $b \cdot \tilde{A}$ should be divided by the second part $P_k$ of the limit value P. To this end, the value $b \cdot \tilde{A}$ is applied from the second output of the multiplication unit 308 to the third input 318 of the second correction generator 299 and to the fourth input 319 of the second subtraction unit 302. From the fifth output of the multiplication unit 308, the desired quotient value $b \cdot \tilde{A}/P_k$ is applied to the third input 323 of the modulo adders unit 320.

Derived at the output of the modulo adders unit 320 is the desired product value $$C' = \frac{A \cdot B}{P}$$

which is calculated from formula (41).

Thus, the proposed multiplier 39 operates in two stages; during the first stage, given the values of the multiplicand A and the multiplier B, the product $A \cdot B$ is found and the values of the new multiplicand $a \cdot \tilde{B}$ and the new multiplier $b \cdot \tilde{A}$ are calculated; during the second stage, the proposed device 39 makes use of the new multiplicand value $a \cdot \tilde{B}$ and the new multiplier value $b \cdot \tilde{A}$, applied, respectively, to the inputs 316 and 318 of the first and second correction generators 290 and 299.

Upon completion of the second stage of operation, formed in the modulo adders unit 320 in accordance with formula (41) is the desired product C' of multiplication of the multiplicand A by the multiplier B.

Consider now the operation of the proposed multiplier 39 with reference to FIG. 14.

The first part $A_j$ of the multiplicand A, or more precisely, $A_j = (\alpha_{j1}, \alpha_{j2} \ldots \alpha_j)$, is applied from the first channel 348 of the multiplicand bus 50 via the first input 291 of the first correction generator 290 to the second input 326 of the logical unit 324. A signal from the control bus 42 is fed via the second input 292 of the first correction generator 290 to the third input 327 of the logical unit 324.

In the presence of the signal from the second input 327 of the logical unit 324 at the second input 357 of the first AND-gate unit 352, the first part $A_j$ of the multiplicand A passes through the first AND-gate unit 352 and the OR-gate unit 358 to the output of the logical unit 324.

From the output of the logical unit 324, the first part $A_j$ of the multiplicand A is applied to the input 329 of the generator 328 of the position attribute $R_{A_j}$ of the first part $A_j$ of the multiplicand A.

The position attribute $R_{A_j}$ of the first part $A_j$ of the multiplicand A is applied from the output of the position attribute generator 328 to the first input 331 of the generator 330 of residues, whose second input 332 receives the first part $A_j$ of the multiplicand A from the output of the logical unit 324.

The generator 330 of residues calculates, from the value of the first part $A_j$ of the multiplicand A and that of its position attribute $R_{A_j}$, the second part $a_k = (x_{k1}, x_{k2} \ldots x_{k(n-v)})$ of the multiplicand correction $a = (\alpha_{j1}, \alpha_{j2} \ldots \alpha_{j}, x_{k1}, x_{k2} \ldots x_{k(n-v)}$ the first part $a_j$ being known and equal to the first part $A_j$ of the multiplicand A, i.e. $a_j = A_j$.

The generator 330 of residues operates as follows. For the first part $A_j = (\alpha_{j1}, \alpha_{j2} \ldots \alpha_j)$ of the multiplicand A, the residues from the second input 332 of the generator 330 (FIG. 12) of residues together with the position attribute $R_{A_j}$ of the first part $A_j$ of the multiplicand A from the first input 331 are applied to the inputs of each residue calculating unit $333_1 \ldots 333_v$. The residue calculating units $333_1 \ldots 333_v$ operate in a similar manner, therefore their operation will be considered with reference to a single residue calculating unit $333_1$.

The position attribute $R_{A_j}$ of the first part $A_j$ of the multiplicand A is applied from the first input 331 of the generator 330 of residues to the input 335 of the decoder 334, while the residues of the first part $A_j$ of the multiplicand A are applied from the second input 332 of the generator 330 of residues to the inputs 337 of the decoders of the group 336 of decoders.

The decoder 334 transforms the position attribute $R_{A_j}$ to a value $S^1 \cdot R_{A_j}$, and each one of the decoders of the group 336 transforms the residues $\alpha_{ji}$ to values $S'_i \pm \cdot \alpha_{ji}$, where $S'$ and $S'_i$ are also number system constants and $i = 1,2 \ldots$. The value $S' \cdot R_{A_j}$ is applied from the output of the decoder 334 to the first input 339 of the specified modulus adder 338, while the values $S'_i \cdot \alpha_{ij}$ are applied from the outputs of the decoders of the group 336 of decoders to the second input 340 of the specified modulus adder 338, at the output whereof there is derived the first residue $x_{k1}$ of the second part $a_k$ of the multiplicand correction $a$ in accordance with the following formula:

$$X_{k1} = S_1^1 \cdot \alpha_{j1} + S_2^1 \cdot \alpha_{j2} + \ldots + S_v^1 \cdot j v + S^1 \cdot R_{A_j mod P_{k_1}}, \quad (42)$$

wherein $P_{k1}$ stands for a respective number system base.

Similarly, the residue calculating unit 333 calculates the value of the $(n - v)$ the residue $x_{k(n-v)}$ of the second part $a_k$ of the multiplicand correction.

The calculated values of residues $x_{k1}, x_{k2} \ldots x_{k(n-v)}$ are applied from the outputs of the residue calculating units $333_1 \ldots 333_{n-v}$ via the output of the generator 330 of residues to the outputs of the first correction generator 290 (FIG. 14).

At the same time, the second part $B_k$ of the factor B or, more precisely, $B_k = (\beta_{k1}, \beta_{k2} \ldots \beta_{k(n-v)})$ is applied from the second channel 351 of the multiplier bus 47 to the first input 300 of the second correction generator 229. A signal from the control bus 42 is fed to the second input 301 of the second correction generator 299. From this point on, the operation of the second correction generator 299 is similar to that of the first correction generator 290 except that the generator of residues in the generator 299 includes $v$ rather than $(n - v)$ residue calculating units. Therewith, derived at the output of the second correction generator 299 is the first part $b_j = (y_{j1}, y_{j2} \ldots y_{jv})$ of the multiplier correction $b = (y_{j1}, y_{j2} \ldots y_{jv}, \beta_{k1}, \beta_{k2} \ldots \beta_{k(n-v)})$ as the second part $b_k$ is known and equal to the second part $B_k$ of the multiplier B, i.e. $b_k = B_k$.

The second part $A_k$ of the multiplicand A (which, is equal to the second part $a_k$ of the multiplicand correction $a$) is applied from the second channel 349 of the multiplicand bus 50 via the second input 295 of the first subtraction unit 293 to the first input 360 of the first AND-gate unit 359. A signal from the control bus 42 passes through the third input 296 of the first subtraction unit 293 to the second input 364 of the first AND-gate unit 359. In the presence of the control signal, the second part $A_k$ of the multiplicand A passes via the first AND-gate unit 359 and the OR-gate unit 365 to the first input of the decoders unit 366. The second input of the decoders unit 366 receives the second part $a_k$ of the multiplicand correction $a$ from the output of the first correction generator 290 via the first input 294 of the first subtraction unit 293. With the aid of the decoders unit 366, the second part $(A-a)_k = (a'_{k1}, a'_{k2} \ldots a_{k(n-\nu)})$ of the difference $A-a$ is calculated from $$a'_{ki} = a'_{ki} - x_{ki} \bmod p_{ki} \qquad (43)$$

where $i = 1,2 \ldots n - \nu$, the first part $(A-a)_j$ of the difference $A-a$ being equal to zero since $A_j = a_j$, namely $(A-a)_j = (0,0 \ldots 0) \nu$. The second part $(A-a)_k$ of the difference $A-a$ is applied from the output of the decoders unit 366 to the output of the first subtraction unit 293.

The first part $B_j$ of the multiplier B (which is equal to the first part $b_j$ of the multiplier correction $b$) is applied from the first channel 350 of the multiplier bus 47 to the second input 291 of the second subtraction unit 302. The second part $b_k$ of the multiplier correction $b$ is applied from the output of the second correction generator 299 to the first input 303 of the second subtraction unit 302. In the presence of a signal at the third input 305 of the second subtraction unit 302, which signal arrives from the control bus 42, the first part $(B-b)_j = (\beta'_{j1}, \beta'_{j2} \ldots \beta'_{j\nu})$ of the difference $B-b$ is calculated in accordance with $$\beta'_{ji} = \beta_{ji} - y_{ji} \bmod p_{ji} \qquad (44)$$

where $i = 1,2 \ldots \nu$, the second part $(B-b)_k$ of the difference $B-b$ being zero since $B_k = b_k$, namely, $(B-b)_k = (0,0 \ldots 0)(n - \nu)$.

The operation of the second subtraction unit 302 is identical to that of the first subtraction unit 293, described above, a the result in the form of the first part $(B-b)_j$ of the difference $B-b$ is derived at its output.

The second part $(A-a)_k$ of the difference $A-a$ is applied from the output of the first subtraction unit 293 via the input 298 of the first division unit 297 to the input 342 of the decoders unit 341 (FIG. 13). Derived at the output of the decoders unit 341 is the second part $$(\frac{A-a}{P})_k$$

of the quotient $(A-a)/P$ in accordance with $$\left(\frac{A-a}{P}\right)_k = \frac{(A-a)_k}{P_j} = \tilde{A}_k \text{ or} \qquad (45)$$

$$\tilde{A}_k = (\tilde{a}_{k1}, \tilde{a}_{k2}, \ldots, \tilde{a}_{k(n-\nu)}) \qquad (46)$$

where $\tilde{a}_{ki} = a_{ki}/\pi_{ki} \bmod p_{ki}$ with $\pi_{ki} = P_j \bmod p_{ki}$ and $i = 1,2 \ldots n - \nu$.

Figure 12:
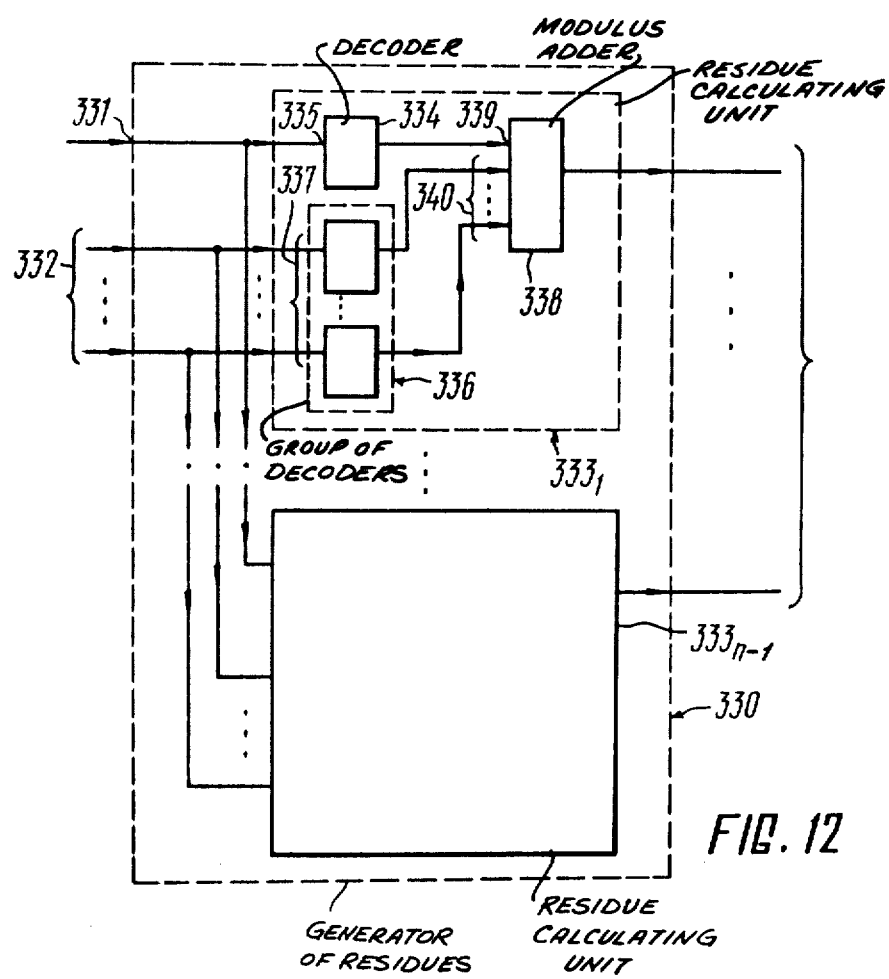
FIG. 12 is a block diagram of the generator of residues according to the invention.

The derived second part $\tilde{A}_k$ of the quotient $(A-a)_p$ is applied from the output of the decoders unit 341 to the first output of the division unit 297 and to the input 346 of the position attribute generator 343 whose operation is similar to that of the above-described position attribute generator 328. The position attribute $R_{A_k}$ of the second part $\tilde{A}_k$ of the quotient $(A-a)/P$ is applied from the output of the position attribute generator 343 to the second input 347 of the generator 345 of residues, whose first input receives the second part $\tilde{A}_k$ of the quotient $(A-a)/P$ from the output of the decoders unit 341. The generator 345 of residues operate in a similar manner as the generator 330 of residues (FIG. 12). Thus, the calculated first part $$\left(\frac{A-a}{P}\right)_j = \tilde{A}_j$$

of the quotient $(A-a)/P$ is applied from the output of the generator 345 of residues to the second part of the output of the division unit 297.

The operation of the second division unit 306 (FIG. 10) is similar to that of the above-described first division unit 297, the only difference being that applied to its input is the first part $(B-b)_j$ of the difference $B-b$. In this case, the first part $$\left(\frac{(B-b)}{P}\right)_j$$

of the quotient $(B-b)/P$ is formed in accordance with $$\frac{(B-b)}{P_j} = \frac{(B-b)_j}{P_k} = B_j \qquad (47)$$

or $$\tilde{B}_j = \tilde{\beta}_{ji}, \tilde{\beta}_{jx} \ldots \tilde{\beta}_{j\nu})$$

where $\tilde{\beta}_{ji} = \beta'_{ji}/\pi_{ji} \bmod P_{ji}$ with $\pi_{ji} = P_k \bmod P_{ji}$ and $i = 1,2 \ldots \nu$.

The derived first part $B_j$ of the quotient $(B-b)/P$ is formed at the first part of the output of the division unit 306, while the second part $\tilde{B}_j$ of the quotient $(B-b)/P$ is formed at the second part of the output of the second division unit 306.

The first part $\tilde{A}_j$ is applied from the second part of the output of the first division unit 297 via the second channel 368 (FIG. 14) of the first input 309 of the multiplication unit 308 to the first input of the fifth AND-gate unit 375, and the first part $\tilde{B}_j$ is applied from the first part of the output of the second division unit 306 via the first channel 369 of the second input 310 to the first input of the seventh AND-gate unit 377. In the presence of a signal, applied from the control bus 42 via the seventh input 315 of the multiplication unit 308 at the second inputs of the fifth and seventh AND-gate units 375 and 377, the values $\tilde{A}_j$ and $\tilde{B}_j$ pass to the inputs of the fourth decoder unit 386. From the output of the unit 386, the first part $(\tilde{A} \cdot \tilde{B})_j$ of the product $\tilde{A} \cdot \tilde{B}$ is applied to the first channel 392 of the third output of the multiplication unit 308.

The second part $\tilde{A}_k$ is applied from the first part of the output of the first division unit 297 via the first channel 367 of the first input 309 of the multiplication unit 308 to the first input of the third AND-gate unit 373, and the second part $\tilde{B}_k$ is applied from the second part of the output of the second division unit 306 through the second channel 370 of the second input 310 to the first input of the ninth AND-gate unit 379. In the presence of a signal at the second inputs of the third and ninth AND-gate units 373 and 379, which signal arrives from the seventh input 315 of the multiplication unit 308, the values $\tilde{A}_k$ and $\tilde{B}_k$ pass to the inputs of the third decoder unit 385. From the output of the unit 385, the second part $(\tilde{A}.\tilde{B})_k$ of the product $\tilde{A}.\tilde{B}$ is fed to the third channel 391 of the second output of the multiplication unit 308.

The first part $(\tilde{A}.\tilde{B})_j$ from the first channel 392 and the second part $(\tilde{A}.\tilde{B})_k$ from the second channel 391 of the third output of the multiplication unit 308 are applied, respectively, via the first channel 399 and the second channel 400 of the first input 321 of the modulo adders unit 320 to the first inputs of the first and second modulo adders subunits 405 and 406.

The first part $A_j$ of the multiplicand A, which is equal to the first part $a_j$ of the multiplicand correction a, i.e. $a_j = A_j$, is applied from the first channel 348 of the multiplicand bus 50 via the third input 311 of the multiplication unit 308 to the first input of the twelfth AND-gate unit 382 and, in the presence of a signal at the second input from the seventh input 315 of the multiplication unit 308, passes to the input of the sixth decoder unit 388. From the output of the unit 388, the first part $a_j \cdot B_j = (a \cdot B)_j$ of the new multiplier is applied to the first channel 398 of the first output of the multiplication unit 308.

The second part $a_k$ of the multiplicand correction a is applied from the output of the first correction generator 290 via the fifth input 313 of the multiplication unit 308 to the first input of the eleventh AND-gate unit 381 and, in the presence of a signal applied from the seventh input 315 of the multiplication unit 308 at the second input, passes to the input of the fifth decoder unit 387. From the output of the unit 387, the second part $a_k \cdot \tilde{B}_k = (a \cdot B)_k$ of the new multiplier is applied to the second channel 397 of the first output of the multiplication unit 308.

The first part $b_j$ of the multiplier correction b is applied from the output of the second correction generator 299 via the sixth input 314 of the multiplication unit 308 to the first input of the second AND-gate unit 372 and, in the presence of a signal applied from the seventh input 315 of the multiplication unit 308 at the second input, passes to the input of the second decoder unit 384. From the output of the unit 384, the first part $b_j \cdot \tilde{A}_j = (b \cdot \tilde{A})_j$ of the new multiplier is applied to the first channel 390 of the second output of the multiplication unit 308.

The second part $B_k$ of the multiplier B, which is equal to the second part $b_k$ of the multiplier correction b, i.e. $b_k = B_k$, is applied from the second channel 351 of the multiplier bus 48 via the fourth input 312 of the multiplication unit 308 to the first input of the first AND-gate unit 371 and, in the presence at the second input of a signal applied from the seventh input 315 of the multiplication unit 308, passes to the input of the first decoders unit 383. From its output, the second part $b_k \cdot \tilde{A}_k = (b \cdot \tilde{A})_k$ of the new multiplier $b \cdot \tilde{A}_k$ is applied to the second channel 389 of the second output of the multiplication unit 308.

At this moment, the second stage of operation starts, which is characterized by the absence of a signal at the control bus 42, as well as by the fact that the new multiplicand $a \cdot \tilde{B}$ and the new multiplier $b \cdot \tilde{A}$ are used as the multiplicand A and multiplier B, respectively.

In this case, the first part $(a \cdot \tilde{B})_j$ of the new multiplicand $a \cdot \tilde{B}$ is applied from the first channel 398 of the first output of the multiplication unit 308 via the third input 316 of the first correction generator 290 to the first input 355 of the second AND-gate unit 354 and, in the absence of a signal at the inverse input 356, passes to the second input of the OR-gate unit 358. The second part $(a \cdot \tilde{B})_k$ of the new multiplicand $a \cdot \tilde{B}$ is applied from the second channel 397 of the first output of the multiplication unit 308 via the fourth input 317 of the first subtraction unit 293 to the first input 362 of the second AND-gate unit 361, and, in the absence of a signal at the inverse input 363, passes to the second input of the OR-gate unit 365. Similarly, the first part $(b \cdot \tilde{A})_j$ of the new multiplier $b \cdot \tilde{A}$ is applied from the first channel 390 of the second output of the multiplication unit 308 to the fourth input 319 of the second subtraction unit 302. The second part $(b \cdot \tilde{A})_k$ of the new multiplier $b \cdot \tilde{A}$ is applied from the second channel 389 of the second output of the multiplication unit 308 to the third input 318 of the second correction generator 299. From this moment on, the operation of the first and second correction generators 290 and 299, the subtraction units 293 and 302, and the division units 297 and 306 is similar to the one described above.

The first part $$\left(\frac{a \cdot \tilde{B}}{P_j}\right)_j$$

and the second part $$\left(\frac{a \cdot \tilde{B}}{P_j}\right)_k$$

of the quotient $$\frac{a \cdot \tilde{b}}{P_j}$$

are applied from the second and first part of the output of the first division unit 297 via the channels 368 and 367 of the first input 309 of the multiplication unit 309 to the first inputs of the sixth and fourth AND-gate units 376 and 374, respectively, and, in the absence of a signal from the seventh input 315 of the multiplication unit 308 at the inverse inputs, pass to the first channel 396 and second channel 395 of the fifth input of the multiplication unit 308.

The first part $$\left(\frac{b \cdot \tilde{A}}{P_k}\right)_j$$

and the second part $$\left(\frac{b \cdot \tilde{A}}{P_k}\right)_k$$

of the quotient $$\frac{b \cdot \tilde{A}}{P_k}$$

are applied from the first and second part of the output of the second division unit 306 via the channels 369 and 370 of the second input 310 of the multiplication unit 308 to the first inputs of the eighth and tenth AND-gate units 378 and 380 and, in the absence of a signal at the inverse inputs, pass to the first channel 394 and the second channel 393 of the fourth output of the multiplication unit 308.

The first parts $$\left(\frac{a \cdot \tilde{B}}{P_j}\right)_j \text{ and } \left(\frac{b \cdot \tilde{A}}{P_k}\right)_j$$

of the quotients $$\frac{a \cdot \tilde{B}}{P_j} \text{ and } \frac{b \cdot \tilde{A}}{P_k}$$

are applied from the first channels 396 and 394 of the fifth and fourth outputs of the multiplication unit 308 via the first channels 401 and 403 of the second input 322 and the third input 323 of the modulo adders unit 320 to the second and third inputs of the first modulo adders subunit 405. From the output of the subunit 405, the first part $C'_j$ of the desired product $C'$ is applied via the first channel of the output of the unit 320 to the product bus 38.

The second parts $$\left(\frac{a \cdot \tilde{B}}{P_j}\right)_k \text{ and } \left(\frac{b \cdot \tilde{A}}{P_k}\right)_k$$

of the quotients $$\frac{a \cdot \tilde{B}}{P_j} \text{ and } \frac{b \cdot \tilde{A}}{P_k}$$

are applied from the second channels 395 and 393 of the fifth and fourth outputs of the multiplication unit 308 via the second channels 404 and 402 of the third input 323 and the second input 322 of the modulo adders unit 320 to the third and second, inputs of the second modulo adders subunit 406. From its output, the second part $C'_k$ of the desired product $C'$ is applied via the second channel of the output of the unit 320 to the product bus 38.

Thus, in the proposed multiplier, the product of multiplication of the multiplicand A by the multiplier B is found in accordance with expressions (34) and (41).

Therewith, in accordance with expression (41), the multiplicand A had to be divided by the first part $P_j$ and the multiplier B by the second part $P_k$ of the number system range limit value P. Since both the first part $P_j$ and the second part $P_k$ of the limit value P include respective bases $p_{j1}, p_{j2} \ldots p_j\nu$, $p_{k1}, p_{k2} \ldots p_k(n-\nu)$, to make this division possible, the correction values $a$ and $b$ of the multiplicand A and multiplier B had to be determined first.

The number system range limit value P being divided into the first part $P_j$ and the second part $P_k$ is the reason why the multiplicand A, the multiplier B, the multiplicand correction $a$ and the multiplier correction $b$ should also be regarded as consisting of two respective parts.

Such subdivision has made it possible to facilitate finding the correction values $a$ and $b$ since $a_j = A_j$ and $b_k = B_k$.

In this case, $(A - a)_j$ and $(B - b)_k$ are equal to zero, which is another factor facilitating the process of finding the product.

In addition, representation of the desired product $C'$ in the form of expression has made it possible to use the same hardware twice, namely, once for operation on the initial values of the multiplicand A and multiplier B, then, for operation on the values of the new multiplicand $a \cdot \tilde{B}$ and the new multiplier $b \cdot \tilde{A}$.

The desired product $C'$ is obtained in accordance with expression 41 by way of adding up the results of the operation of the proposed device, derived for the first and second times The proposed shifting device 40 operates as follows.

The second operand B, which is represented in the system of residual classes as $B = (\beta_1, \beta_2 \ldots \beta_n)$, where $B = B_i \bmod p_i$ with $i = 1, 2 \ldots n$, and the position attribute $R_B$ are applied to the inputs of either the first shift unit 417 (FIG. 15) or the second shift unit 420.

The second operand B and the position attribute $R_B$ are applied via the first AND-gate unit 409 to the first shift unit 417 if the signal at the input 408 of the docoder 407 corresponds to the operation of a right shift by one bit. In this case, from the output of the decoder 407 there is derived a signal corresponding to 1. The result of the operation of shifting the second operand B is applied from the output of the first shift unit 417 via the OR-gate unit 423 to the first output of the shifting device 40.

The second operand B and the position attribute $R_B$ are applied via the second AND-gate unit 410 to the second shift unit 420 if the signal at the input 408 of the decoder 407 corresponds to the operation of a left shift by one bit. In this case, from the output of the decoder 407 there is derived a signal corresponding to zero. The result of the operation of shifting the second operand B is applied from the first output of the second shift unit 420 via the OR-gate unit 423 to the first output of the shifting device 40. A left shift by one bit corresponds to multiplying the second operand B by two, so there may occur a situation when the result of a left shift of the second operand B is greater than the range P of the number system, i.e. $2 \cdot B > P$. In this case, from the second output of the second shift unit 420 there is derived an overflow signal equal to 1, which signal, is applied to the second output of the shifting device 40.

The first shift unit 417 operates as follows.

The second operand B and the position attribute $R_B$ are applied to the inputs 427 (FIG. 16) and 428, respectively, of the parity generator 426.

The parity value $\psi(B)$ of the second operand B is applied from the output of the parity generator 426 to the second input 431 of the division unit 429 to whose first input 430 there is applied the second operand B.

From the output of the division unit 429 there is derived the sought for value of the second operand B shifted to the right by one bit. This value is equal to B/2 if the parity value $\psi(B)$ of the second operand B is equal to zero, or it is equal to $$\frac{B-1}{2}$$

if the parity value ψ (B) of the second operand B is equal to 1.

The second shift unit 420 operates as follows.

The second operand B is applied to the input 433 (FIG. 17) of the position attribute generator 432. From the residual value of the second operand B equal to ($\beta_1$, $\beta_2 \ldots \beta_n$), the position attribute generator 432 calculates the true value $R_{2B}$ of the position attribute of the doubled second operand B.

Apart from this, the second operand and the position attribute $R_B$ are applied to the first input 435 and the second input 436 of the shift circuit 434, from whose first output there is derived the result of the operation of a left shift by one bit, which result is applied to the first output of the second shift unit 420.

From the second output of the shift circuit 434 there is derived the rating value of the position attribute $\overline{R}$ of the result of a left shift by one bit, which value is applied to the first input 438 of the comparison circuit 437.

The rating value of the position attribute $\overline{R}$ is compared to the true value of the position attribute, which is applied to the second input 439 of the comparison circuit 437. If these values are equal, from the output of the comparison circuit 437 there is derived a signal corresponding to zero.

If the rating value of the position attribute $\overline{R}$ is not equal to the true value of the position attribute, from the output of the comparison circuit 437 there is derived a signal corresponding to 1, which signal is applied to the second output of the second shift unit 420.

The shift circuit 434 operates as follows.

From the first input 435 (FIG. 18) of the shift circuit 434, the second operand B is applied to the input 441 of the group 440 of decoders. Each decoder $440_1 \ldots 440_n$ of the group 440 of decoders converts the respective values of the residues $\beta_1 \ldots \beta_n$ of the second operand B into residues $\overline{\beta}_1 \ldots \overline{\beta}_n$ according to the formula $$\overline{\beta}_i = 2\beta_i \bmod p_i \quad (49),$$

with $n = 1, 2 \ldots n$.

The values $\overline{\beta}_i$ (with $i = 1, 2 \ldots n$) are derived from the first outputs of the respective decoders $440_1 \ldots 440_n$ and applied to the first output of the shift circuit 434.

From the second outputs of the decoders $440_1 \ldots 440_n$, there are taken the values $\epsilon_i$ which are formed according to the formula:

$$\epsilon_i = \begin{cases} \tau_i \text{ if } 2\beta_i \geq p_i \\ o \text{ if } 2\beta_i \geq p_i \end{cases}$$

where $\tau_i$ are constants of the number system.

The values $\epsilon_i$ (with $i = 1, 2 \ldots n$) are applied to the first input 446 of the adder 445.

The value $R_B$ of the position attribute of the second operand B is applied from the second input 436 of the shift circuit 434 to the input 444 of the position attribute decoder 443 from whose output the doubled value $R_{2B}$ is applied to the second input 448 of the adder 445.

From the output of the adder 445, there is taken the rating value R of the position attribute of the result of a left shift of the second operand B by one bit. This value is applied to the second output of the shift circuit 434.

The rule of forming the rating value is written as follows:

$$\overline{R} = \alpha R_\beta + \sum_{i=1}^{n} \epsilon_i \quad (50).$$

Operation of the proposed data analyzer 72 is based on the simplicity of performing the operation of determining the parity value of an operand with the aid of its position attribute R.

In the present disclosure, ψ (N) denotes information on the parity of the operand N. ψ (N) may have the following values:

$$\Psi(N) = \begin{cases} 0 \text{ if } N \text{ is even} \\ 1 \text{ if } N \text{ is odd}. \end{cases}$$

ψ (A) and ψ (B) designate the parity values of the operands A and B. ψ (A + B) designates the parity value of the sum of said operands A and B. It is assumed that the parity value of the range P of the number system is equal to one, i.e. ψ (P) = = 1. If ψ (A) ⊕ ψ (B) = ψ (A + B), it is assumed that there is no overflow; if ψ (A) ⊕ ψ (B) ≠ ψ (A + B), it is assumed that there is an overflow.

A solution to the problem of determining the value of the overflow attribute Ω, when adding positive operands, makes it possible to find the value of the sign of the result in the operation of algebraically adding operands, when the operation of subtraction is replaced by that of addition, which is done as follows:

1. If $Z_A = Z_B = 0$, then $Z_S = 0$ ($S = A + B$); one must now proceed to finding the value of the overflow attribute Ω.

2. If $Z_A = Z_B = 1$, then $Z_S = 1$ ($S = A + B$); one must then proceed to finding the value of the overflow attribute Ω.

If the signs of the first operand A and second operand B are the same, the result of the operation may be beyond the range P of the number system, which makes it necessary to determine the overflow attribute.

3. If $Z_A = 0$ and $Z_B = 1$, then $S = A + (P - B)$. If in this case Ω = 1, then $Z_S = 0$. If, however, Ω = 0, then $Z_S = 1$.

If the signs of the first operand A and the second operand B are different, the value of the overflow attribute Ω is used to determine the sign of the result.

Operation of the proposed adder is based on the simple principle of determining the parity of a number with the aid of its position attribute.

Consider now operation of a data analyzer intended to determine the presence of an overflow attribute in algebraically adding and substracting operands.

The operands A and B with respective position attributes $R_A$ and $R_B$ are applied to the inputs of the first parity generator 449 (FIG. 19) and the second parity generator 452, respectively.

The algebraic sum of the first operand A and the second operand B is applied to the input of the position attribute generator 457. From the output of the generator 457, the position attribute $R_{A \bullet B}$ and the algebraic sum of the first operand A and the second operand B are applied to the input of the third parity generator 455.

The parity values ψ (A) and ψ (B) of the first operand A and the second operand B from the outputs of the generators 449 and 452, as well as the parity value ψ

(A*B) of the algebraic sum of the first operand A and the second operand B from the output of the third generator 455, are applied, with the signs $Z_A$ and $Z_B$ of the first operand A and the second operand B, to the inputs of the logical unit 460.

According to a signal as to the type of operation being performed (addition or substraction) from the control bus 76, the logical unit 460 produces a corresponding overflow attribute and a signal corresponding to the sign of the algebraic sum of the first operand A and the second operand B.

Consider now operation of the analysis unit in more detail.

The value of the first operand A and that of the position attribute $R_A$ are applied from the bus 79 of the first operand and the bus 80 of the position attribute, of the first operand, to the multichannel input 450 and the input 451, respectively, of the first parity generator 449.

Operation of the parity generator will be described below.

The value of the second operand B and that of the position attribute $R_B$ are applied from the second operand bus 81 and the bus 82 of the position attribute of the second operand, to the multichannel input 453 and the input 454, respectively, of the second parity generator 452.

From the bus 83 of the algebraic sum of the first operand A and the second operand B, the value of the algebraic sum of said operands is applied to the multichannel input 458 of the position attribute generator 457. From the output of the generator 457, the value of the position attribute $R_{A*B}$ is applied to the input 459 of the parity generator 455 to whose multichannel input 456 there is applied the value of the algebraic sum of the first operand A and the second operand B.

The parity value $\psi$ (A) of the first operand A, the parity value $\psi$ (B) of the second operand B, and the parity value $\psi$ (A*B) of the algebraic sum of the first operand A and the second operand B are applied from the output of the generator 449, the output of the generator 452 and the output of the generator 455 to the first input 461, the second input 462 and the third input 463, respectively, of the logical unit 460. From the sign bus 77 of the first operand to the fourth input 464 of the logical unit 460, there is applied the sign $Z_A$ of the first operand A. From the sign bus 78 of the second operand to the fifth input 465 of the logical unit 460, there is applied the sign $Z_B$ of the second operand B.

By a signal applied to the sixth input 466 of the logical unit 460, there is carried out the formation of the signal $Z_{A*B}$ of the algebraic sum of the first operand A and the second operand B, which is then passed on to the third output of the analysis unit 72. From the second output of the logical unit 460, the overflow attribute $\Omega$ is applied to the fourth, output of the analysis unit 72. If there is an overflow, $\Omega = 1$; otherwise $\Omega = 0$.

The parity generator 449 operates as follows. The value of the first operand A, which is represented in the system of residual classes as $A = (\alpha_1, \alpha_2 \ldots \alpha_n)$, is applied to the multichannel input 450 of the generator 449 (FIG. 22). The values of the residues $\alpha_i$, with $i = 1, 2 \ldots n$, which are applied via the inputs $509_1 \ldots 509_n$ to the second inputs $508_1 \ldots 508_n$ of the AND gates $506_1 \ldots 506_n$, either pass or do not pass through the AND-gates $506_1 \ldots 506_n$ depending upon signals from the memory register 505, which are applied to the first inputs $507_1 \ldots 507_n$ of the AND-gates $506_1 \ldots 506_n$. An $i$th signal from the memory register 505 is equal to 1 if the constant $\tau_i$ is odd, and to 0 if the constant $\tau_i$ is even, with $i = 1, 2 \ldots n$.

Signals from the outputs of the gates $506_1 \ldots 506_n$ and the value $R_A$ of the position attribute of the first operand A from the input 451 of the generator 449 are applied to the inputs of the modulo 2 adder 510. From the output of the modulo 2 adder 510, there is removed the sought for parity value $\psi$ (A) of the first operand A.

The second parity generator 452 and the third parity generator 455 operate in a manner similar to that of the generator 449.

The position attribute generator 457 operates as follows. The value of the algebraic sum of the first operand A and the second operand B, represented in the system of residual classes as $A*B = (\gamma_1, \gamma_2 \ldots \gamma_n)$, is applied to the multichannel input 458 (FIG. 21) of the generator 457. The sign * designates the operation that is being carried out. The values of the residue $\gamma_i$, with $i = 1, 2 \ldots n$, are applied via the inputs $502_1 \ldots 502_n$ of the generator 457 to the inputs $501_1 \ldots 501_n$ of the decoders $500_1 \ldots 500_n$. Each of the decoders $500_1 \ldots 500_n$ of the group of decoders 500 transforms $\gamma_i$ into $Q_i \cdot \gamma_i$, where $Q_i$ is the number system constant, while $i = 1, 2 \ldots n$. From the outputs of the decoders $500_1 \ldots 500_n$, $Q_i \cdot \gamma_i$ are applied to the inputs $504_1 \ldots 504_n$ of the modulo adder 503. From the output of the modulo adder 503, there is removed the sought for value of the position attribute $R_{A*B}$ of the algebraic sum of the first operand A and the second operand B. The rule of the formation of the position attribute in the modulo adder 452 can be expressed as follows:

$$R_{A*B} = Q_1 \cdot \gamma_1 + Q_2 \cdot \gamma_2 + \ldots + Q_n \cdot \gamma_n \bmod R_P \qquad (51)$$

The logical unit 460 operates as follows. A signal from the control bus 76 (FIG. 19) is applied via the sixth input 466 of the logical unit 460 to the input 471 (FIG. 20) of the decoder 470.

The decoder 470 transforms the input signal, corresponding to the addition operation, into an output signal equal to "0" ($C=0$); it transforms the input signal corresponding to the operation of subtraction into an output signal equal to "1" ($C=1$). The output signals $C = 0$ and $C = 1$ are applied from the output of the decoder 470 to the third input 472 of the adder 467.

The value of the sign $Z_A$ of the first operand A is applied via the fourth input 464 of the logical unit 460 to the first input 468 of the adder 467.

The value of the sign $Z_B$ of the second operand B is applied via the fifth input 465 of the logical unit 460 to the second input 469 of the adder 467.

The adder 467 calculates the sum $$Z_S = Z_A \oplus Z_B \oplus C \qquad (52)$$

A zero value of the sum $Z_S$ indicates that the first operand A and the second operand B have the same sign. Here is what takes place in this case:

firstly, the value of the sign $Z_A$ of the first operand A is applied via the first AND-gate 473 and the OR-gate 476 to the first output of the logical unit 460, thus forming the value of the sign $Z_{A*B}$ of the algebraic sum of the first operand A and the second operand B; and, secondly, at the output of the second modulo 2 adder 482 there is formed the value of the overflow attribute, which is determined by the formula:

$$\Omega = \psi(A) \oplus \psi(B) \oplus \psi(A*B) \qquad (53)$$

which value is applied via the fourth AND-gate 481 to the second output of the logical unit 460. The value of the parity function $\psi$ (A) of the first operand A is applied via the first input 461 of the logical unit 460 to the second input 484 of the adder 482, the value of the parity function $\psi$ (B) of the second operand B is applied via the second input 462 of the logical unit 460 to the third input 485 of the adder 482; and the value of the parity function $\psi$ (A * B) of the algebraic sum of the first operand A and the second operand B is applied via the third input 463 of the logical unit 460 to the fourth input 486 of the adder 482.

A value of the sum, equal to 1, $Z_{S1} = Z_A \oplus Z_B \oplus C$, calculated by the modulo 2 adder 467, indicates that the first operand A and the second operand B have different signs, taking into account the type of operation being performed. In this case at the output of the second modulo 2 adder 482 there is formed the value of the overflow attribute $\Omega$, which is determined by the formula:

$$\Omega = \psi(A) \oplus \psi(B) \oplus \psi(A * B) \oplus 1 \quad (54)$$

which value is used to determine the sign of the result, because there can be no overflow while adding numbers with opposite signs. From the constant register 478, unity is applied via the AND-gate 479 to the first input 483 of the adder 482.

A value of $\Omega$ equal to 1 indicates that the sign of the algebraic sum of the first operand A and second operand B is positive, i.e. $Z_{A*B} = 0$, and corresponds to the application of zero from the inverting output of the third AND-gate 480 via the OR-gate 476 to the first output of the logical unit 460.

A value of $\Omega$ equal to zero indicates that the sign of the algebraic sum of the first operand A and second operand B is negative, i.e. $Z_{A*B} = 1$. This corresponds to applying "1" from the inverting output of the third AND-gate 480 via the OR-gate 476 to the first output of the logical unit 460.

In case the value of the sum $S_1 = Z_A \oplus Z_B \oplus C$ is equal to 1, apart from the operations described above with reference to FIG. 20, the following signals are produced:

firstly, if the sign of the first operand A is negative, i.e. $Z_A = 1$, from the direct output of the fifth AND-gate 494 there is removed a signal for changing the value of the first operand A by P − A. If the sign of the first operand A is positive, i.e. $Z_A = 0$, from the inverting output of the fifth AND-gate 494 there is removed a signal for changing the value of the second operand B by P − B; and, secondly, the zero value of $$\Omega = \psi(A) \oplus \psi(B) \oplus \psi(A * B) \oplus 1$$

removed from the output of the second modulo 2 adder 482 makes it possible to form at the output of the sixth AND-gate 497 a signal to change the value of the algebraic sum of the first operand A and the second operand B by P − (A * B).

The present invention makes it possible to develop a fundamentally new family of computers operating in the system of residual classes.

To be more specific the processor in accordance with the invention provides for multiplication and division of arbitrarily chosen numbers, represented in the system of residual classes, without broadening the range P of the initial number system. The proposed processor makes it possible to find the overflow attribute and sign of the result of any operation. It can shift numbers to the right and to the left and perform any reasonable (modular) operation within the range P of the number system.

In addition, the proposed processor operating in the system of residual classes makes it possible to increase the operating speed and reliability of the computer as a whole.

What is claimed is:

1. A central processing unit for numbers represented in the system of residual classes, comprising:
first and second input buses of first and second operands, respectively;
a control bus;
first and second input sign buses of signs of said first and second operands, respectively;
an output result bus;
an output result sign bus;
an output overflow attribute bus;
first and second operand registers for storing the first and second operands, respectively, each of said operand registers having an input and an output,
said inputs of said first and second registers being connected to said first and second buses, respectively;
a modular arithmetic unit, to perform operations of multiplication, subtraction and addition within the range of the system of residual classes, having
first, second, third, and fourth inputs and an output,
said first and second inputs of said modular arithmetic unit being connected to said outputs of said first and second operand registers, respectively,
said third input of said modular arithmetic unit being connected to said control bus;
first and second sign registers, to store the signs of the first and second operands, respectively, each of said sign registers having an
input and an output,
said inputs of said first and second sign registers being connected to said first and second input sign buses, respectively;
an analysis system, to determine the sign of the result of an operation and the overflow attribute, having
first, second, third, fourth, fifth, sixth, seventh, eighth and ninth inputs and first, second and third outputs,
said first and second inputs of said analysis system being connected to said outputs of said first and second operand registers, respectively,
said third and fourth inputs of said analysis system being connected to said outputs of said first and second sign registers, respectively,
said fifth input of said analysis system being connected to said control bus,
said first output of said analysis system being connected to said fourth input of said modular arithmetic unit;
a result register to store the result of operations having
first, second, third and fourth inputs and an output,
said first input of said result register being combined with said sixth input of said analysis system and being connected to said output of said modular arithmetic unit,
said output of said result register being connected to said output result bus;
a result sign register to store the sign of the result having
an input and an output,
said input of said result sign register being connected to said second output of said analysis system, said output of said result sign register being connected to said output result sign bus;

a first generator and a second generator to calculate the position attributes of the first and second operands, respectively, each of said generators having an input and an output, said inputs of said first and second generators being connected to said outputs of said first and second operand registers, respectively, said outputs of said first and second generators being connected to said seventh and eighth inputs, respectively, of said analysis system;

a multiplier having first, second and third inputs and an output, said output being connected to said third input of said result register, said first input being connected to said control bus, said second input being connected to said output of said second operand register, and said third input being connected to said output of said first operand register;

a divider having first, second, third, fourth and fifth inputs and an output, said output being connected to said second input of said result register, said first input being connected to said control bus, said second input being connected to said output of said second generator, said third input being connected to said output of said second operand register, said fourth input being connected to said output of said first operand register, and said fifth input being connected to said output of said first generator;

a shifting device to shift one of the operands having first, second and third inputs and first and second outputs, said first input being connected to said control bus, said second input being connected to said output of said second generator, said third input being connected to said output of said second operand register, said first output being connected to said fourth input of said result register, and said second output being connected to said ninth input of said analysis system;

an overflow attribute register, to store the overflow attribute when adding and subtracting the first and second operands, having an input and an output, said input being connected to said third output of said analysis system, said output being connected to said output overflow attribute bus.

2. A central processing unit as claimed in claim 1, wherein said analysis system comprises:

an operation decoder, to convert a control signal into a binary code corresponding to an operation being performed, having an input and first, second and third outputs, said input being connected to said fifth input of said analysis system;

first, second, third, fourth, fifth, sixth, seventh, eighth, ninth, tenth and eleventh AND-gates, each of said AND-gates having first and second inputs and an output, said first inputs of said first, second, third, fourth, fifth, sixth, seventh and eighth AND-gates being combined and being connected to said first output of said operation decoder, said second inputs of said first, second, third, fourth, fifth, sixth, seventh, eighth and eleventh AND-gates being respectively connected to the fifth, third, fourth, first, seventh, second, eighth, sixth and ninth inputs of said analysis system, said first input of said ninth AND-gate being connected to said second output of said operation decoder, said second input and a third input of said ninth AND-gate being connected to said third and fourth inputs, respectively, of said analysis system, said first input of said tenth AND-gate being connected to said fourth input of said analysis system, said second input of said tenth AND-gate being combined with said first input of said eleventh AND-gate and being connected to said third output of said operation decoder;

an analysis, unit to determine the sign of the result and the overflow attribute when adding and subtracting the first and second operands, having first, second, third, fourth, fifth, sixth, seventh and eighth inputs and first, second, third, fourth and fifth outputs, said inputs of said analysis unit being respectively connected to said outputs of said first, second, third, fourth, fifth, sixth, seventh and eighth AND-gates, said first, second and fifth outputs being connected to said first output of said analysis system;

a first OR-gate having first, second, and third inputs and an output, said second input being connected to said output of said tenth AND-gate, said third input being connected to said third output of said analysis unit, and said output being connected to said second output of said analysis system;

a second OR-gate haing a first input connected to said output of said eleventh AND-gate, a second input connected to said fourth output of said analysis unit, and an output connected to said third output of said analysis system;

a modulo 2 adder, to form the sign of the result of operations of multiplication and division, having first and second inputs and an output, said first and second inputs being connected to first and second outputs of said ninth AND-gate, said first input of said first OR-gate being connected to said output of said modulo 2 adder.

3. A central processor unit as claimed in claim 2, wherein the analysis unit comprises:

a first parity generator, to calculate the parity of the first operand, having first and second inputs and an output, said first and second inputs being respectively connected to said fourth and fifth inputs of said analysis unit; a second parity generator, to calculate the parity of the second operand, having first and second inputs and an output, said first and second inputs being respectively connected to said sixth and seventh inputs of said analysis unit; a third parity generator, to calculate the parity of the algebraic sum of the first and second operands, having first and second inputs and an output, said first input being connected to said eighth input of said analysis unit;

a position attribute generator, to calculate the algebraic sum of said first and second operands, having a multichannel input and an output, said multichannel input of said position attribute generator being connected to said eighth input of said analysis unit, said second input of said third parity generator being connected to said output of said position attribute generator;

a logical unit, to produce the overflow attribute and the sign of the algebraic sum of the first and second operands, having first, second, third, fourth, fifth and sixth inputs, and first, second, third, fourth and fifth outputs, said first, second and third inputs of said logical unit being respectively connected to said outputs of said first, second and third parity generators, said fourth and fifth inputs of said logical unit being respectively connected to said second and third inputs of said analysis unit, said sixth input of said logical unit beong connected to said first input of said analysis unit, said first, second, third, fourth and fifth outputs of said logical unit being respectively connected to said first, second, third, fourth and fifth outputs of said analysis unit.

4. A central processing unit as claimed in claim 1, wherein the divider comprises:

a divisor analysis unit, to select an elementary divisor, having a multichannel input, first, second, third and fourth inputs and first and second outputs, said first input being connected to said third input of said divider, and said second input being connected to said first input of said divider;

a division unit, for dividing the dividend and the divisor by an elementary divisor with the aid of position attributes, havng first, second, third, fourth, fifth, sixth, seventh and eighth inputs, first, second and third multichannel inputs, first, second and third multichannel outputs and first and second outputs, said first multichannel input being connected to said fourth input of said divider, said first input being connected to said fifth input of said divider, said second multichannel input being connected to said third input of said divider, said second and third inputs being connected, respectively, to said first and second outputs of said divisor analysis unit, said fourth input being connected to said second input of said divider, said eighth input of said division unit being combined with said second input of said divisor analysis unit and being connected to said first input of said divider;

an end of iteration unit, to analyze the value of a partial quotient, having a multichannel input and an output, said multichannel input of said end of iteration unit being connected to said first multichannel output of said division unit and said multichannel input of said divisor analysis unit, said output of said end of iteration unit being connected to said fifth input of said division unit and said third input of said divisor analysis unit;

an end of division unit, to determine the end of the devision process, having an input, a multichannel input and an output, said input of said end of division unit being connected to said output of said end of iteration unit, said multichannel input of said end of division unit being connected to said second multichannel output of said division unit, said output of said end of division unit being connected to said sixth input of said division unit and said fourth input of said divisor analysis unit;

an adder, to accumulate partial quotients and supply the result at the end of the division process, having first, second and third inputs, a multichannel input and a multichannel output, said first input of said adder being connected to said output of said end of division unit, said multichannel input of said adder being connected to said second multichannel output of said division unit, said multichannel output of said adder being connected to said output of said divider;

a multiplier, to calculate the product of the partial quotient by the divisor when the division process is not yet completed, having first, second and third inputs, first and second multichannel inputs, an output and a multichannel output, said first input of said multiplier being connected to said output of said end of division unit, said first multichannel input of said multiplier being connected to said second multichannel output of said division unit, said second multichannel input of said multiplier being connected to said third input of said divider;

a product analysis unit having first, second, third, fourth and fifth inputs, first, second, third and fourth multichannel inputs and first and second outputs, said first input of said product analysis unit being connected to said output of said end of division unit, said first multichannel input of said product analysis unit being connected to said second multichannel output of said division unit, said second input of said product analysis unit being connected to said first output of said division unit, said second multichannel input and said third input of said product analysis unit being respectively connected to said multichannel output and said output of said multiplier, said third multichannel input of said product analysis unit being connected to said third input of said divider, said fourth input of said product analysis unit being connected to said second input of said divider, said fourth multichannel input and said fifth input of said product analysis unit being respectively connected to said third multichannel output and said second output of said division unit;

a unit for selecting the operating mode of the adder having first and second inputs and an output, said output of said unit for selecting the operating mode of the adder being connected to said second input of said adder, said first input of said unit for selecting the operating mode of the adder being combined with said second input of said multiplier and being connected to said first output of said product analysis unit, said second input of said unit for selecting the operating mode of the adder being connected to said second output of said product analysis unit and said third input of said adder;

a subtraction unit to produce a new dividend having first, second, third and fourth inputs, first and second multichannel inputs, a multichannel output and first and second outputs, said first and second inputs of said subtraction unit being respectively connected to said second and first outputs of said product analysis unit, said first multichannel input and said third input of said subtraction unit being respectively connected to said multichannel output and said output of said multiplier, said second multichannel input and said fourth input of said subtraction unit being respectively connected to said third multichannel output and said second output of said division unit, said multichannel output and said first output of said subtraction unit being respectively connected to said third multichannel input and said seventh input of said division unit, said second output of said subtraction unit being connected to said third input of said multiplier.

5. A central processing unit as claimed in claim 1, wherein the multiplier comprises:

a first correction generator, to calculate the multiplicand correction, having first, second and third inputs and an output, said first input of said first correction generator being connected to said third input of said multiplier, said second input of said first correction generator being connected to said first input of said multiplier;

a first subtraction unit, to calculate the difference between the multiplicand and the multiplicand correction, having first, second, third and fourth inputs and an output, said first input of said first subtraction unit being connected to said output of said first correction generator, said second input of said first subtraction unit being connected to said third input of said multiplier, said third input of said first subtraction unit being connected to said first input of said multiplier;

a first division unit, to calculate the first quotient of the division of the multiplicand and the multiplicand correction, having an input and an output, said input of said first division unit being connected to said output of said first subtraction unit;

a second correction generator, to calculate the multiplier correction, having first, second and third inputs and an output, said first input of said second correction generator being connected to said second input of said multiplier, said second input of said second correction generator being connected to said first input of said multiplier;

a second subtraction unit, to calculate the difference between the multiplier and the multiplier correction, having first, second, third and fourth inputs and an output, said first input of said second subtraction unit being connected to said output of said second correction generator, said second input of said second subtraction unit being connected to said second input of said multiplier, said third input of said second subtraction unit being connected to said first input of said multiplier;

a second division unit, to calculate the second quotient of the division of the difference between the multiplier and the multiplier correction by the second part of the number system range, having an input and an output, said input of said second division unit being connected to said output of said second subtraction unit;

a multiplication unit, to calculate the product of the first and second quotients, the product of the multiplicand correction by the second quotient, and the product of the factor correction by the first quotient, having first, second, third, fourth, fifth, sixth and seventh inputs, and first, second, third, fourth and fifth outputs, said first input of said multiplication unit being connected to said output of said first division unit, said second input of said multiplication unit being connected to said output of said second division unit, said third and fourth inputs of said multiplication unit being respectively connected to said third and said second inputs of said multiplier, said fifth and sixth inputs of said multiplication unit being respectively connected to said outputs of said first and second correction generators, said seventh input of said multiplication unit being connected to said first input of said multiplier, said first output of said multiplication unit being connected to said third input of said first correction generator and said fourth input of said first subtraction unit, said second output of said multiplication unit being connected to said third input of said second correction generator and said fourth input of said second subtraction unit;

a specified modulus adder unit, to calculate the result of the multiplication of the multiplicand and the multiplier, having first, second and third inputs and an output, said first, second and third inputs of said specified modulus adder being respectively connected to said third, fourth and fifth outputs of said multiplication unit, said output of said specified modulus adder unit being connected to said output of said multiplier.

6. A central processing unit as claimed in claim 1, wherein said shifting device comprises:

a decoder, to convert a control signal into a certain signal, depending upon the type of shift, having an input and an output, said input of said decoder being connected to the first input of said shifting device;

a first AND-gate unit having first, second and third inputs and first and second outputs; a second AND-gate unit having first, second and third inputs and first and second outputs, said first inputs of said first and second AND-gate units being combined and connected to said output of said decoder, said second inputs of said first and second AND-gate units being combined and connected to said third input of said shifting device, said third inputs of said first and second AND-gate units being combined and connected to said second input of said shifting device;

a first shift unit, to shift a second operand one bit to the right, having first and second inputs and an output, said first and second inputs of said first unit being respectively connected to said first and second outputs of said first AND-gate unit;

a second shift unit, to shift the second operand one bit to the left, having first and second inputs and first and second outputs, said first and second inputs of said second shift unit being respectively connected to said first and second outputs of said second AND-gate unit, said second output of said second shift unit being connected to said second output of said shifting device;

an OR-gate unit having first and second inputs and an output, said first and second inputs of said OR-gate unit being respectively connected to said output of said first shift unit and said first output of said second shift unit, said output of said OR-gate unit being connected to said first output of said shifting device.

7. A central processing unit as claimed in claim 6, wherein said first shift unit comprises:

a parity generator, to produce the parity values of a number, having first and second inputs and an output, said first and second inputs of said parity generator being respectively connected to said first and second inputs of said first shift unit;

a division unit, to divide a number by two, having first and second inputs and an output, said first input of said division unit being connected to said first input of said first shift unit, said second input of said division unit being connected to said output of said parity generator, said output of said division unit being connected to said output of said first shift unit.

8. A central processing unit as claimed in claim 6, wherein said second shift unit comprises:

a position attribute generator, to calculate the position attribute of a number being shifted, having an input and an output, said input of said position attribute generator being connected to said first input of said second shift unit;

a shift circuit, to multiply a number being shifted by two, having first and second inputs and first and second outputs, said first and second inputs of said shift circuit being respectively connected to the first and second inputs of said second shift unit, said first output of said shift circuit being connected to said first output of said second shift unit;

a comparison circuit having first and second inputs and an output, said first input of said comparison circuit being connected to said second output of said shift circuit, said second input of said comparison circuit being connected to said output of said position attribute generator, said output of said comparison circuit being connected to said second output of said shift unit.

9. A divider for numbers represented in the system of residual classes, comprising:

a multichannel divisor bus of a divisor;

a multichannel dividend bus of a dividend;

a dividend position attribute bus of a position attribute of said dividend;

a divisor position attribute bus of a position attribute of said divisor;

a control bus to initiate a signal to start division;

a divisor analysis unit to select an elementary divisor having a multichannel input and first, second, third and fourth inputs and first and second outputs, said first input being connected to said multichannel divisor bus, and said second input being connected to said control bus;

a division unit, for dividing the dividend and the divisor by an elementary divisor with the aid of position attributes, having first, second, third, fourth, fifth, sixth, seventh and eighth inputs, first, second and third multichannel inputs, first, second and third multichannel outputs and first and second outputs, said first multichannel input being connected to said multichannel dividend bus, said first input being connected to said dividend position attribute bus, said second multichannel input being connected to said multichannel divisor bus, said second and third inputs being connected, respectively, to said first and second outputs of said divisor analysis unit, said fourth input being connected to said divisor position attribute bus, said eighth input of said division unit being combined with said second input of said divisor analysis unit and being connected to said control bus;

an end of interation unit, to analyze the value of a partial quotient, having a multichannel input and an output, said multichannel input of said end of iteration unit being connected to said first multichannel output of said division unit and said multichannel input of said divisor analysis unit, said output of said end of iteration unit being connected to said fifth input of said division unit and said third input of said divisor analysis unit;

an end of division unit, to determine the end of the division process, having an input, a multichannel input and an output, said input of said end of division unit being connected to said output of said end of iteration unit, said multichannel input of said end of division unit being connected to said second multichannel output of said division unit, said output of said end of division unit being connected to said sixth input of said division unit and said fourth input of said divisor analysis unit;

a multichannel output bus of a result of division of said dividend and said divisor;

an adder, to accumulate partial quotients and supply the result at the end of the division process, having first, second and third inputs, a multichannel input and a multichannel output, said first input of said adder being connected to said output of said end of division unit, said multichannel input of said adder being connected to said second multichannel output of said division unit, said multichannel output of said adder being connected to said multichannel output bus;

a multiplier, to calculate the product of the partial quotient by the divisor when the division process is not yet completed, having first, second and third inputs, first and second multichannel inputs, an output and a multichannel output, said first input of said multiplier being connected to said output of said end of division unit, said first multichannel input of said multiplier being connected to said second multichannel output of said division unit, said second multichannel input of said multiplier being connected to said multichannel divisor bus;

a product analysis unit having first, second, third, fourth and fifth inputs, first, second, third and fourth multichannel inputs and first and second outputs, said first input of said product analysis unit being connected to said output of said end of division unit, said first multichannel input of said product analysis unit being connected to said second multichannel output of said division unit, said second input of said product analysis unit being connected to said first ouput of said division unit, said second multichannel input and said third input of said product analysis unit being respectively connected to said multichannel output and said output of said multiplier, said third multichannel input of said product analysis unit being connected to said multichannel divisor bus, said fourth input of said product analysis unit being connected to said divisor position attribute bus, said fourth multichannel input and said fifth input of said product analysis unit being respectively connected to said third multichannel output and said second output of said division unit;

a unit for selecting the operating mode of the adder having first and second inputs and an output, said output of said unit for selecting the operating mode of the adder being connected to said second input of said adder, said first input of said unit for selecting the operating mode of the adder being combined with said second input of said multiplier and being connected to said first output of said product analysis unit, said second input of said unit for selecting the operating mode of the adder being connected to said second output of said product analysis unit and said third input of said adder;

a subtraction unit to produce a new dividend having first, second, third and fourth inputs, first and second multichannel inputs, a multichannel output and first and second outputs, said first and second inputs of said subtraction unit being respectively connected to said second and first outputs of said product analysis unit, said first multichannel input and said third input of said subtraction unit being respectively connected to said multichannel output and said output of said multiplier, said second multichannel input and said fourth input of said subtraction unit being respectively connected to said third multichannel output and said second output of said division unit, said multichannel output and said first output of said subtraction unit being respectively connected to said third multichannel input and said seventh input of said division unit, said second output of said subtraction unit being connected to said third input of said multiplier.

10. A divider as claimed in claim 9, wherein said division unit comprises;

a first logical unit, to distribute the divisor among subunits of said division unit, having first, second, third, fourth and fifth inputs, first and second multichannel inputs, first and second outputs and first and second multichannel outputs, said second multichannel input and said second and third inputs of said first logical unit being respectively connected to said second multichannel input and said fourth and second inputs of said division unit, said fourth and fifth inputs of said first logical unit being respectively connected to said third and fifth inputs of said division unit;

a second logical unit, to distribute the dividend among subunits of said division unit, having first, second, third, fourth, fifth, sixth and seventh inputs, first second and third multichannel inputs, first, second and third outputs, and first, second and third multichannel outputs, said second and third inputs being respectively connected to said fifth and third inputs of said division unit, said second and third multichannel inputs and said fourth, fifth, sixth and seventh inputs of said second logical unit being respectively connected to said first and third multichannel inputs and said first, eighth, seventh and sixth inputs of said division unit;

a first halver having an input, a multichannel input, an output and a multichannel output, said multichannel input and said input of said first halver being respectively connected to said first multichannel output and said first output of said first logical unit;

a first unit for division by a predetermined number system base having an input, a multichannel input, a multichannel output and an output, said multichannel input and said input of said first unit for division by a predetermined number system base being respectively connected to said second multichannel output and said second output of said first logical unit;

a first OR-gate unit having first and second inputs, first and second multichannel inputs, an output and a multichannel output, said first multichannel input of said first OR-gate unit being connected to said multichannel output of said first halver, said first input of said first OR-gate unit being connected to said output of said first halver, said second multichannel input and said second input of said first OR-gate unit being respectively connected to said multichannel output and said output of said first unit for division by a predetermined number system base, said multichannel output and said output of said first OR-gate unit being respectively connected to said first multichannel input and said first input of said first logical unit;

a second halver having an input, a multichannel input, an output and a multichannel output, said multichannel input and said input of said second halver being respectively connected to said first multichannel output and said first output of said second logical unit;

a second unit for division by a predetermined number system base having an input, a multichannel input, an output and a multichannel output, said multichannel input and said input of said second unit for division by a predetermined number system base being respectively connected to said second multichannel output and said second output of said second logical unit;

a memory register to store the dividend having an input, a multichannel input, an output and a multichannel output, said multichannel input and said input of said memory register being respectively connected to said third multichannel output and said third output of said second logical unit;

a second OR-gate unit having first and second inputs, first and second multichannel inputs, an output and a multichannel output, said first multichannel input and said first input of said second OR-gate unit being respectively connected to said multichannel output and said output of said second halver, said second multichannel input and said second input of said second OR-gate unit being connected to said multichannel output and said output of said second unit for division by a predetermined number system base, said multichannel output and said output of said second OR-gate unit being respectively connected to said first multichannel input and said first input of said second logical unit;

said multichannel output of said first OR-gate unit, said multichannel output and said output of said second OR-gate unit, said multichannel output and said output of said memory register being respectively connected to said first multichannel output, said second multichannel output, said first output, said third multichannel output and said second output of said division unit.

11. A divider as claimed in claim 10, wherein each of said unit for division by a predetermined number system base comprises:

a first group of decoders, each of the decoders having first and second inputs and first and second outputs;

a second group of decoders, each of the decoders having first, second and third inputs and an output, said first and second groups of decoders being placed in series, said first input of said decoders of said second group of decoders being connected to said first input of said decoders of said first group of decoders and to respective channels of said multichannel input of a respective unit for division by a predetermined number system base, said second inputs of said decoders of said first group of decoders being combined with said second inputs of said decoders of said second group of decoders and connected to a preselected channel of said multichannel input of said respective unit for division by a predetermined number system base, said second outputs of said decoders of said first group of decoders being connected to said third inputs of said decoders of said second group of decoders and to said multichannel output of said respective unit for division by a predetermned number system base;

a specified modulus adder having first and second groups of inputs, an input and an output, said inputs of said first group of inputs of said specified modulus adder being connected to said first outputs of said decoders of said first group of decoders, said inputs of said second group of inputs of said specified modulus adder being connected to said outputs of said decoders of said second group of decoders, said input of said specified modulus adder beign connected to said input of said respective unit for division by a predetermined number system base;

a first decoder having an input and first and second outputs, said input of said first decoder being connected to said output of said specified modulus adder, said second output of said first decoder being connected to a specified channel of said multichannel output of said respective unit for division by a predetermined number system base;

an adder having a first group of inputs and a second group of inputs, first and second inputs and an output, said first group of inputs of said adder being connected to said first outputs of said decoders of said first group of decoders, said second group of inputs of said adder being connected to said outputs of said decoders of said second group of decoders, said first input of said adder being connected to said first output of said first decoder, said second input of said adder being connected to said input of said respective unit for division by a predetermined number system base;

a second decoder having an input and an output, said input of said second decoder being connected to said output of said adder, said output of said second decoder being connected to said output of said respective unit for division by a predetermined number system base.

12. A divider as claimed in claim 10, wherein each of said halvers comprises:

a first group of decoders, each of the decoders having an input and an output, said inputs of said decoders of said first group of decoders being connected to said multichannel input of a respective halver;

a modulo 2 adder having a multichannel input, an input, and an output, said multichannel input of said modulo 2 adder being connected to said outputs of said decoders of said first group of decoders;

a position attribute decoder having an input and an output, said input being connected to said input of said respective halver, said output of said position attribute decoder being connected to said input of said modulo 2 adder;

a second group of decoders, each of the decoders having a first input, a second input, and first and second outputs, said first inputs of said decoders of said second group of decoders being connected to said output of said modulo 2 adder, said second inputs of said decoders of said second group of decoders being combined with said inputs of said decoders of said first group of decoders and connected to said multichannel input of said respective halver;

said first outputs of said decoders of said second group of decoders being connected to said multichannel output of said respective halver;

an adder having a multichannel input, an input and an output, said multichannel input of said adder being connected to said second outputs of said decoders of said second group of decoders, said input of said adder being combined with said input of said position attribute and connected to said input of said respective halver;

a decoder of the position attribute of the result of division having an input and an output, said input of said decoder of the position attribute of the result of division being connected to said output of said adder, said output of said decoder of the position attribute of the result of division being connected to said second output of said respective halver.

13. A divider as claimed in claim 9, wherein said product analysis unit comprises:

a first parity generator having a multichannel input, an input and an output, said multichannel input being connected to said second multichannel input of said product analysis unit, said input being connected to said third input of said product analysis unit;

a second parity generator having a multichannel input, an input and an output, said multichannel input being connected to said first multichannel input of said product analysis unit, said input being connected to said second input of said product analysis unit;

a first AND-gate having first, second and third inputs and first and second outputs, said first input being connected to said first input of said product analysis unit, said second input being connected to said third multichannel input of said product analysis unit, said third input being connected to said fourth input of said product analysis unit;

a second AND-gate having first, second and third inputs and first and second outputs, said first input being connected to said fourth multichannel input of said product analysis unit, said second input being connected to said fifth input of said product analysis unit;

a third-AND gate having first and second inputs and an output, said first input being connected to said first input of said product analysis unit, said second input being connected to said output of said first parity generator;

a fourth AND-gate having first and second inputs and an output, said first input being connected to said output of said first parity generator;

a fifth AND-gate having first and second inputs and an output, said first input being connected to said first input of said product analysis unit, said second input being connected to said output of said second parity generator;

an OR-gate having first, second, third and fourth inputs, a multichannel output and an output, said first and second inputs being respectively connected to said first and second outputs of said first AND-gate, said third and fourth inputs being respectively connected to said first and second outputs of said second AND-gate;

a memory register having an input and an output, said input being connected to said output of said third AND-gate;

a first modulo 2 adder having first and second inputs and an inverted output, said first input being connected to said output of said third AND-gate, said inverted output being connected to said second input of said fourth AND-gate, to said third input of said second AND-gate and to said first output of said product analysis unit;

a sixth AND-gate having first and second inputs and an output, said first input being connected to said output of said fifth AND-gate, said output being connected to said second input of said first modulo 2 adder;

a third parity generator having a multichannel input, an input and an output, sad multichannel input and said input being respectively connected to said multichannel output and said output of said OR-gate;

a seventh AND-gate having first and second inputs and an output, said first input being connected to said first input of said product analysis unit, said second input being connected to said output of said third parity generator, said output being connected to said second input of said sixth AND-gate;

an eighth AND-gate having first and second inputs and an output, said first input being connected to said output of said third parity generator, said second input being connected to said inverted output of said first modulo 2 adder; and a second modulo 2 adder having first, second and third inputs and an inverted output, said first input being connected to said output of said memory register, said second input being connected to said output of said fourth AND-gate, said third input being connected to said output of said eighth AND-gate, said inverted output being connected to said second output of said product analysis unit.

14. A divider as claimed in claim 13, wherein each of said parity generators comprises:

a memory register for storing constants of the residual classes system having a multichannel output; a group of AND-gates, each AND-gate having first and second inputs and an output, said first inputs of said AND-gates of said group of AND-gates being connected to said multichannel output of said memory register, said second inputs of said AND-gates of said group of AND-gates being connected to said multichannel input of a respective parity generator;

a modulo 2 adder having a multichannel input, an input and an output, said multichannel input of said modulo 2 adder being connected to said outputs of said AND-gates of said group of AND-gates, said input of said modulo 2 adder being connected to said input of said respective parity generator, said output of said modulo 2 adder being connected to said output of said respective parity generator.

15. A divider as claimed in claim 9, wherein said product analysis unit includes a plurality of parity generators, each parity generator comprising:

a memory register for storing constants of the residual classes system having a multichannel output; a group of AND-gates, each AND-gate having first and second inputs and an output, said first inputs of said AND-gates of said group of AND-gates being connected to said multichannel output of said memory register, said second inputs of said AND-gates of said group of AND-gates being connected to said multichannel input of a respective parity generator;

a modulo 2 adder having a multichannel input, an input and an output, said multichannel input of said modulo 2 adder being connected to said outputs of said AND-gates of said group of AND-gates, said input of said modulo 2 adder being connected to said input of said respective parity generator, said output of said modulo 2 adder being connected to said output of said respective parity generator.

16. A divider as claimed in claim 9, wherein said multiplier comprises:

a decoder, to produce the product of the divisor and a partial quotient, having first and second multichannel inputs and a multichannel output, said first and second multichannel inputs of said decoder being respectively connected to said first and second multichannel inputs of said multiplier;

a first AND-gate unit having an input, a multichannel input and a multichannel output, said input of said first AND-gate unit being connected to said first input of said multiplier, said multichannel input of said first AND-gate unit being connected to said multichannel output of said decoder;

a second AND-gate unit having a first input, a second input and a multichannel output, said first input and second input of said second AND-gate unit being respectively connected to said second input and said third input of said multiplier;

a first OR-gate unit having first and second multichannel inputs and a multichannel output, said first and second multichannel inputs of said first OR-gate unit being respectively connected to said multichannel outputs of said first and second AND-gate units;

a generator, to calculate the position attribute of numbers represented in the system of residual classes, having a multichannel input and a multichannel output, said multichannel input of said generator being connected to said multichannel output of said first OR-gate unit, said output of said generator being connected to said output of said multiplier;

a second OR-gate unit having a first multichannel input connected to said multichannel output of said second AND-gate unit, a second multichannel input connected to said multichannel output of said decoder, and a multichannel output connected to said multichannel output of said multiplier.

17. A multiplier for numbers represented in the system of residual classes, comprising:

a multiplicand bus of a multiplicand;

a multiplier bus of a multiplier;

a control bus;

a product bus of a product of said multiplicand and said multiplier;

a first correction generator, to calculate the multiplicand correction, having first, second and third inputs and an output, said first input of said first correction generator being connected to said multiplicand bus, said second input of said first correction generator being connected to said control bus;

a first subtraction unit, to calculate the difference between the multiplicand and the multiplicand correction, having first, second, third and fourth inputs and an output, said first input of said first subtraction unit being connected to said output of said first correction generator, said second input of said first subtraction unit being connected to said multiplicand bus, said third input of said first subtraction unit being connected to said control bus;

a first division unit, to calculate the first quotient of the division of the multiplicand and the multiplicand correction, having an input and an output, said input of said first division unit being connected to said output of said first subtraction unit;

a second correction generator, to calculate the multiplier correction, having first, second and third inputs and an output, said first input of said second correction generator being connected to said multiplier bus, said second input of said second correction generator being connected to said control bus;

a second subtraction unit, to calculate the difference between the multiplier and the multiplier correction, having first, second, third and fourth inputs and an output, said first input of said second subtraction unit being connected to said output of said second correction generator, said second input of said second subtraction unit being connected to said multiplier bus, said third input of said second subtraction unit being connected to said control bus;

a second division unit, to calculate the second quotient of the division of the difference between the multiplier and the multiplier correction by the second part of the number system range, having an input and an output, said input of said second division unit being connected to said output of said second subtraction unit;

a multiplication unit, to calculate the product of the first and second quotients, the product of the multiplicand correction by the second quotient, and the product of the multiplier correction by the first quotient, having first, second, third, fourth, fifth, sixth and seventh inputs, and first, second, third, fourth and fifth outputs, said first input of said multiplication unit being connected to said output of said first division unit, said second input of said multiplication unit being connected to said output of said second division unit, said third and fourth inputs of said multiplication unit being respectively connected to said multiplicand and multiplier buses, said fifth and sixth inputs of said multiplication unit being respectively connected to said outputs of said first and second correction generators, said seventh input of said multiplication unit being connected to said control bus, said first output of said multiplication unit being connected to said third input of said first correction generator and said fourth input of said first subtraction unit, said second output of said multiplication unit being connected to said third input of said second correction generator and said fourth input of said second subtraction unit;

a specified modulus adder unit, to calculate the result of the multiplication of the multiplicand and the multiplier, having first, second and third inputs and an output, said first, second and third inputs of said specified modulus adder unit being respectively connected to said third, fourth and fifth outputs of said multiplication unit, said output of said specified modulus adder unit being connected to said product bus.

18. A multiplier as claimed in claim 17, wherein each of said correction generators comprises:

a logical unit, to select required information, depending upon a control signal, having first, second and third inputs and an output, said first, second and third inputs of said logical unit being respectively connected to said third, first and second inputs of a respective correction generator;

a position attribute generator, to calculate the position attribute of the selected information, having an input and an output, said input of said position attribute generator being connected to said output of said logical unit;

a generator of residues having first and second inputs and an output, said first input of said generator of residues being connected to said output of said position attribute generator, said second input of said generator of residues being connected to said output of said logical unit, said output of said generator of residues being connected to said output of said respective correction generator.

19. A multiplier as claimed in claim 18, wherein said generator of residues comprises:

a required number of residue calculating units, each unit calculating one residue and comprising:

a decoder having an input and an output, said input of said decoder being connected to said first input of said generator of residues;

a group of decoders, each decoder having an input and an output, said inputs of said decoders of said group of decoders being connected to said second input of said generator of residues;

a specified modulus adder having first and second inputs and an output, said first and second inputs of said adder being respectively connected to said output of said decoder and said outputs of said decoders of said group of decoders, said output of said adder being connected to said output of said generator of residues.

20. A multiplier as claimed in claim 17, wherein each of said division units comprises:

a decoders unit having an input and an output, said input of said decoders unit being connected to said input of a respective division unit, said output of said decoders unit being connected to said output of said respective division unit;

a position attribute generator having an input and an output, said input of said position attribute generator being connected to said output of said decoders unit;

a generator of residues having first and second inputs and an output, said first input of said generator of residues being combined with said input of said position attribute generator and connected to said output of said decoders unit, said second input of said generator of residues being connected to said output of said position attribute generator, said output of said generator of residues being connected to said output of said respective division unit.

21. An analysis unit, to produce an overflow attribute when algebraically adding two operands represented in the system of residual classes, comprising:

first, second and third input buses of, respectively, first and second operands and an algebraic sum of said operands;

first and second position attribute buses of, respectively, said first and second operands;

first and second sign buses of, respectively, said first and second operands;

a control bus;

an output bus of the algebraic sum of said first and second operands;

an overflow attribute bus;

a first parity generator, to calculate the parity of the first operand, having first and second inputs and an output, said first and second inputs being respectively connected to said first input bus and said first position attribute bus;

a second parity generator, to calculate the parity of the second operand, having first and second inputs and an output, said first and second inputs being respectively connected to said second input bus and said second position attribute bus;

a third parity generator, to calculate the parity of the algebraic sum of the first and second operands, having first and second inputs and an output, said first input being connected to said third input bus;

a position attribute generator, to calculate the algebraic sum of said first and second operands, having a multichannel input and an output, said multichannel input of said position attribute generator being connected to said third input bus and said first input of said third parity generator, said second input of said third parity generator being connected to said output of said position attribute generator;

a logical unit, to produce the overflow attribute and the sign of the algebraic sum of the first and second operands, having first, second, third, fourth, fifth and sixth inputs, and first, second, third, fourth and fifth outputs, said first, second and third inputs of said logical unit being respectively connected to said outputs of said first, second and third parity generators, said fourth and fifth inputs of said logical unit being respectively connected to said first and second sign buses of, respectively, said first and second operands, said sixth input of said logical unit being connected to said control bus, said first and second outputs of said logical unit being respectively connected to said output bus of the algebraic sum of the first and second operands and said overflow attribute bus.

22. An analysis unit as claimed in claim 21, wherein said logical unit comprises:
- a first modulo 2 adder having first, second and third inputs, a direct output and an inverting output, said first and second inputs of said first modulo 2 adder being respectively connected to said fourth and fifth inputs of said logical unit;
- an operation code decoder having an input and an output, said input of said operation code decoder being connected to said sixth input of said logical unit, said output of said operation code decoder being connected to said third input of said first modulo 2 adder;
- a first AND-gate having first and second inputs and an output, said first input of said first AND-gate being connected to said inverting output of said first modulo 2 adder, said second input of said first AND-gate being connected to said fourth input of said logical unit;
- a second AND-gate having first and second inputs and an output, said second input of said second AND-gate being connected to said direct output of said first modulo 2 adder;
- a third AND-gate having first and second inputs and an inverting output;
- a fourth AND-gate having first and second inputs and an output, said inverting input of said first modulo 2 adder being connected to said second input of said fourth AND-gate, said output of said fourth AND-gate being connected to said second output of said logical unit;
- an OR-gate having first and second inputs and an output, said first input of said OR-gate being connected to said output of said first AND-gate, said inverting output of said third AND-gate being connected to said second input of said OR-gate, said output of said OR-gate being connected to said first output of said logical unit;
- a constant register having an output connected to said first input of said second AND-gate and said second input of said third AND-gate;
- a second modulo 2 adder having first, second, third and fourth inputs and an output, said first input of said second modulo 2 adder being connected to said output of said second AND-gate, said second, third and fourth inputs of said second modulo 2 adder being respectively connected to said first, second and third inputs of said logical unit, said output of said second modulo 2 adder being connected to said first inputs of said third and fourth AND-gates.

23. An analysis unit as claimed in claim 22, wherein said logical unit further comprises:
- a fifth AND-gate having first and second inputs, a direct output and an inverting output, said first input of said fifth AND-gate being connected to said fourth input of said logical unit, said second input of said fifth AND-gate being connected to said direct output of said first modulo 2 adder, said direct and inverting outputs of said fifth AND-gate being respectively connected to first and second auxiliary outputs of said logical unit;
- a sixth AND-gate having first and second inputs and an output, said first input of said sixth AND-gate being connected to said direct output of said first modulo 2 adder, said second input of said sixth AND-gate being connected to said inverting output of said third AND-gate, said output of said sixth AND-gate being connected to a third auxiliary output of said logical unit.

24. An analysis unit as claimed in claim 21, wherein said position attribute generator comprises:
- a group of decoders, each decoder having an input and an output, said inputs of said decoders of said group of decoders being connected to said multichannel input of said position attribute generator;
- a modular adder having a multichannel input and an output, said multichannel input of said modular adder being connected to said outputs of said decoders of said group of decoders, said output of said modular adder being connected to said output of said position attribute generator.

25. An analysis unit as claimed in claim 21, wherein each of said parity generators comprises:
- a memory register having a multichannel output; a group of AND-gates, each AND-gate having first and second inputs and an output, said first inputs of said AND-gates of said group of AND-gates being connected to said multichannel output of said memory register, said second inputs of said AND-gates of said group of AND-gates being connected to said first input of said parity generator;
- a modulo 2 adder having an input, a multichannel input and an output, said multichannel input of said modulo 2 adder being connected to said outputs of said AND-gates of said group of AND-gates, said input of said modulo 2 adder being connected to said second input of said parity generator, said output of said modulo 2 adder being connected to said output of said parity generator.

* * * * *